(12) United States Patent
Kelly et al.

(10) Patent No.: US 10,028,359 B2
(45) Date of Patent: Jul. 17, 2018

(54) LIGHT SWITCH CONTROLLING LIGHT SOURCE VIA WIRELESS TRANSMISSION

(71) Applicant: Belkin International, Inc., Playa Vista, CA (US)

(72) Inventors: Francis Michael Kelly, Thousand Oaks, CA (US); Jon Plummer, Los Angeles, CA (US); Ryan Yong Kim, Rolling Hills Estates, CA (US); Li-ter Chen, Calabasas, CA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 0 days.

(21) Appl. No.: 15/019,525

(22) Filed: Feb. 9, 2016

(65) Prior Publication Data

US 2016/0157326 A1 Jun. 2, 2016

Related U.S. Application Data

(63) Continuation of application No. 14/750,786, filed on Jun. 25, 2015.
(Continued)

(51) Int. Cl.
*H05B 37/02* (2006.01)
*G08C 17/02* (2006.01)

(52) U.S. Cl.
CPC ......... *H05B 37/0272* (2013.01); *G08C 17/02* (2013.01); *H05B 37/0227* (2013.01); *G08C 2201/40* (2013.01); *G08C 2201/93* (2013.01)

(58) Field of Classification Search
None
See application file for complete search history.

(56) References Cited

U.S. PATENT DOCUMENTS

| 5,239,205 A * | 8/1993 | Hoffman | H01H 23/00 200/277.2 |
|---|---|---|---|
| 6,771,182 B1 * | 8/2004 | Loh | G08C 23/04 340/12.28 |

(Continued)

FOREIGN PATENT DOCUMENTS

WO 2015/200689 A1 12/2015

OTHER PUBLICATIONS

ISY-99i/ISY-26 INSTEON:Scene—Universal Devices, Inc. Wiki, accessed Jan. 26, 2015, retrieved from https://web.archive.org/web/20150605222033/http://wiki.universal-devices.com/index.php?title=ISY-99i/ISY-26_INSTEON:Scene 6 pages.
(Continued)

*Primary Examiner* — Minh D A
*Assistant Examiner* — James H Cho
(74) *Attorney, Agent, or Firm* — Kilpatrick Townsend & Stockton LLP

(57) ABSTRACT

This disclosure relates in general to a networked light switch. More specifically, the disclosure relates to a light switch that, in response to detecting a local input or motion, transmits a communication that causes another light switch to change a state of a light. This disclosure further relates to techniques for detecting an abnormal current draw state of an electrical device such as a lighting device are described; systems including in-wall network devices having a user-facing restore button for restoring some or all of the customizable settings to a factory default state; and techniques for controlling device operations in accordance with scenes or modes.

20 Claims, 44 Drawing Sheets

Related U.S. Application Data

(60) Provisional application No. 62/018,171, filed on Jun. 27, 2014, provisional application No. 62/020,852, filed on Jul. 3, 2014, provisional application No. 62/024,902, filed on Jul. 15, 2014, provisional application No. 62/087,743, filed on Dec. 4, 2014, provisional application No. 62/087,647, filed on Dec. 4, 2014.

(56) References Cited

U.S. PATENT DOCUMENTS

| | | | |
|---|---|---|---|
| 7,498,952 | B2 | 3/2009 | Newman, Jr. |
| 8,190,301 | B2 | 5/2012 | Voysey |
| 8,598,975 | B2 | 12/2013 | Miura |
| 8,598,978 | B2 * | 12/2013 | Knode ............... H04L 12/282 340/12.23 |
| 9,713,231 | B2 | 7/2017 | Kelly et al. |
| 2006/0126617 | A1 | 6/2006 | Cregg et al. |
| 2009/0251352 | A1 * | 10/2009 | Altonen ............ H01H 9/025 341/176 |
| 2012/0044350 | A1 | 2/2012 | Verfuerth |
| 2015/0005900 | A1 | 1/2015 | Steele et al. |
| 2015/0189725 | A1 | 7/2015 | Karc et al. |
| 2015/0382436 | A1 | 12/2015 | Kelly et al. |
| 2016/0174345 | A1 | 6/2016 | Kelly et al. |

OTHER PUBLICATIONS

SkylinkHome SK-8 Wireless Remote 3-Way On/Off Kit, dated Jan. 11, 2012, retrieved from https://web.archive.org/web/20120111095210/http://www.smarthome.com/73027/SkylinkHome-SK-8-Wireless-Remote-3-Way-On-Off-Kit/p.aspx 1 page.
Leviton Anywhere Decora RF Remote 3-way switch kit: Home Improvement, dated May 21, 2010, retrieved from https://web.archive.org/web/20100521112749/http://www.amazon.com/Leviton-6696-W-Anywhere-Switch-Remote/dp/B00004YUOL 5 pages.
Carlon HW2172 Battery Powered Wireless Wall Switch and Plug-in On/Off Module, dated Oct. 26, 2010, retrieved from https://web.archive.org/web/20101026131700/htttp://www.srnarthome.com/25330/Carlon-HW2172-Battery-Powered-Wireless-Wall-Switch-and-Plug-in-On-Off-Module-White/p.aspx 3 pages.
Sierra Tools JB5571 Battery-Operated Ceiling/Wall Light with Remote—Vanity Lighting Fixtures, dated May 23, 2014, retrieved from https://web.archive.org/web/20140523063320/http://www.amazon.com/Sierra-Toois-JB5571-Battery-Operated-Ceiling/dp/B002MYIPKE 5 pages.
INSTEON Wireless Switch, dated Apr. 14, 2013, retrieved from https://web.archive.org/web/20130414000334/http://www.insteon.com/2342-x42-mini-remote.html 2 pages.
SkylinkHome WE-318 On/Off Wall Switch Receiver with Snap-On Remote, dated Oct. 13, 2014, retrieved from https://web.archive.org/web/20141013125648/http://www.amazon.com/SkylinkHome-WE-318-Receiver-Snap-On-Installation/dp/B0052ROBZ6 6 pages.
INSTEON: RemoteLinc 2 INSTEON Remote Control Keypad, 4 Scene (#2444a2xx4) Owners Manual (Oct. 24, 2011) XP055208459, Retrieved from http://cache.insteon.com/pdf/2444a2wh4.pdf 15 pages.
International Search Report and Written Opinion of the International Searching Authority for International Patent Application No. PCT/US2015/037777, dated Aug. 25, 2015; 10 pages.
Notice of Allowance dated Apr. 3, 2017 for U.S. Appl. No. 14/750,786; 9 pages.
First Action Interview Pilot Program Pre-Interview Communication dated Sep. 23, 2016 for U.S. Appl. No. 14/750,786, 4 pages.
Non-Final Office Action dated Sep. 8, 2017 for U.S. Appl. No. 15/019,538; 12 pages.

* cited by examiner

3100

| SCENE(S) | CONDITION(S) | DEVICE ACTION(S) |
|---|---|---|
| MOVIE 3112 (3110) | 3114 MEDIA DEVICE: POWER STATE ("ON") | 3116 LIGHT_1: POWER STATE ("ON"); BRIGHTNESS (25%) LIGHT_2: POWER STATE ("OFF") KITCHEN_APPLIANCE: POWER STATE ("ON") |
| READING 3122 (3120) | 3124 TIME PERIOD: 5PM – 9PM OFFICE LIGHTING: POWER STATE ("ON") | 3126 LIGHT_3: POWER STATE ("ON"); BRIGHTNESS (50%) STEREO: POWER STATE ("OFF") |
| HOME 3132 (3130) | 3124 HALLWAY_LIGHT: POWER STATE ("ON") TIME PERIOD: 5PM – 7AM | 3126 SECURITY SYSTEM: POWER STATE ("OFF") KITCHEN_LIGHT: POWER STATE ("ON") |
| ... | ... | ... |

FIG. 31

| Mode(s) | Condition(s) | Device Action(s) | Mode Condition(s) |
|---|---|---|---|
| Home 3232 | 3214 Time Period: 4PM – 8AM | 3216 Porch Lighting: Power State ("On"); Heater: Power State ("On") | 3218 Security System: Power State ("On") |
| Away 3222 | 3224 Security System: Power State ("On") | 3226 Light_3: Power State ("On"); Brightness (50%) Stereo: Power State ("Off") | 3228 Doorway_Light: Power State ("On") |
| Sleep 3232 | 3234 Alarm_Clock: Power State ("On") | 3236 Television: Setting ("Sleep Timer") Bedside_Lamp: Power State ("Off") | 3238 Time: 6AM |
| ... | ... | ... | ... |

FIG. 32

LIGHT SWITCH CONTROLLING LIGHT SOURCE VIA WIRELESS TRANSMISSION

CROSS-REFERENCE TO RELATED APPLICATIONS

This application is a continuation of U.S. application Ser. No. 14/750,786, filed on Jun. 25, 2015, which claims the benefit of and priority to each of U.S. Provisional Patent Application Nos. 62/018,171, filed Jun. 27, 2014, 62/020,852, filed Jul. 3, 2014, 62/024,902, filed Jul. 15, 2014, 62/087,743, filed Dec. 4, 2014, and 62/087,647, filed on Dec. 4, 2014. Each of these applications is hereby incorporated by reference in its entirety for all purposes.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates in general to a networked light switch. More specifically, the disclosure relates to a light switch that, in response to detecting a local input or motion, transmits a communication that causes another light switch to change a state of a light.

BACKGROUND

Traditionally, installing a light switch included appropriately connecting the switch with wiring in a building. If a person wanted a light switch to be placed at a new location, it was conceivable that existing wiring in a building could prevent such positioning. Even if such positioning was technically feasible, it would frequently involve cutting through walls, running cable and appropriately connecting wires. Such tasks can be messy, intimidating and even dangerous for inexperienced people.

SUMMARY

In some embodiments, a "secondary" switch (e.g., a secondary light switch) is provided that includes a stimulus detector to detect a stimulus (e.g., to detect an input or motion). For example, the secondary switch can include a switch or button and the stimulus detector can detect when the switch has been flipped or when the button has been pressed. Upon detecting a stimulus, the secondary switch can send a signal to another "master" device (e.g., another light switch, lighting device, or electrical outlet) or to an intermediate device (e.g., a gateway device or cloud server) that then routes the signal or sends another signal to the master device. The master device can include one that is connected via circuit wiring to a light source (e.g., light bulb), that includes a bulb socket, or that includes a light source. For example, the light switch can include one or more terminal screws to attach to one or more hot wires, one or more wire receptacles to receive one or more wires, a conductive item to permit a circuit to be completed and/or a mechanical and/or insulating element to break the circuit.

The light switch may be configured to attach to one or more wires, such as, for example, one or more hot wires, ground wires and/or (in some instances) neutral wires. The secondary switch can be electrically isolated from the light source, such that it is not attached by circuit wiring to the source. Nonetheless, the direct or indirect wireless transmission from the secondary switch to the master device can allow the secondary switch to exert control over the light. Direct wireless transmission can, for example, avoid use of any intermediate device or any cloud server. In some instances, direct wireless transmission avoids use of the Internet or can still occur (e.g., by substituting communication channels) without Internet or WiFi connectivity.

The secondary switch can include a battery power source. Thus, in some instances, the secondary switch can operate without any wired connections. Further, as opposed to many traditional light switches for which the switch is separable from a light switch plate, the secondary switch can include both the switch and the plate. Despite the potential completeness of the secondary switch, it can remain thin, having a depth of less than (for example) 0.5, 1 or 2 cm. Such thinness can be obtainable due to an ability to reduce a number of electrical connections and electrical components and relying on small parts, such as a thin battery.

The secondary switch can be configured to be attached to a wall (e.g., via an adhesive, suction component or via insertion of one or more screws or nails through the switch. Because the secondary switch can wirelessly control a light source, it can be used without needing to attach it to an in-wall electrical box or switch. A wall's integrity can be entirely or largely (e.g., aside from one or more nail or screw holes) unaffected by a switch attached thereto.

In some embodiments, the secondary switch can be configured to detect a variety of types of stimulus. For example, the secondary switch can include a button and input types can include two or more of: a single, quick click; multiple clicks; and a sustained click. As another example, a toggle switch can include two, three or more positions. As yet another example, a motion detector can detect motion within any of two, three or more regions of the detector's receptive field. A rule or setting can identify one or more master switches and/or one or more controls to be associated with each stimulus type. For example, a short click may change an on/off state of a first light connected to the secondary switch; a double click may change the on/off state of a first set of other lights, none of which are connected to the secondary switch; and a sustained click may cause any lights in a second set of lights (which includes the first light) that are on an on state to change to an off state.

In some embodiments, techniques for detecting an abnormal current draw state of an electrical device such as a lighting device are described. The techniques may involve using a current sensing circuit of a network device to sense an electrical current draw of the electrical device. A steady state current amount of the electrical device can be determined by monitoring the electrical current draw of the electrical device over a steady state determination time period. Detection of an abnormal current draw state of the electrical device can be triggered when the electrical current draw of the electrical device deviates from the steady state current amount by a threshold amount, and an abnormal current draw notification can be transmitted to an access device when the abnormal current draw state is detected to inform a user of possible malfunction of the electrical device.

In some embodiments, techniques and systems for wirelessly switching electrical power on and off are provided.

The systems include in-wall network devices having a user-facing restore button for restoring some or all of the customizable settings to a factory default state. The systems include in-wall network devices having a user-facing restart button for temporarily removing power to at least a processing element of the network device to simulate disconnecting power from the in-wall network device.

In some embodiments, techniques and systems for wirelessly switching electrical power on and off are provided. The systems include in-wall network devices which incorporate a wireless antenna positioned outside of the wall to minimize or reduce interference with wireless transmissions due to supporting and structural components located in the wall.

In some embodiments, techniques are described for configuring multiple actions to be performed including operation of one or more network devices according to a scene or a mode. A scene or a mode is initiated based on satisfaction of a condition, which may be based on an event (e.g., operation of a network device, a time-based event, or an event based on interaction with an interface). Actions for a scene may be initiated at an instant in time. Actions for a mode may persist until a mode condition is satisfied. A mode condition may be defined by an event, including the types of events defined for a condition. Data may be transmitted to cause network devices to be adjusted for a scene or a mode. Actions performed for a scene or a mode may include controlling operation of network devices, sending notifications, and adjusting operation of a network.

In certain embodiments, scenes and/or modes may be defined by multiple actions that are initiated (e.g., concurrently, simultaneously or in accordance with a sequence) when one or more initiation condition(s) for the scenes and modes are satisfied. The multiple actions can include actions to be performed by a single device or by multiple devices. Examples of actions may include (for example) controlling operation of one or more network devices, sending notifications, adjusting operation of a network, other actions that are configurable, or combinations thereof. An initiation condition may be based on an event (e.g., operation of a network device, a time-based event, or an event based on interaction with an interface). Actions for a scene may be initiated at an instant in time. Actions for a mode may persist until a mode condition is satisfied. A mode condition may be defined by an event, including the types of events defined for a condition.

To cause operation of network devices to be adjusted in accordance modes and scenes, data may be transmitted. The data may be transmitted to network devices, some or all of which are adjusted for a mode or a scene. The transmitted data may include information identifying a scene or a mode to be initiated. A network device may use the identifier to determine an adjustment of an attribute or a setting related to operation of the network device for the scene or the mode associated with the identifier. In some embodiments, the transmitted data may include an adjustment to an attribute or a setting related to operation of a network device. The network device may be adjusted for operation based on the adjustment indicated in the transmitted data.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIG. 31 shows examples of configurations of scenes for operating network devices according to embodiments of the invention;

FIG. 32 shows examples of configurations of modes for operating network devices according to embodiments of the invention;

Figure 1:
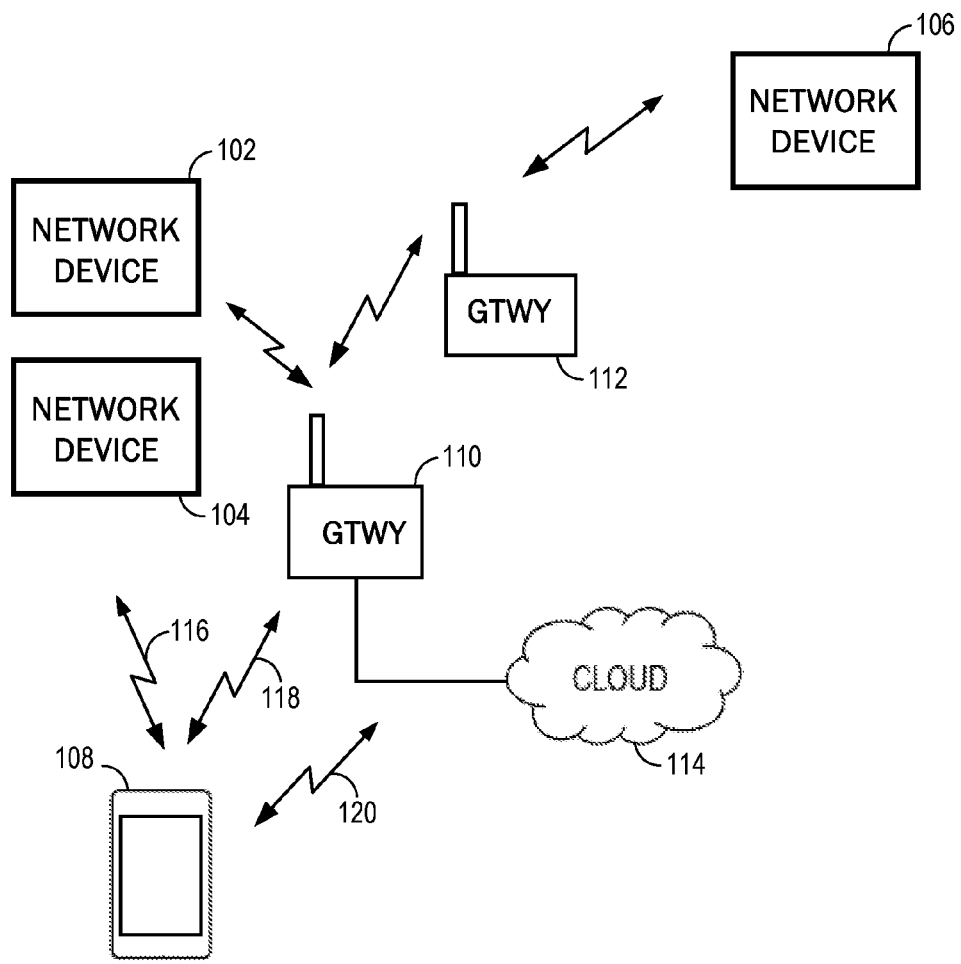
FIG. 1 is an illustration of an example of a network environment, in accordance with some embodiments of the invention.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. In some embodiments, the network devices 102, 104, 106 may connect directly to the cloud network 114, for example, using broadband network access such as a cellular network. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

In some embodiments, a modular visual interface framework may be utilized to dynamically and implicitly provide visual interface modules to an access device 108 so that the access device 108 can be used to control network devices within a network without having to install a new application or a version of an application for each network device. The visual interface modules can enable a user of the access device 108 to remotely control network devices within a network without having to physically interface with the network device. In certain embodiments, an application installed on the access device 108 can have a graphical interface, and the application can be configured to execute one or more visual interface modules usable to control respective network devices in a local area network. The visual interface modules, when executed by an application, can render a visual interface in the graphical interface to enable control of operation of the network device. In some embodiments, the visual interface module can be specific to a given network device.

The visual interface rendered for a visual interface module can be a modular tile that includes information identifying a respective network device and includes interactive areas or interactive elements for controlling and/or monitoring the network device on a network. The visual interface can provide information about a status of the network device corresponding to the tile. The status of a network device may be any changeable variable of that particular network device. For example, the status of a network device may include a state of the network device itself (e.g., on or off) or how the network device is situated within the network with respect to the other network and other devices throughout the network. In certain embodiments, the status can include a value, a state, or other unit of measure corresponding to a setting or an attribute related to operation of a device. The setting or the attribute can be adjustable within a range of values or between different states. For example, the device can be a light bulb and the status can include a value corresponding to brightness (e.g., a percentage of total brightness) emitted by the light bulb when the light bulb is powered-on.

The visual interface can include one or more interactive elements or interactive areas to control one or more settings and/or attributes related to operation of the network device corresponding to the visual interface. The settings and/or attributes can correspond to functionalities or features of the network device. The functionalities can include, for example, powering the network device on and off, or adjusting a setting or an attribute of the network device. In some embodiments, the visual interface may enable a user to initiate additional actions by interacting with an interactive area for a threshold time period. The visual interface can be updated to reflect the status of the network device with respect to the adjustment of one or more attributes and/or settings. Operation and implementation of the modular visual interface framework is described below with reference to FIG. 2. In particular, FIGS. 34-38 show examples of visual interfaces (e.g., a graphical interface) that enable a user to control operation of network devices.

Figure 2:
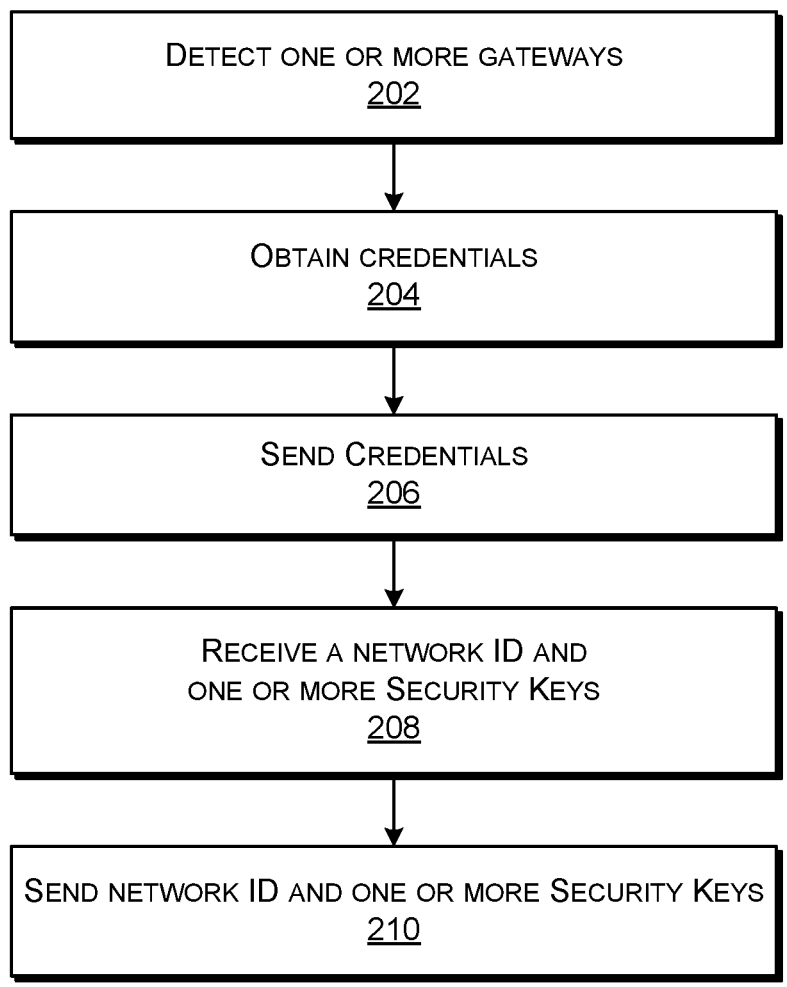
FIG. 2 is a flowchart illustrating an embodiment of a process for registering one or more network devices, in accordance with some embodiments of the invention.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

A record or profile may then be created in a data store at the server for associating each network device with a corresponding, known interface module so that the interface module can be provided to the access device. For example, the server of the cloud network 114 may associate the first network device 102 with a first interface module. Similarly, the server may associate the second network device 104 with a second interface module. In some embodiments, the server performs the association by generating and storing a record including the unique ID of the network device (e.g., MAC address or serial number of a network device), a unique ID of an interface module suitable to control the network device, and/or any other information relevant to the network device and/or the interface module. For example, the server may store a first record at a first memory space (e.g., in Flash, DRAM, a data store, a database, or the like) with the unique ID of the network device 102 and the unique ID of an interface module for monitoring and controlling the network device 102. The server may also store a second record at a second memory space along with the unique ID of the network device 106 and the unique ID of an interface module for monitoring and controlling the network device 106. The technique used to store records for associating each network device with a corresponding interface module may be dependent on a type of database that is included in the cloud network 114. For example, different databases may have different proprietary mechanisms for creating unique identifiers. The unique identifiers for each interface module may be generated using database specific technique. For example, a MySQL technique may be used to generate the unique IDs for interface modules. Each unique ID for interface modules may include a UUID or a GUID.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExperationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the-network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each-network device, or individual storage tables for each local area network or other subset of its network devices/networks. In one embodiment, a change in status may prompt the-network device to push its change in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to-network devices 102 and 104 that they are each connected to the same local area network 100.

Figure 3:
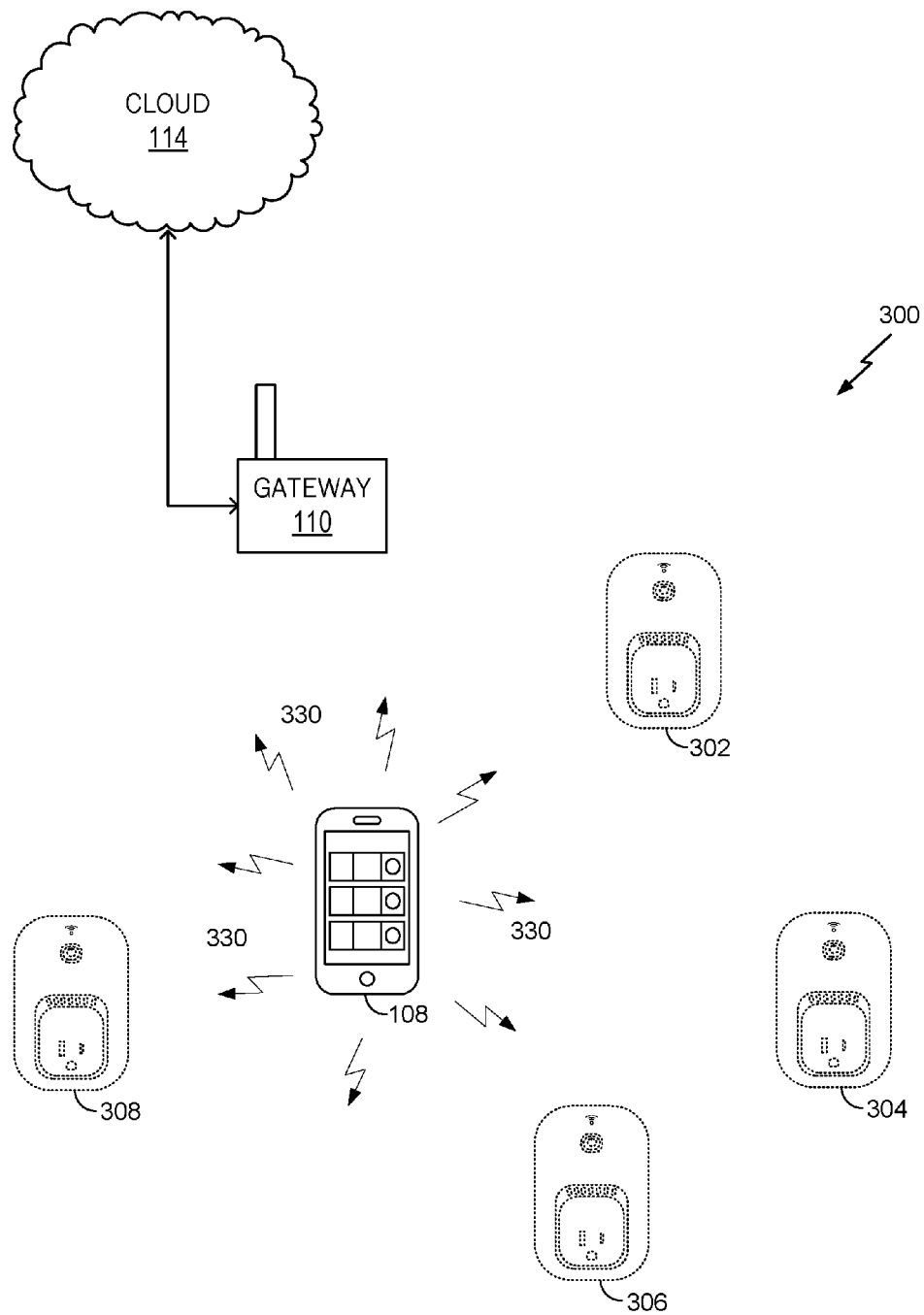
FIG. 3 is an illustration of an example of a network environment, in accordance with some embodiments of the invention.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
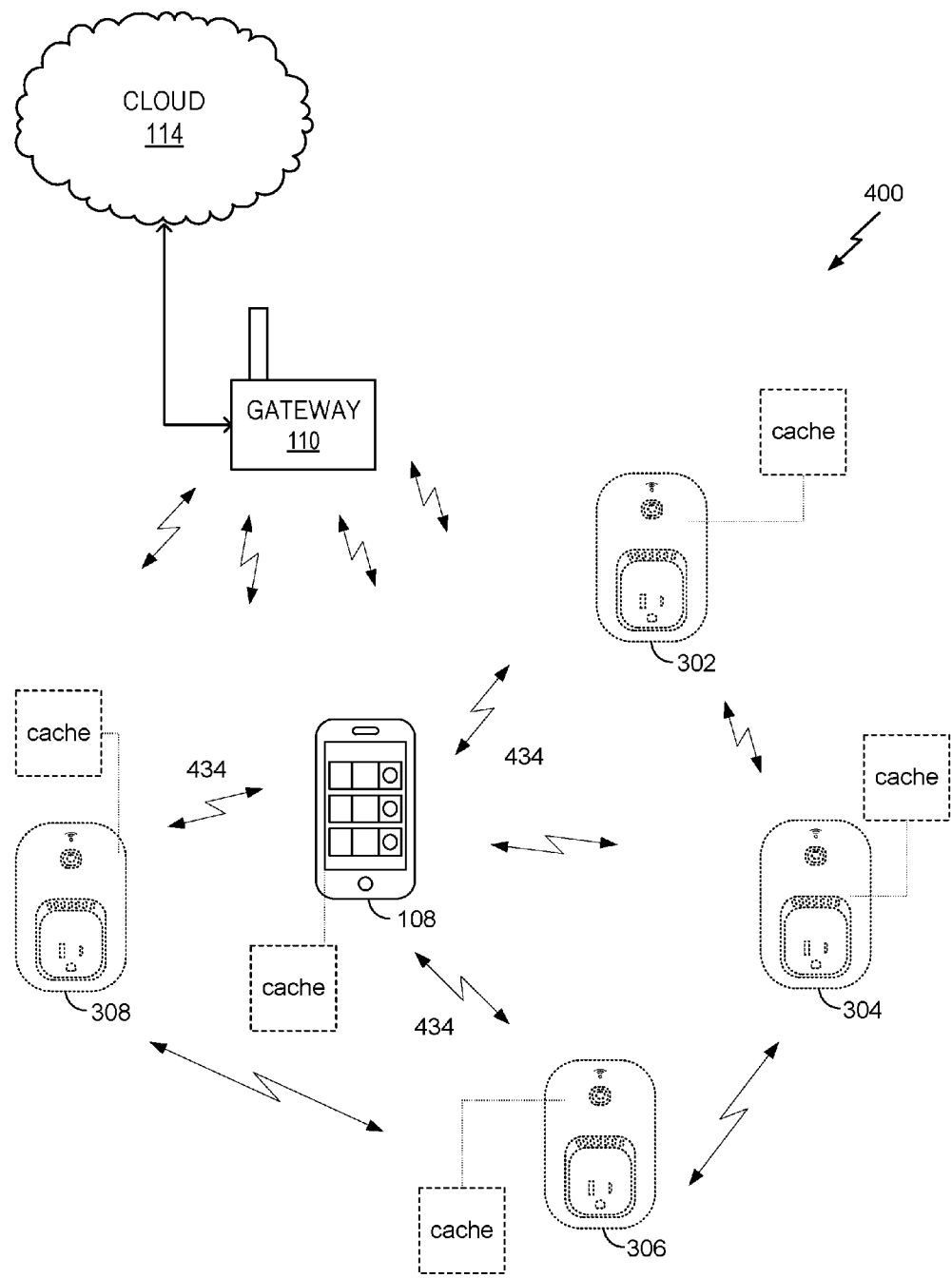
FIG. 4 is an illustration of an example of a network environment, in accordance with some embodiments of the invention.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
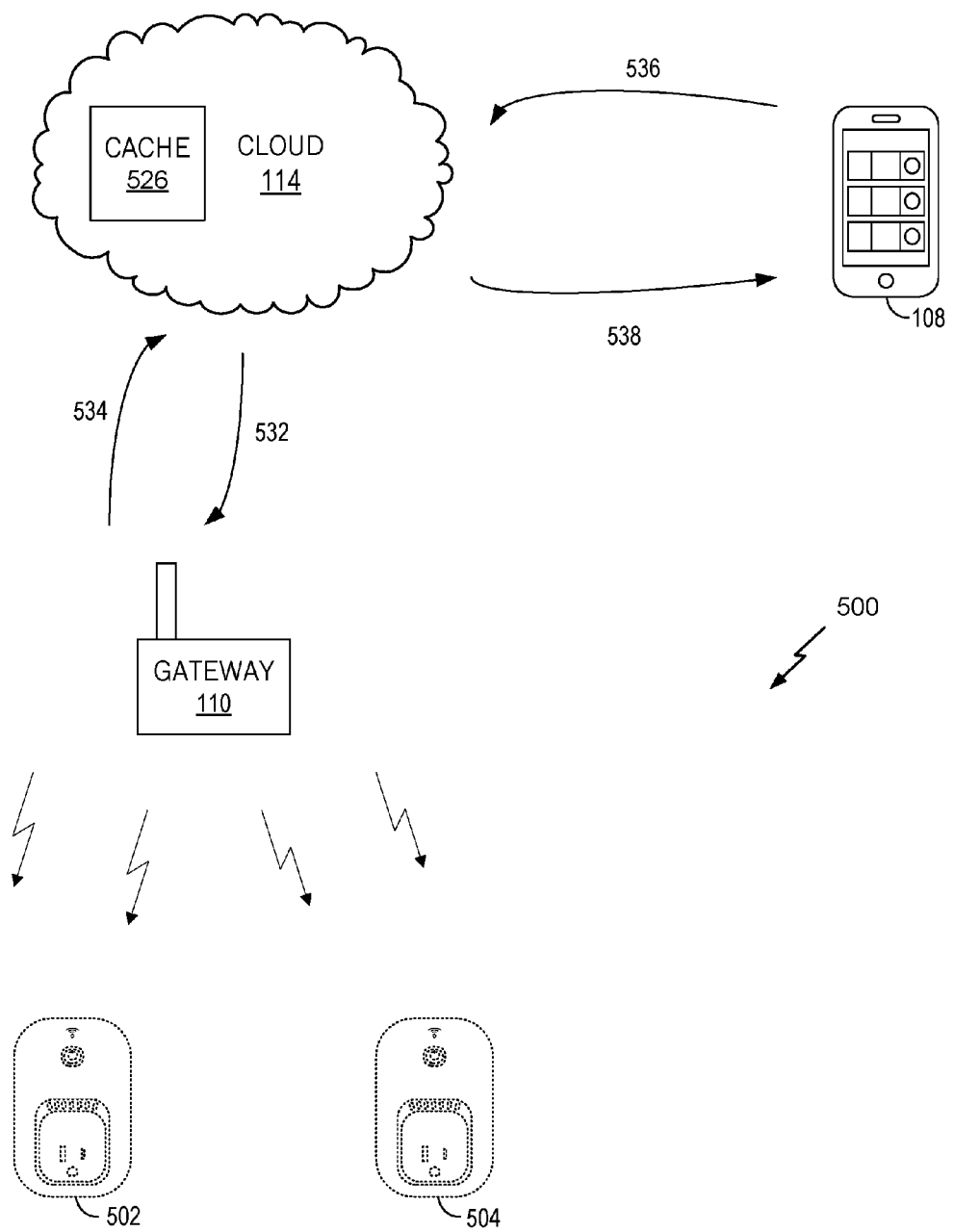
FIG. 5 is an illustration of an example of a network environment, in accordance with some embodiments of the invention.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6:
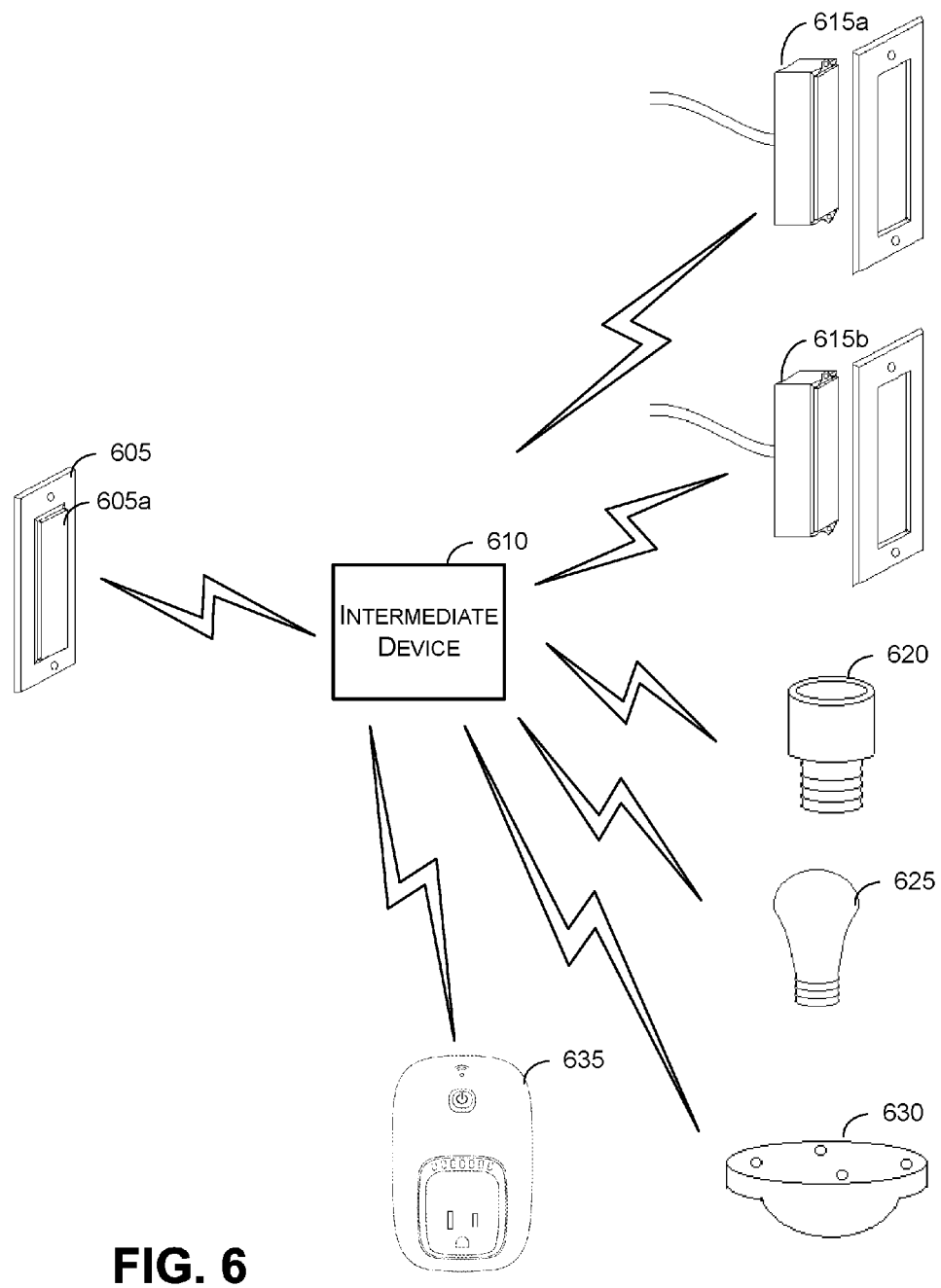
FIG. 6 illustrates exemplary communication channels available to connect network devices.

FIG. 6 illustrates exemplary communication channels available to connect network devices. In the depicted instance, a secondary switch 605 (e.g., a secondary light switch) communicates with one or more other network devices through an intermediate device 610. It will, however, be appreciated that such device communications could instead be direct without involving intermediate device 610 or could involve multiple intermediate devices 610. Communications (e.g., between secondary switch 605 and one or more master devices 615-635, between secondary switch 605 and intermediate device 610 and/or between intermediate device 610 and one or more master devices 615-635) can occur over one or more network or communication channels, such as over the Internet, a short-range network (e.g., Bluetooth, BTLE), a local area network, etc. Each of devices 605-635 can include a transmitter to allow the device to communicate with other devices.

Secondary switch 605 can include a switch with a local power source (e.g., a battery) and/or one not electrically connected to any or select wiring in a building. This reduction in wiring can allow switch 605 to be rather thin. In some instances, secondary switch 605 is connected to circuit wiring for a first light but not for a second light. Secondary switch 605 can be wall-mountable (e.g., being mountable using an adhesive, screws, suction, or nails). In some instances, secondary switch 605 includes an input interface, such as a button, touchscreen, slider or toggle switch. In some instances, secondary switch 605 can detect motion.

A rule can be dynamically defined to associated stimulus detection (e.g., detection of any motion or input stimulus or detection of a particular type of motion or input) with one or more devices and/or one or more state controls. For example, a rule may indicate that pushing a button on device 605 is to cause a light connected to another network device to change its on-off state. In some instances, the rule identifies a group of devices to associate with a stimulus (e.g., to cause each an on-off state of each group device to change upon stimulus detection or to cause an on-off state of each group device to change to or remain in an "off" state). In some instances, a single rule or multiple rules associate various devices and/or state controls with various types of input. For example, a sustained click may have a different effect than a quick click.

Upon detecting a stimulus (e.g., motion or a switch click), a rule can be used to identify one or more master devices 615-635 and one or more state controls associated with the stimulus and/or secondary switch 605. A rule can include one, for example, defined based on user input (e.g., received at an access device). Upon receiving the user input, part or all of the rule (e.g., a part pertinent to a particular device) can be transmitted to one or more individual devices to be locally stored. For example, a communication can be sent to secondary switch 605 that indicates that it is to send signals to a particular master switch upon detecting a stimulus.

Thus, secondary switch 605 can itself determine which master device to send a communication to in response to detecting a stimulus, or it can send a communication to intermediate device 610, which can then identify the master devices that are to receive notification of the stimulus detection (and can also send each appropriate master-device communication). The signal may indicate that a stimulus was detected at another device, that a stimulus was detected at a particular device (e.g., switch 605), that a particular type of stimulus was detected (e.g., double click), a target state (e.g., target status) for the master device (e.g., power state or intensity) or an operation control for the master device (e.g., change power state). A receiving master device 615-635 can process the signal and perform appropriate actions.

A receiving master device 615-635 can include a receiver to receive wireless signals and can be configured to change an operational state (e.g., of a light). In some instances, the operation control can be established via access to electrical wire connections or to a power source. For example, a device may turn a light off by switching a switch to break a circuit.

In some instances, one or more master devices control a light. For example, each of master switches 615a-b may be connected to one or more light sources via building wiring. One or both of master switches 615a-b may be wall mountable and include an input interface configured to receive inputs that influence the operation of the light source. For example, clicking a button may change a power state of the light source. The wireless connection with secondary switch 605 can allow for a more flexible control of the light. Even though secondary switch 605 may not be connected, via wiring, to a light source that is connected to a master switch 615 via wiring, secondary switch 605 can nonetheless exert control on the light via its wireless transmission. Thus, the configuration can simulate a 3-way switch.

A socket adapter 620 can be shaped to include a bottom portion to screw into a socket and a top socket portion to receive a light bulb. In some instances, socket adapter 620 dynamically changes whether an electrical connection through adapter 620 is left unobstructed. For example, bulb adapter 620 can be configured to dynamically cut and resume an electrical connection between the socket and the top socket portion. Thus, for example, if a light bulb were screwed into the underlying socket, it may remain powered on across an entire time period. By being plugged into adapter 620, however, it can be dynamically turned on and off by changing, for example, a contact between the bulb and a conductive path.

In some instances, socket adapter 620 includes the bottom portion to allow a bulb to be securely fastened the socket, but adapter 620 can be configured to block any electrical connection between the socket and a bulb screwed into the socket portion of the adapter 620. Instead, adapter 620 can include its own power source (e.g., a battery), and it can dynamically change whether (and/or an amount of) power is provided to the bulb. Through such configuration, a light fixture can be attached to any location on a ceiling or wall without needing to connect wiring to the fixture. The structural parts of the fixture can be utilized, while adapter 620 can supply power for the bulb.

A smart light bulb 625 may operate similarly. For example, power supplied to an LED, CFL or incandescent light source can be dynamically controlled. The power being supplied can be that provided through a base socket in which the bulb is screwed or power provided by a battery included in the bulb. The latter can be useful in situations where a user would like to install a fixture in a location or position a light in a location not primed with wires.

A light fixture 630 may operate similarly. The fixture can include one or more light sources (e.g., bulbs) and a means to dynamically change power being supplied to the source(s). The power can be that provided by wiring or a local source (e.g., a battery in the fixture). Fixture 630 may be configured to be attached to a wall or ceiling (e.g., via one or more screws or nail, adhesion or suction).

A smart outlet 635 can be configured to provide an electrical outlet that can be dynamically controlled (e.g., to start and stop providing power). In some instances, smart outlet 635 is configured to plug into an outlet (e.g., to itself receive power). In some instances, smart outlet 635 receives power from another source (e.g., a battery). An electrical unit (such as a lamp) can be plugged into smart outlet 635, such that dynamic control of the outlet can dynamically control the device.

Thus, in some embodiments, each of master devices 615-635 can dynamically control a light. Direct or indirect communications between secondary switch 605 and one or more master devices 615-635 can thereby allow secondary switch 605 to also exert control over one or more lights.

Secondary switch 605 depicted in FIG. 6 is illustrative. In the depiction in FIG. 6, the switch includes a single button 605a (or other type of switching element). Pressing button 605a in different manners (e.g., short click, double click, or long click) can, in some instances, be characterized as different types of inputs. Each type of input may be associated with a different rule, such that it produces a different lighting effect (e.g., due an association with a different master device or control).

In various instances, secondary switch 605 may also include a motion detector. Detecting motion may produce a result different than any input or the same as an input. For example, detection of either motion or a short click can cause a signal to be transmitted to a same master device to change a power state of a light source.

It will be appreciated, however, that various other configurations of a secondary switch are contemplated. For example, a secondary switch can include a toggle switch, a rocker switch, a dimmer slider and/or a dimmer knob (e.g., in addition to or instead of the button). In some instances, a secondary switch includes multiple input components, such as two or more toggle switches, buttons, rocker switches, dimmer sliders and/or dimmer knobs.

Secondary switch 605 depicted in FIG. 6 is not a master switch, as it is not electrically connected to and does not include a light source or other operating electrical device. In some instances, however, a secondary switch can also be a master switch. For example, a switch can be wired to control Light A and thus can be a master switch for Light A. A first type of input (e.g., single click) can change a state of Light A (e.g., to be powered on or off). The switch can be electrically separated from Light B but can nonetheless control Light B through wireless transmission, such that it is a secondary switch for Light B. A second type of input (e.g., a long click), for example, can change a state of both Light A and B.

Figure 7A:
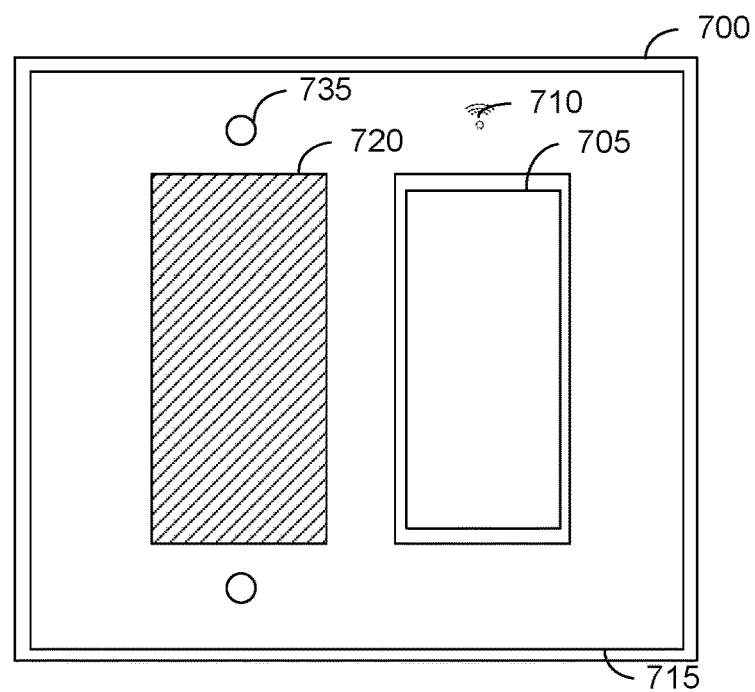
FIGS. 7A-7B illustrate another network device that includes a secondary switch that is coupled to a master switch.
Figure 7B:
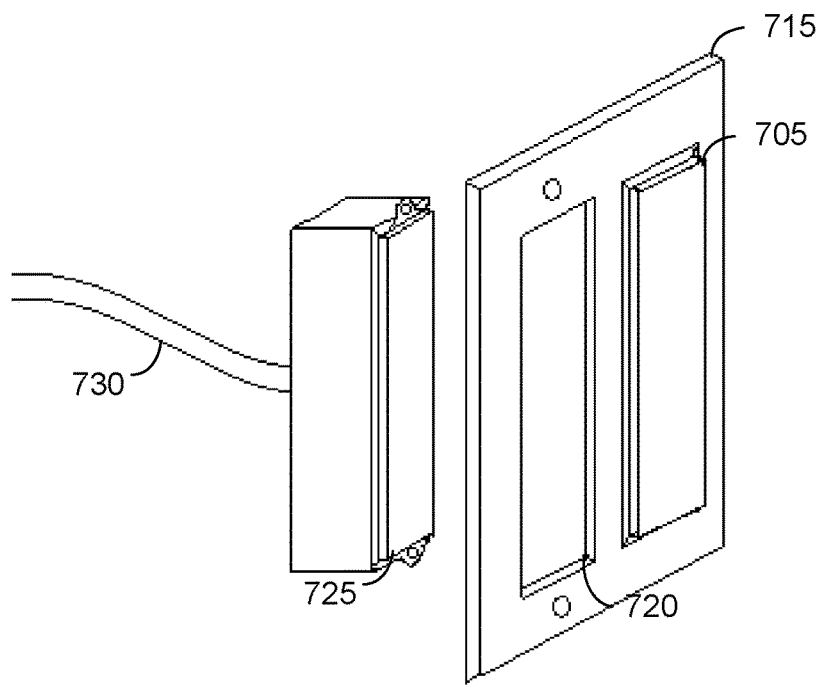

FIGS. 7A-7B illustrate another network device 700 that includes a secondary switch that is coupled to a master switch. Network device 700 includes a switching element 705 (e.g., button) to receive one or more types of inputs. Switching element 705 can be electrically separate from lighting circuit wiring. Detection of a button press can cause a signal to be sent from the secondary switch to another master device. In some instances, a communications signal indicator 710 can indicate whether the secondary switch has access to a communication signal, such as a WiFi signal, or is on a network. For example, communications signal indicator 710 may include a light source (e.g., a LED) that illuminates when the secondary switch is connected to a communications signal. The light source may depict different colors or other characteristics (e.g., flashing, dimming, or the like) to indicate different levels of signal strength or mode of operation.

Switching element 705 can be coupled to a switch panel 715. For example, in some instances, switching element 705 and panel 715 are affixed and contiguous, such that they cannot be easily separated. As another example, switching element 705 may be configured to be removably or permanently inserted into panel 715 (e.g., by popping switching element 705 into an aperture of panel 715 or screwing the pieces together). Depending on the embodiment, various components of a secondary switch may be integrated into an input-receiving or motion-detecting device or component (e.g., one including switching element 705) or into panel 715. For example, panel-less button piece (e.g., including switching element 705) and/or panel 715 can include a wireless transmitter and/or a data store storing rules.

In the depicted instance, panel 715 can support two switches. Depending on the embodiment, panel 715 can be configured to restrict a type of switches it supports (e.g., such that one or both of the switches must not be a master switch or such that one or both of the switches must be a master switch) or it can be configured to accept multiple switch types.

In FIG. 7A, panel 715 includes an aperture 720 to receive another switch. For example, another non-master secondary switch (e.g., including another button or other type of switching element) can be popped into the aperture (or otherwise attached to panel 715) or a master switch can be attached to the panel. For example, as shown in FIG. 7B, a master switching element 725 attached to lighting circuit wiring 730 can be inserted into aperture 720. A wiring box for master switching element 725 can be positioned to be behind a wall, such that a button on the master switching element 725 and switching element 705 protrude a similar distance from the wall. In some instances, master switching element 725 includes a transmitter to, e.g., receive communications from one or more secondary switches or other devices. In some instances, master switching element 725 and/or a secondary switch including switching element 705 do not include a transmitter (e.g., when it is included in panel 720).

A secondary switch can be configured to attach to a wall. For example, an input-receiving or motion-detecting device or component (e.g., one including switching element 705) can be configured to be screwed into, nailed into, adhered to or suctioned onto a wall. As another example, panel 715 can be configured to attach to a wall. For example, panel 715 can include one or more cover plate holes 735. Because panel 715 can restrict a relative location of an input-receiving or motion-detecting device or component (e.g., one including switching element 705), attaching panel 715 to a wall (e.g., after or before a secondary switch is attached to the panel) can also attach the secondary switch to the wall.

As illustrated in FIG. 7B, a panel and/or secondary switch can be thin. For example, one or both of the panel and secondary switch can have a thickness or less than 3, 2, 1 or 0.5 cm. A height and/or width of the panel and/or switch can vary and depend on factors such as a number of switches partly housed by a panel, a type of switch, etc. In one instance, a width of a switch is at least about ⅛, ¼, ½, 1, 2 or 3 inches and less than about ½, 1, 2, 3, 6 or 12 inches. In one instance, a height of a switch is at least about ½, 1, 2, 3, 4 or 6 inches and less than about 2, 3, 6 or 12 inches. In one instance, a width of a panel is at least about 1, 2, 3, 6 or 12 inches and less than about 2, 3, 6, 12 or 18 inches. In one instance, a height of a panel is at least about ½, 1, 2, 3, 4 or 6 inches and less than about 2, 3, 6 or 12 inches.

Figure 8:
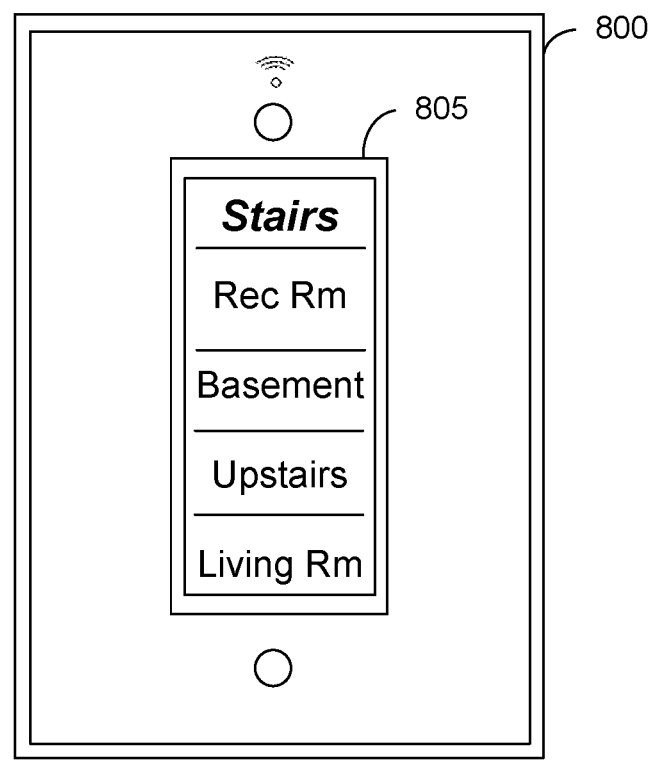
FIG. 8 illustrates a network device with a virtual interface.

FIG. 8 illustrates a network device 800 with a virtual interface. Device 800 includes an interactive display 805 that can include one or more virtual options or buttons. In the depicted scenario, display 805 includes five options. In this instance, each option corresponds to a home location, and each home location can correspond to one or more lights. For example, pressing the "stairs" option can cause one light bulb in one light fixture in a stairwell to change its on-off state, pressing the "basement" option can cause all lights in all light fixtures to turn to a particular power state (and a second press could cause the particular power state to reverse), pressing the "living room" option can cause two bulbs in one light fixture in the living room to change its power state, etc.

In one instance, one option is temporarily selected. For example, "stairs" may be a default option that is initially selected upon detecting motion or input (e.g., a tap on the display). A user can then slide another option to a top of the display to temporarily select that option. Another input (e.g., a tap on the display or a press of a button on device 800) can cause the selected option to be confirmed and one or more lights associated with the option to be controlled.

In one instance, tapping an option causes display 805 to change to show information and/or detailed options pertaining to the tapped option. For example, tapping "rec rm" can cause a screen to be displayed that indicates that there are 4 light fixtures in the rec room, 2 of which are on, and present options to change the power state (and/or light intensity) of individual lights and/or to cause all lights to be set to a same identified power state (and/or light intensity).

Frequently, it is desired to collocate controls. For example, a set of switches can be positioned near an entrance of a front door or a room. Secondary switches can be useful for such aims as they can prevent the need to run many wires to the location. However, having multiple individual switches in a similar location can be unaesthetic and appear as though the switch positioning was uncoordinated. Thus, some embodiments provide devices that allow a secondary switch to be positioned along with one or more other switches in a same panel. Panel 715 in FIGS. 7A-7B is one example.

Figure 9:
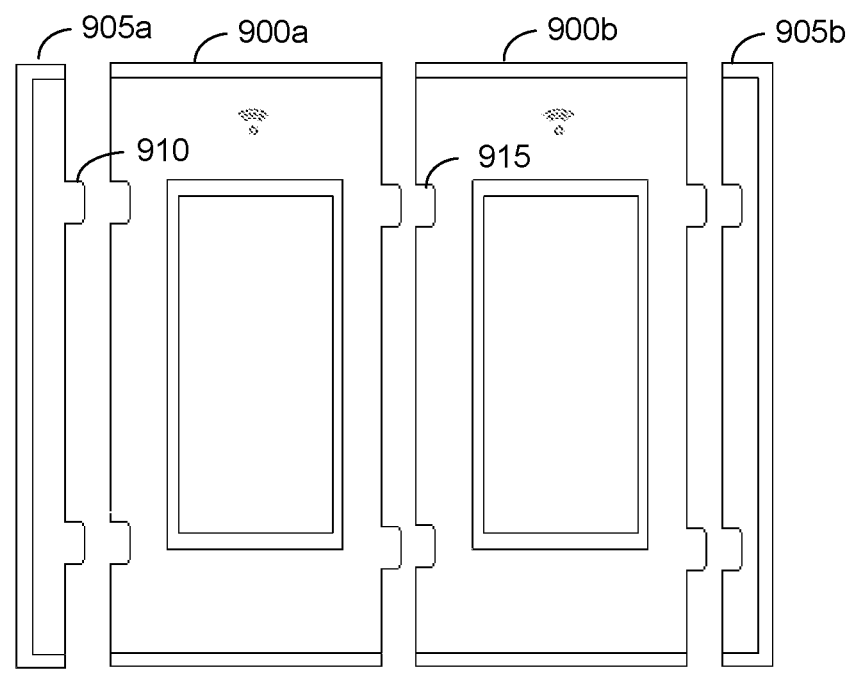
FIG. 9 illustrates a connectable panel. In this instance, two switch components are provided along with two end components.

FIG. 9 illustrates a connectable panel. In this instance, two switch components 900*a-b* are provided along with two end components 905*a-b*. Each switch component 900*a-b* includes an input interface, which, in the illustrated case, includes a button. Each switch component 900*a-b* can include a master switching element and/or a secondary switching element. Components can be configured to attach together via interlocking tabs 910 and holes 915. Thus, a user can connect together and arrange as many switches as desired.

Figure 10:
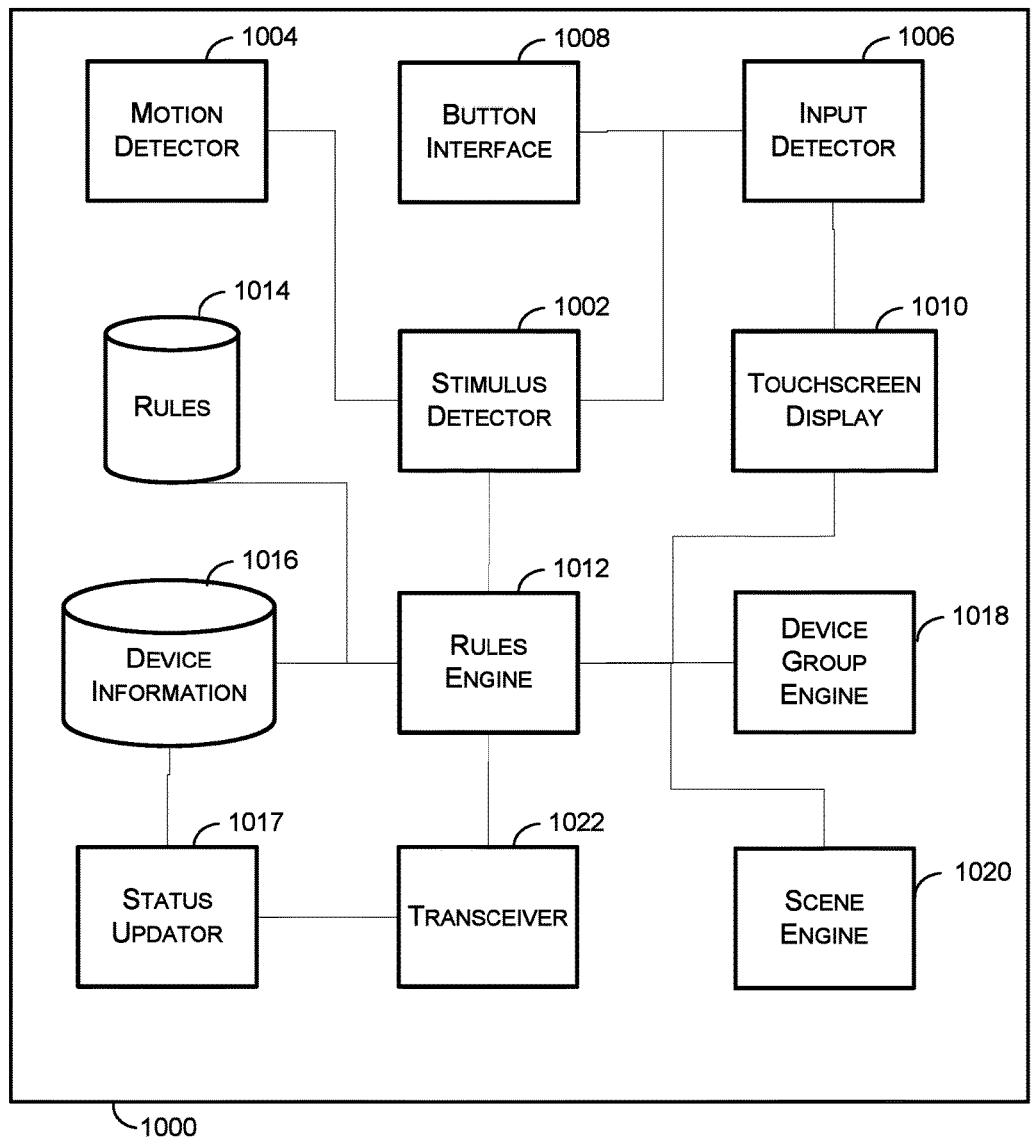
FIG. 10 shows a block diagram of a secondary switch system according to an embodiment of the invention.

FIG. 10 shows a block diagram of a secondary switch system 1000 according to an embodiment of the invention. Part or all of system 1000 can be included in a secondary switch device, a gateway device, a remote server, a router and/or a master switching element device. In some instances, multiple devices can each include part or all of a depicted component. For example, each of a secondary switch device and a master switching element device can include a rules engine 1012 and rules data store 1014.

Secondary switch system 1000 includes a stimulus detector 1002 that detects a stimulus, such as user input and/or motion. Stimulus detector 1002 can be connected to, or can include, a motion detector 1004 and/or an input detector 1006. Motion detector 1004 can be configured to detect motion and can include, for example, a passive or active sensor, such as an optical, microwave or acoustic sensor. In some instances, motion detector 1004 emits a signal (e.g., microwave radiation, radio waves and/or an ultrasonic signal) and measures disturbances to the signal. Motion detector 1004 can include a passive infrared sensor or a camera. Motion detector 1004 can compare a sensor measurement (or processed version thereof, such as a change in a sensor measurement in time or relative to a baseline average) to a threshold.

Input detector 1006 can be configured to detect user input received at an input interface. An input interface can include a mechanical input interface, such as one that includes switching element, such as a button, switch, lever, slider or knob. The input interface can then be configured to detect mechanical manipulation (e.g., via a switch or rotary encoder). For example, an input interface can include a button interface 1008 that includes one or more buttons and one or more switches under each button. Pressing a button can cause the switch to change positions, which can allow button interface 1008 to detect the button press. In some instances, releasing a button also causes the switch to change positions, such that short and long presses can be distinguished. In instances where multiple buttons are provide, button interface 1008 can identify which button was pressed.

An input interface can alternatively or additionally include a virtual input interface. For example, a touchscreen display 1010 can be provided to present visual stimuli. The visual stimuli can be, for example, presented in response to a detection of motion, a mechanical input (e.g., button press) or a touch on the display. The visual stimuli can present one or more options, such as an option to change a state (e.g., power state) of one or more lights. Touchscreen display 1010 can detect a user's touch and can map the touch to the presentation, such that a selected option can be identified.

Upon detecting a stimulus (e.g., an input or motion), stimulus detector 1002 can notify a rules engine 1012 of the stimulus (e.g., indicating that a stimulus was detected, identifying a type of stimulus, identifying a mapping of a stimulus (e.g., to a lighting option), etc.). Rules engine 1012 can access and/or manage a rules data store 1014 that includes one or more rules identify one or more actions to be performed responsive to stimuli. Rules can be generated based on user input (e.g., input received at a network device, such as a secondary or master switching element system; an access device; or a gateway device).

Rules can identify, for example, one or more trigger conditions and one or more response actions. For example, a rule can indicate that detection of any input received at Switch A is to cause a light controlled by Switch A to change its power state. As another example, a rule can indicate that a multi-click input received at Switch B is to cause Switch B to transmit a communication to Switch C alerting it of the input, and that Switch C is to then change a power state of a light wired to Switch C. As illustrated by the last example, a rule can include a compound rule that identifies multiple actions to be performed. A compound rule can be parsed to identify device-specific rules that can be stored in a rules data store 1014 at particular devices. For example, Switch B can store a rule that it is to respond to a multi-click input by sending a communication to Switch C, and Switch C can store a rule that it is to respond to a communication from Switch B by changing a power state of a connected light.

A rule can indicate that one device is to communicate with one or more other devices (e.g., a particular device or one meeting a criterion). A device information data store 1016 can maintain information about devices. For example, device information data store 1016 can include information for each device presented in a network, connected to a gateway device, or associated with a user account. Information can include an identification of or a reflection of, for example, a device type (e.g., switch, bulb, outlet), a device characteristic, an associated network, a current status, a current or previous electrical load (e.g., whether it is connected to any lights), a location and/or a current or previous connectivity strength.

A particular network device may be configured to receive status updates from one or more other network (e.g., master) devices. In some instances, a network device may receive status updates from all other network devices in a network or from all other network devices in a network of one or more particular types or having one or more particular characteristics. In some instances, a network device may receive status updates from one or more particular other network devices, such of those involved in a rule applicable to the instant network device. For example, if various types of inputs received at Switch A are to trigger (conditionally or unconditionally) state changes at Switches B, D and F, Switch A may be subscribed to receive status updates from those switches. As another example, if a first type of input received at Switch A is to trigger a state change at Switch B when Switch B is "off", and if a second type of input received at Switch A is to unconditionally trigger a state change at Switch C, Switch A may be subscribed to receive status updates from Switch B. In some instances, a type of status updates to be received can vary across subscriptions and/or devices (e.g., to receive connection-strength updates from all devices and state updates from select devices).

A status updator 1017 can receive status updates via a transceiver 1022 and can update device information data store 1016 to reflect the updates. In some instances, other devices push status updates (e.g., upon detecting a change or at routine time intervals). In some instances, status updator 1017 requests a status of each of one or more devices (e.g., upon detecting any input, upon detecting an input of a type associated with the other device, or at defined times or time periods). A first device can receive status updates from a second device directly from the second device or via an intermediate device (e.g., a gateway device, cloud server or other network device). A status update can be received via a network such as, for example, a WiFi network, short-range network, or local area network.

In some instances, rules engine 1012 can use a rule to identify one or more devices to involve in a communication. For example, upon Switch A detecting a stimulus, rules engine 1012 (located at Switch A or at a remote device) can identify that Switch B is to be alerted of the stimulus or is to be sent a communication with an instruction to perform an action (e.g., conditionally or unconditionally changing its state). In some instances, the rule specifically identifies the one or more devices, and rules engine 1012 can retrieve information (e.g., a destination address, a communication channel, a current status, etc.) about the particular devices from device information data store 1016. In some instances, the rule identifies one or more characteristics of the devices (e.g., each "switch" device located in the "living room"). Rules engine 1012 can then search device information data store 1016 for devices matching the one or more characteristics and can retrieve information about the matching devices.

Determining whether a communication is to be transmitted at all responsive to a stimulus, which master device is to receive a communication, a master device associated with a stimulus and/or contents of a communication (e.g., a state-control instruction) can depend on a status variable of one or more devices. Thus, rules engine 1012 may retrieve status information for one or more devices from device information data store 1016 and use the status information to evaluate a rule. For example, a rule can indicate that a communication is only to be sent when a current state of a master device differs from a target state associated with a detected stimulus. To illustrate, a particular stimulus may be associated with an "off" target state for one or more devices. In some instances, a communication is only send to the one or more devices when at least one device is not in an off state, or a communication is only sent to the devices in the one or more devices that are not in an off state. As another example, status information may reflect a network connectivity strength, and rules engine 1012 can refrain from generating and/or transmitting a communication when a local connectivity strength or a master-device connectivity strength is below a threshold. As another example, a rule can include a functional rule, such as one that associates a stimulus with one or all devices having one or more particular characteristics (e.g., a load or being located in a room). Thus, status information can indicate which device(s) satisfy functional criteria in the rule so as to serve as a master device.

Rather frequently, it may desirable that a particular set of devices be similarly operated. For example, it may be convenient to synch an on-off state of all lights in a given room, or to have the ability to turn off all lights in a floor or a house. Thus, a device group engine 1018 can define "groups", with each group including a set of devices. A group can be automatically defined (e.g., by clustering devices of a same or different types that are spatially clustered) or defined based on user input. A group can be defined to include multiple individual devices (e.g., Switches A, D and E) and/or devices meeting particular criteria (e.g., all Switches located in a basement room). Each group can be assigned a name (e.g., as designated by a user), such that a user can easily refer to the group. Device information data store 1016 can store data indications of group assignments for particular devices. A rule can then refer to a group, such that (for example) a stimulus causes each group device to change its on-off state or to ensure that it is in an off state. By using a group structure, changing a group's definition (e.g., by adding a new device) can have an effect of automatically changing any and all rules relating to the group, rather than needing to modify each individual rule.

A scene engine 1020 can also create one or more scenes. A scene can include a plurality of actions or to be performed by one or more devices. An action can include, for example, changing a power state (e.g., on/off, or a power level). Actions can occur concurrently and/or sequentially. For example, a scene may indicate that Switch A is to turn a light on for 30 seconds and then turn off. As another example, a scene may indicate lights wired any of Switches B-G are to gradually turn on over a 15-second time interval. Device information data store 1016 can store data indications of scene assignments and related actions for particular devices. A rule can then refer to a scene, such that (for example) a stimulus causes each scene device to act according to the scene.

Through evaluation of a rule, rules engine 1012 can identify one or more devices to receive a stimulus-responsive communication and further (in some instances) identify appropriate content for the communication. For example, a communication may include a simple ping, may include an identifier of a device having detected the stimulus, may identify a target state (e.g., powered on or off or a lighting level), may identify an action (e.g., change power state), may identify a scene participation (e.g., a sequence of actions), etc. A communication can be sent (e.g., wirelessly) over a communication channel by a transmitter or transceiver 1022.

In some instances, a receiving device can use a local rule to identify an appropriate action given the communication. For example, a receiving device can identify a communication as being from a particular switch, and can retrieve a rule applicable for that switch that a communication is to trigger a change in power state.

Thus, it will be appreciated that different devices will use different complementary rules or different portions of a rule. For example, a complete rule can indicate that Switch A is to respond detection of any button press by sending a communication to Switch B and that Switch B is to respond to any communication from Switch A by changing its power state to "off" if its current power state is "on" (and to remain in the "off" state otherwise). In some instances, network devices include rules to, in response to detecting a stimulus, transmit a communication (e.g., which may identify a type of input) to an intermediate device. An intermediate device can include a rules data store that includes a rule pertaining to the detecting network device. The intermediate device can evaluate the rule and identify another network device to communicate with and an action that the network device is to perform.

In some instances, a rules data store at each of Switches A and B includes the same rule, but the switches retrieve different rule portions pertinent to them. In some instances, a rules data store at each switch includes only the portion of the rule pertinent to the corresponding switch. Thus, various embodiments rely on individual network devices storing current versions of rules. A network device can generate a rule based on locally received user input or can receive rules or rule portions from another device (e.g., another network device, a gateway device, an access device or a cloud server). As one example, a device having generated a rule can transmit part or all of the rule to another device involved with the rule. As another example, a device can monitor for new devices (e.g., new devices of a particular network or new devices detectable on a particular communication channel) and can transmit rules or rule portions to newly detected devices (e.g., upon determining that a newly detected devices is not stored on the device or regardless).

Figure 11:
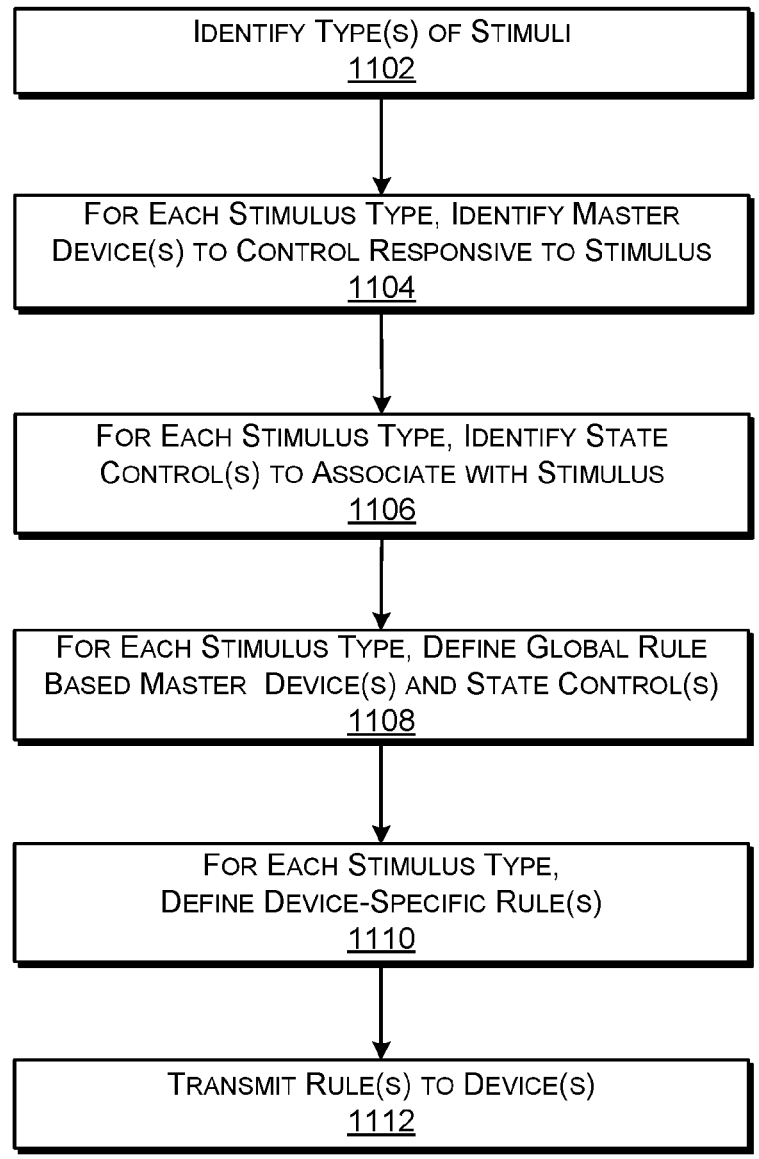
FIG. 11 illustrates an example of a process for defining a rule for responding to stimuli detected (e.g., at a particular device) according to an embodiment of the invention.

FIG. 11 illustrates an example of a process 1100 for defining a rule for responding to stimuli detected (e.g., at a particular device) according to an embodiment of the invention. Part or all of process 1100 can be performed, for example, by the cloud network 114, an access device 106, a gateway 110 or 112, or a network device 102, 104 or 106 (e.g., which can include a master and/or secondary switch). Process 1100 can apply to one or more devices. For example, process 1100 can be performed at a particular network device or after detecting a selection of a network device, and the process (and a rule produced therefrom) can then apply to that device. As another example, process 1100 can be performed for all network devices (e.g., in a network or connected to a particular gateway device) or all network devices of a given type (e.g., all switches or all secondary switches).

Process 1100 begins at block 1102 where one or more types of stimuli are identified. The one or more types of stimuli can correspond to types of stimuli that one or more devices are capable of detecting. Identifying a type of stimulus can include identifying a particular component of an input interface (e.g., a particular button, switch, slider, or virtual button) or motion detector and/or identifying a type of input or motion. For example, a device with three buttons but without a touchscreen may not be able to detect virtual inputs but may be able to detect individual presses of each button. In one instance, at least one type is identified based on device information (e.g., a first device may be able to detect and distinguish a short button click, a long button click and motion, and a second device may be able to detect and distinguish a switch location and whether the location changed). In some instances, a stimulus type can be partly defined by a user. For example, a stimulus type can be defined to correspond to a temporal sequence of input (e.g., 4 clicks or a click sustained for at least 5 seconds).

For each stimulus type, one or more master devices are identified at block 1104. The master devices can include a device physically connected (e.g., via wiring or device component or device inclusion) to a light source or other functioning electrical device (e.g., a device that can be plugged into an outlet). The one or more master devices can include those that will have a conditional or unconditional action to perform in response to detection of a stimulus of the stimulus type. The one or more master devices can be identified based on user input. For example, a set of master devices can be presented, and a user can select one or more to respond to stimuli of the stimulus type. In some instances, the one or more master devices can be automatically identified. For example, a secondary switch and master switching element can be pre-paired to each other. In some instances, a particular device configured to detect a stimulus of the stimulus type and trigger evaluation of a rule is itself a master device. In such instances, the one or more master devices identified for one or more stimulus types may, or may not, include the particular device.

At block 1106, for each stimulus type, one or more state controls are identified to associate with the stimulus type. In one instance, a single state control can be identified for all devices in the one or more master devices. For example, in response to a click of Button #2, a control can indicate that all of the identified master devices are to change to an "off" state. In one instance, a state control can be identified for each device in the one or more master devices (e.g., such that an upstairs living room light is to turn off and a downstairs rec room light is to turn off).

Exemplary state controls can include changing or maintaining a state to an "on" state, to an "off" state or to a state with a particular intensity. A state control can include changing a state to an opposite state. For example, a control can indicate that if a switch is on, it is to turn off and that if the switch is off, it is to turn on. A state control can include a duration. For example, a state control can indicate that a device is to remain in a particular state for a defined time period or until another stimulus (e.g., of a specified type) is received. A state control can include changing a state of a first device based on a current, past or target state of a second device. For example, if a control can indicate that Switch A is to respond to a stimulus by reversing its on-off state, and that Switch B is to match its on-off state to that of Switch A (after the reversal). In some instances, a state control includes controlling a light color.

At block 1108, a rule can be generated for each stimulus type based on the identifications of the master device(s) and state control(s). A rule can be of an if-then form, where the "if" corresponds to a detection of a stimulus of the stimulus type (e.g., at a particular device or at a device in a set of devices). The rule may or may not identify a device involved in the detection. For example, identifying which device is to detect a particular stimulus to thereby trigger evaluation of the rule may not be needed if the rule generation occurs on that particular device. The "then" can identify the state controls to one or more state controls to be effected by one or more master devices.

Rule generation and/or master-device identification can result in generation of a device subscription. The subscription can cause a secondary device associated with the rule to receive updates of a status of the master device (e.g., directly from the master device or through an intermediate device). Thus, for example, the secondary device may be informed when a power state of the master device changes.

In some instances, one or more device-specific rules can be generated at block 1110. One device-specific rule can pertain to stimulus detection, which can specify (for example) a type of stimulus for which detection will trigger an action. The same device-specific rule can identify how the detecting device is to respond to the detection. For example, the response can include sending a communication to each of one or more master devices, sending a communication to an intermediate device (e.g., a gateway device or cloud server) and/or changing its own state (if it is also a master device identified for the rule).

In instances where the detecting device is to transmit a communication, the device-specific rule may, or may not, further specify what information to include in the communication. For example, information may include identification of the detecting device, a state control that a receiving device is to perform and/or an identification of the type of the detected stimulus. Thus, in some instances, a stimulus-detection rule can also include information about an appropriate master-device response to the stimulus. As another example, a communication can lack information pertaining to the stimulus (e.g., and can include a simple ping) or can be generated according to a technique generally applicable to the device or a set of devices.

In some instances, a stimulus-detection rule includes a communication-transmission condition. For example, a rule can indicate that a communication is only to be transmitted if a master device is in a particular state. For example, if an effect of a button click is to turn Light A off, but Light A is already off (as determined based on stored and dynamically updated statuses of networked devices), it may not be necessary to transmit a communication to a switch controlling Light A.

One device-specific rule can pertain to state-control performance and can pertain to a master device. The rule can identify, for example, how to determine which state control a master device is to perform based on which device detected a stimulus or sent a communication, an identified type of stimulus and/or other information.

One device-specific rule can pertain to an intermediate performance. For example, one or more stimulus-detection rules may instruct one or more devices to respond to particular stimuli by transmitting a communication (which can identify a detecting device and/or type of stimulus) to an intermediate device. The intermediate-performance rule can then be used to identify one or more master devices that are to respond to the stimulus, determine whether to transmit a communication to each identified master device (e.g., based on a current status of the device) and/or determine content for a communication.

At block 1112, one or more rules are transmitted to one or more devices. The one or more devices can include all network devices, all network devices of a particular type, or one or more devices involved in the rule(s), such as a stimulus-detecting device, a master device and/or an intermediate device. The one or more rules can include the rule defined at block 1108 and/or one or more device-specific rules. In one instance, a global or general rule is transmitted to the one or more devices. Thus, for example, for a rule that indicates that any input detected at Secondary Switch A is to cause Master Switch B to change its on-off state, a same rule can be transmitted to and/or stored at each of Switches A and B. The switches, however, can analyze the rule to identify their appropriate and distinct involvement with the rule.

Figure 12A:
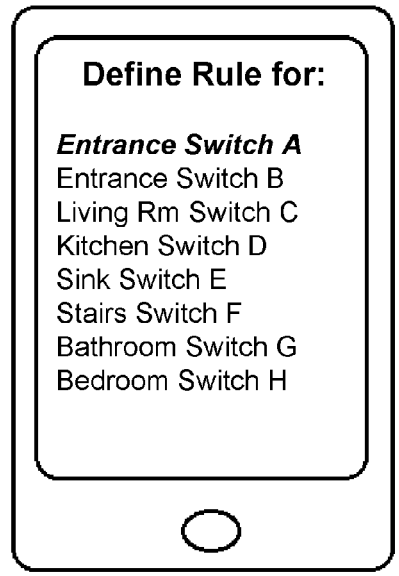
FIGS. 12A-12F illustrate a series of example interfaces at a device (e.g., an access device) for receiving user input to define a rule according to an embodiment of the invention.

FIGS. 12A-12F illustrate a series of example interfaces at a device (e.g., an access device) for receiving user input to define a rule according to an embodiment of the invention. As shown in FIG. 12A, a set of devices for which a rule can be defined can be presented. Each identified device can be one that, for example, can serve as a secondary device to detect a stimulus and subsequently influence operation of another device. In the depicted illustration, each identified device is a switch device and is identified both based on room location and letter. In this example, a user selects "Entrance Switch A".

Figure 12B:
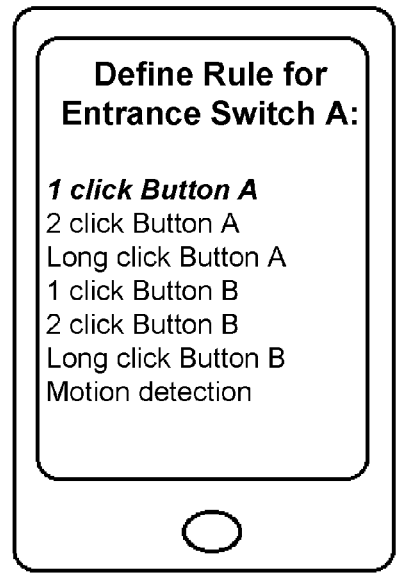

A presentation shown in FIG. 12B identifies the type of stimuli that can be detected by Entrance Switch A. Entrance Switch A includes two buttons (A and B), each of which can detect and distinguish between a single click, a double click and a long click. Switch A can also detect motion. In this example, a user selects "1 click Button A" such that detection of this type of stimulus will serve as a trigger for the rule.

Figure 12C:
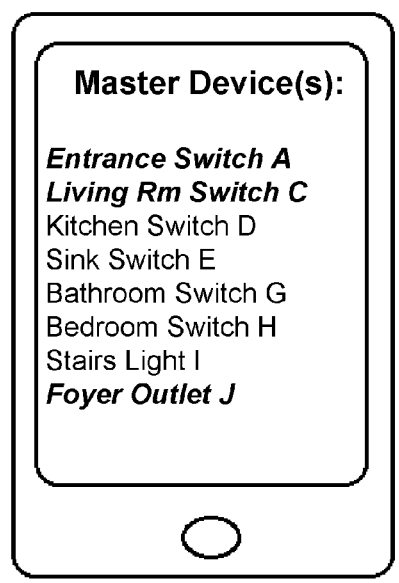

A presentation shown in FIG. 12C identifies a set of master devices. The list can include, for example, all network devices, all master network devices, all network or master devices of a specific type and/or all network or master devices detected as currently or previously having a load. In this example, Entrance Switch B and Stairs Switch F are omitted from the list, as they are not master devices electrically connected to a load. In this example, a user selects three master devices: Entrance Switch A, Living Room Switch C and Foyer Outlet J.

Figure 12D:
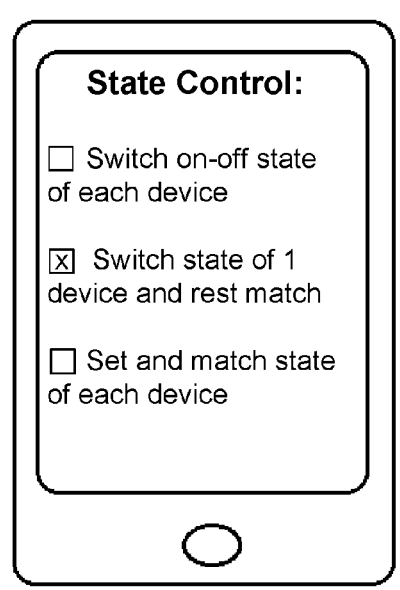
Figure 12E:
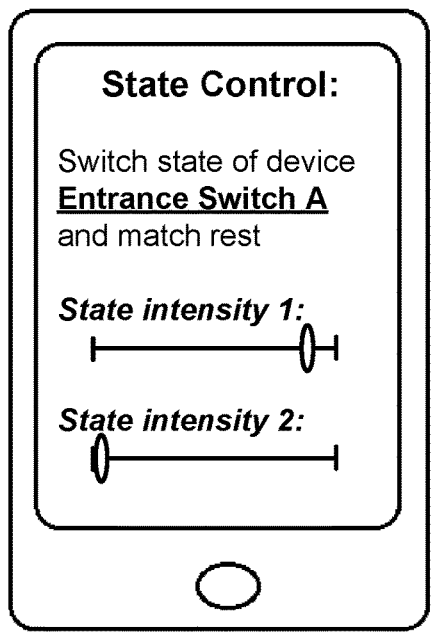

A presentation shown in FIG. 12D identifies potential types of state control. A first option would cause each master device to change its on-off state. Thus, if just prior to detection of a Button A click, the Entrance Switch is on and the Living Room Switch is off, selection of the first option would cause the Entrance Switch to turn off and the Living Room Switch to turn on. A second option is to cause one of the devices' states to switch from a current state to an opposite state and for the rest of the devices to switch to or stay in the opposite state. A third option is to cause all of the devices to enter a particular state (e.g., each device to change to or stay in an "off" state). In this example, a user selects the second option.

The second option requires identification of which device will govern the other devices' states. A presentation in FIG. 12E allows a user to select this device (e.g., by clicking on "Entrance Switch A" which can cause identifications of each identified master device to be presented in, for example, a pull-down menu). The presentation further allows a user to select an intensity for each of two opposing states. The presentation includes two sliders. In this example, a user has set one slider to 90% along the first slider and 0% along the second slider.

Figure 12F:
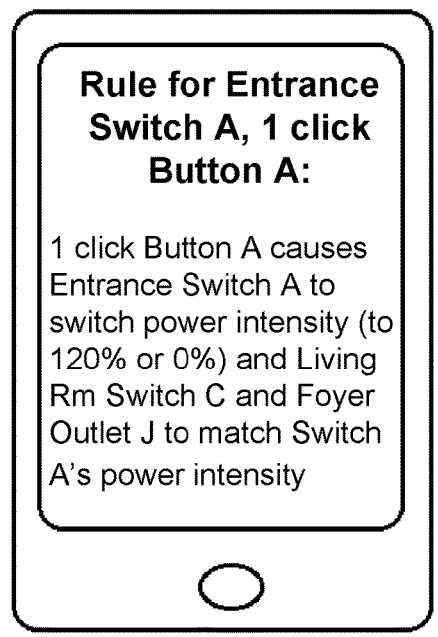

A presentation shown in FIG. 12F identifies a rule based on the provided inputs. Specifically, when a single click of Button A is detected at Entrance Switch A, it can cause a state of Entrance Switch A to change. When Switch A is in an on state, it will change to an off state and the converse. When it changes to an on state, the intensity will be 120%, and when it changes to an off state, the intensity will be 0%.

The living room switch and foyer outlet will also change (if needed) to match Switch's A updated state. A user can be presented with an opportunity to confirm or modify the rule. Upon confirmation, the rule can be sent to one, more or all network devices.

FIGS. 12A-12F illustrate how input in a secondary switch can cause a state of the same switch to change (e.g., when the secondary switch is also a master switch) and/or a state of one or more other devices (e.g., switches) to change. In some instances, detection at a device of a stimulus of one stimulus type can control a state of the same device, and detection at the device of a stimulus of another stimulus type can control a state of another device.

The presentations at one or more of FIGS. 12A-12F may be initiated based on, for example, user input and/or automatic detection. For example, a user can provide input corresponding to a request to define a rule, after which the presentation of FIG. 12A may be shown. As another example, an automatic detection can detect that a new device joined a network, that a device on a network is not associated with a rule triggered by at least one type of input that can be received at the device (or with any rule), or that a characteristic (e.g., location) of a device changed. The automatic detection can, in some instances, correspond to identifying a device (and, in some instances, an input type), which can cause a presentation such as one shown in FIG. 12B or 12C to be shown.

Figure 13:
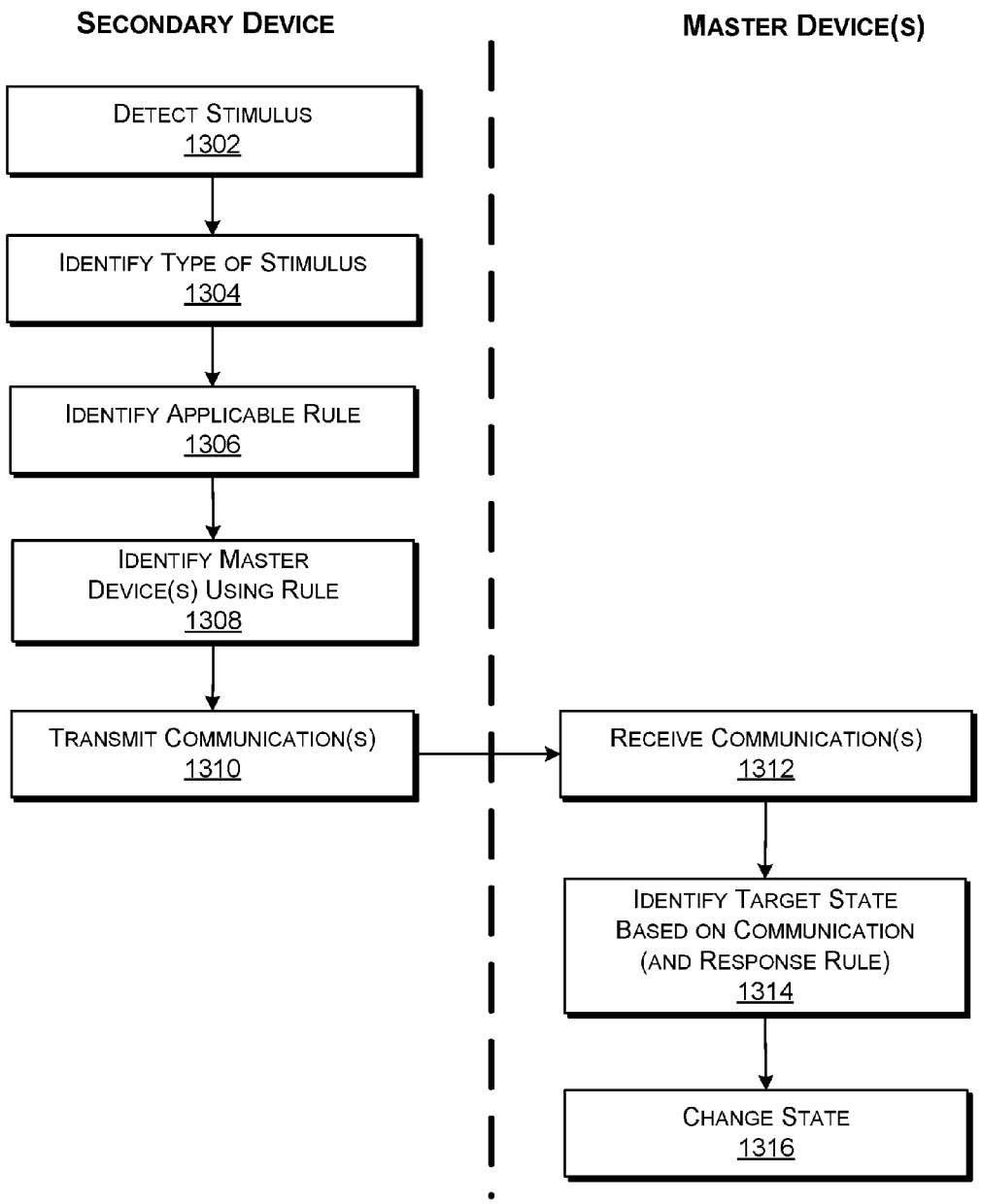
FIG. 13 illustrates an example of a process for changing a state at a master device in response to detection of a stimulus at a secondary device according to an embodiment of the invention.

FIG. 13 illustrates an example of a process 1300 for changing a state at a master device in response to detection of a stimulus at a secondary device according to an embodiment of the invention. Part or all of process 1300 can be performed, for example, by a secondary network device and a master network device (e.g., one or both of which can be a switch, such as a light switch).

Process 1300 begins at block 1302 where a stimulus is detected at a secondary device. The stimulus can include an input or motion. In some instances, the stimulus includes mechanical input, such as a push of a button, toggle of a switch, movement of a slider, etc.

At block 1304, the secondary device identifies the type of stimulus. For example, the secondary device can determine whether the stimulus was a motion stimulus or an input stimulus and/or identify a type of input (e.g., which input-interface component was interacting with and/or how an input-interface component was interacted with).

At block 1306, the secondary device identifies a rule (which can include a rule portion) that is applicable to the type of stimulus. The rule can be retrieved from a local rules data store (e.g., by searching for a rule referring to the stimulus type and/or retrieving a current version of a rule that may or may not be specific to stimulus types) or requested from another device.

At block 1308, one or more master devices are identified using the rule. The master device(s) can include those that are to conditionally or unconditionally control a state or perform an action in response to detection of the stimulus. The identification can include identifying information needed to communicate with the device, such as a communication channel and/or destination address. In some instances, the secondary device is itself an identified master device.

At block 1310, a communication is (e.g., wirelessly) transmitted. In some instances, the communication is transmitted to each identified master device (unless a given master device is the same as the secondary device). In some instances, the communication is conditioned based on a condition specified in the rules. For example, the communication can be conditioned upon determining whether the master device will need to affirmatively respond to the communication. For example, if a rule indicates that a master device is to respond to a stimulus by entering an "off" state, but it is already in the state, the communication can be skipped. The condition can depend on, for example, a state of a master device, a state of a secondary device, a time, a connection strength, etc.

The identified master device(s) receive the communication(s) at block 1312 and identify an appropriate state control and/or other action based on the communication at block 1314. In some instances, the communication specifies the appropriate state control and/or other action. In some instances, a master device can use a response rule (e.g., which may be the same as, complementary to or different than and non-complementary to the rule identified in block 1306) to determine the appropriate state control and/or other action. For example, a response rule can indicate that a particular device is to respond to any stimulus-detection communication by changing a switch state.

At block 1316, the master device(s) perform the appropriate actions and/or effect the appropriate state control. Block 1316 can result in a change in intensity in a light connected to or part of a master device.

Process 1300 illustrates a technique whereby secondary and master devices directly communicate. It will be appreciated that the process can be modified to include an intermediate device. For example, the secondary device can perform blocks 1302 and 1304 (and optionally blocks 1306 and/or 1308) and transmit a communication to an intermediate device. The intermediate device can optionally perform blocks 1306 and/or 1308 and can optionally modify the communication or generate a new communication (e.g., to include new information, such as a master-device operation instruction) and can send the modified or new communication to the master device.

Such embodiments can reduce a need for network devices to evaluate rules, as secondary devices can blindly send stimulus-detection alerts to the intermediate device and master devices can perform instructions from communications. However, such embodiments also may introduce additional delays and network-interruption susceptibilities.

Figure 14:
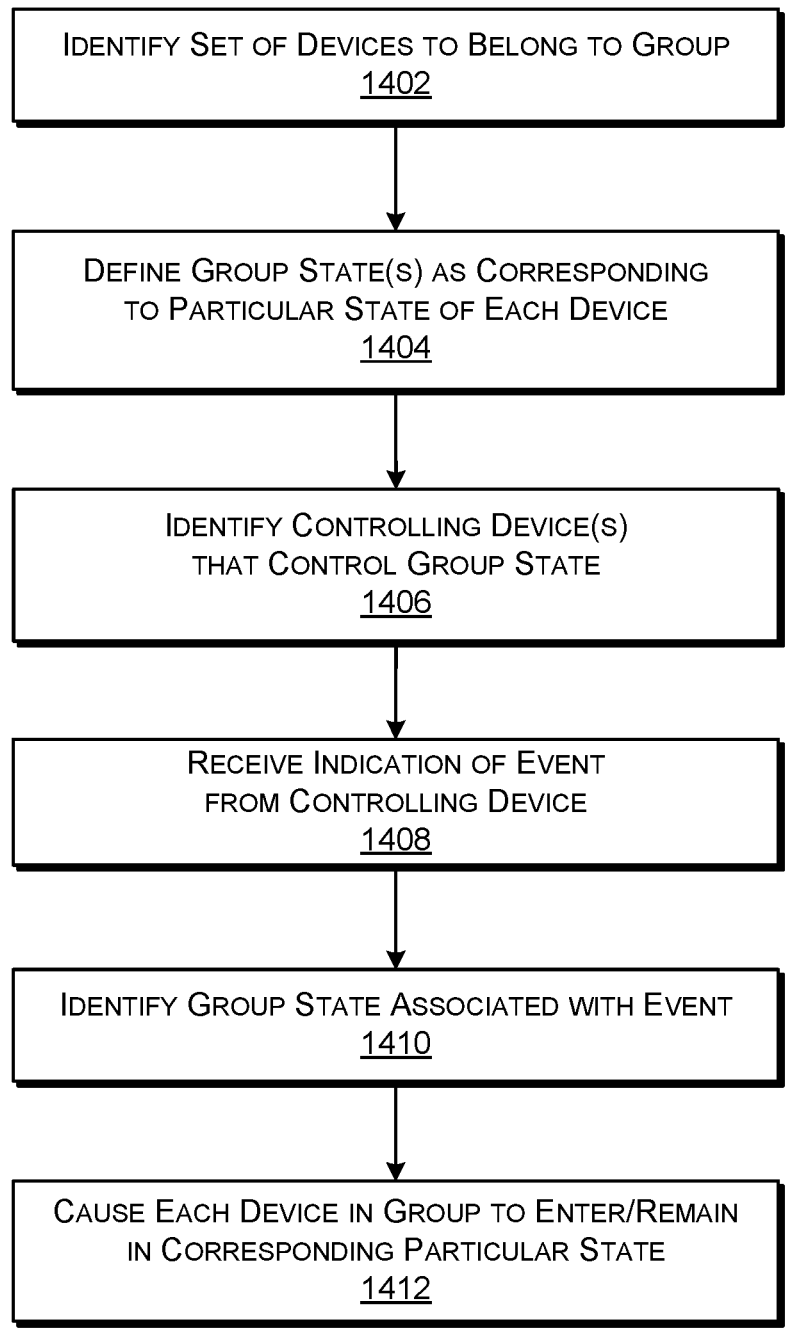
FIG. 14 illustrates an example of a process for defining and using a device group according to an embodiment of the invention.

FIG. 14 illustrates an example of a process 1400 for defining and using a device group according to an embodiment of the invention. Part or all of process 1400 can be performed, for example, by the cloud network 114, an access device 106, a gateway 110 or 112, or a network device 102, 104 or 106 (e.g., which can include a master and/or secondary switch). Process 1400 can be applicable to one or more devices. For example, a group can initially be defined at a first device (e.g., an access device) but a second device (e.g., a network device or intermediate device) could use the group while defining or evaluating a rule.

Process 1400 begins at block 1402 where a set of devices are identified for a group. The devices can be identified based on user input or automatically. For example, each of some or all devices on a network (e.g., associated with a network ID) can be identified in a presentation. A selection of specific devices can be received. As another example, the set of devices can include those associated with a same room, within a given distance from each other, on a same floor and/or of a same device type.

In some instances, block 1402 includes identifying specific devices. In some instances, block 1402 includes identifying devices having a particular characteristic, such as devices located in a given room, located on a given floor, having a particular functionality, being connected to a particular type of load or having a particular state. Thus, the group can be dynamic, with devices being added to or removed from the group as characteristics change, new devices are detected and/or old devices cease to be detected.

At block 1404, one or more group states are defined. For example, an "on" state and an "off" state can be defined. Block 1404 can include setting a name for the state and identifying any details as to how each device is to perform upon entry into the group state. For example, block 1404 can include identifying, for all device or for each of one, more or all devices, an intensity and/or time duration for the state. In some instances, a given group state corresponds to same or similar states for each device in the group. For example, a group "off" state can correspond to a 0% intensity for each group device. In some instances, states for group devices can differ. For example, a group "on" state can correspond to a 100% intensity for one group device but an 80% intensity for another group device.

The group can be used during rule generations. For example, one group can correspond to all lights in the basement, and one group can correspond to all lights on the main level. Rules can then be generated to easily control states of lights in either or both groups without needing to individually select or identify each individual lights. Thus, group definitions can facilitate rule generations.

At block 1406, one or more devices that control a state of the group are identified. Block 1406 can include searching for rules with responses to stimulus detections that involve the group.

At block 1408, an indication that an event occurred can be received from the controlling device. The event can include a trigger set forth in a rule involving the group. The event can include a stimulus (e.g., input or motion) detection. In some instances, block 1408 includes receiving an instruction to enter a particular group state or change a group state.

At block 1410, a group state associated with the event is identified. The group state can be identified by, e.g., analyzing a communication received that included the event indication and/or evaluating a rule. For example, block 1410 can include querying a rules data store to locate a rule identifying an appropriate response to receiving a communication from a particular device requesting group action.

At block 1412, each device in the group is caused to enter or remain in the appropriate state for that device corresponding to the group state. In some instances, each group device will enter or remain in a same or similar state.

In some instances, rules referring to a device group are converted to also or alternatively refer to individual devices. This may be an ongoing effort in situations where a group is dynamic. In such instances, process 1400 may be modified such that, rather than identifying a group state associated with an event, a state for each of one or more group devices is identified according to a rule.

Figure 15:
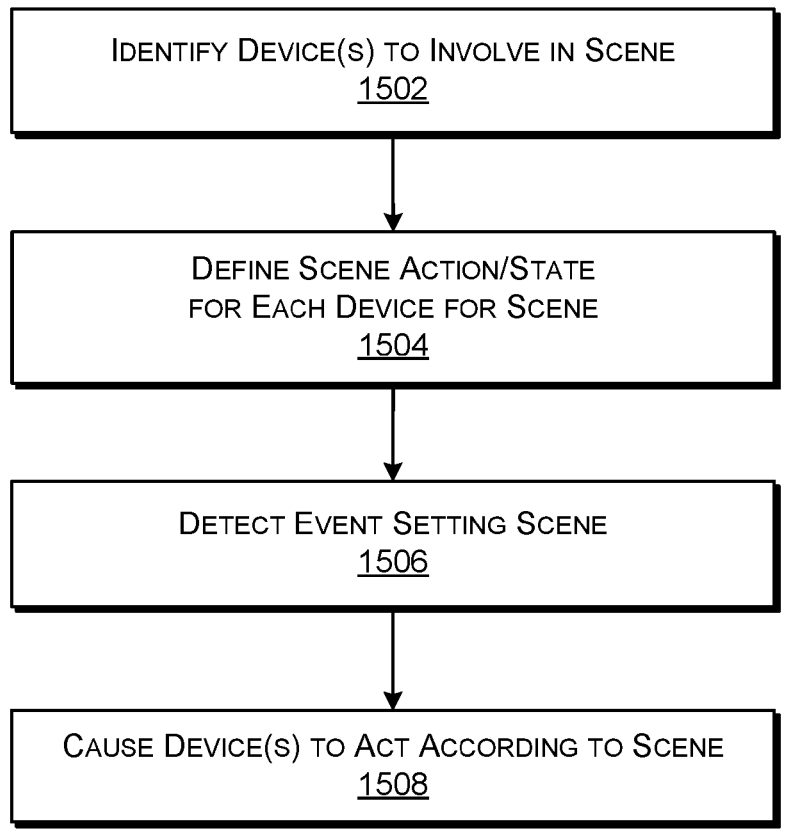
FIG. 15 illustrates an example of a process for defining and using a scene according to an embodiment of the invention.

FIG. 15 illustrates an example of a process 1500 for defining and using a scene according to an embodiment of the invention. Part or all of process 1500 can be performed, for example, by the cloud network 114, an access device 106, a gateway 110 or 112, or a network device 102, 104 or 106 (e.g., which can include a master and/or secondary switch). Process 1500 can be applicable to one or more devices. For example, a group can initially be defined at a first device but a second device could use the group while defining or evaluating a rule.

Process 1500 begins at block 1502 where a set of devices are identified for a group. The devices can be identified based on user input or automatically. For example, each of some or all devices on a network (e.g., associated with a network ID) can be identified in a presentation. A selection of specific devices can be received. As another example, the set of devices can include those associated with a same room, within a given distance from each other, on a same floor and/or of a same device type. As another example, devices routinely receiving time-correlated input and/or detecting motion can be automatically identified.

At block 1504, a state and/or action (e.g., state-control action) is identified for each identified device. Block 1504 can include setting a name for the scene and identifying any details as to how each device is to perform for the scene. For example, a scene definition can indicate that a particular device is to be in an "ON" state. In some instances, block 1504 includes identifying a temporal characteristic, such as a duration that a device is to remain in a state and/or a delay that is to occur before the device enters a state.

The scene can be used during rule generations. For example, one or more rules can identify a variety of detections that can cause the scene to be initiated, and the details of the scene need not be repeatedly defined (or modified).

At block 1506, an event that initiates the scene is detected. In some instances, block 1506 includes detecting a stimulus. In some instances, block 1506 includes receiving a communication (e.g., from a detecting device), which may or may not identify the scene.

At block 1508, an action associated with the scene is caused to be initiated at each device involved in the scene. For example, a communication can be sent to each device identifying the scene or a scene action or state. As another example, a device involved in the scene can enter or remain in a scene state or perform a scene action (which can include a sequence of actions).

Thus for example, a scene could be defined to sequentially light up lights from a foyer and living room to a kitchen. The scene could further include turning on a stereo and adjusting a thermostat. A rule can indicate that an input at a particular foyer switch is to initiate the scene. Another rule can indicate that detection of motion by a switch positioned at an entry from a garage is to initiate the scene. Detection of either event can cause communications to be transmitted to devices involved in the scene and for the devices to perform appropriate actions.

Figure 16:
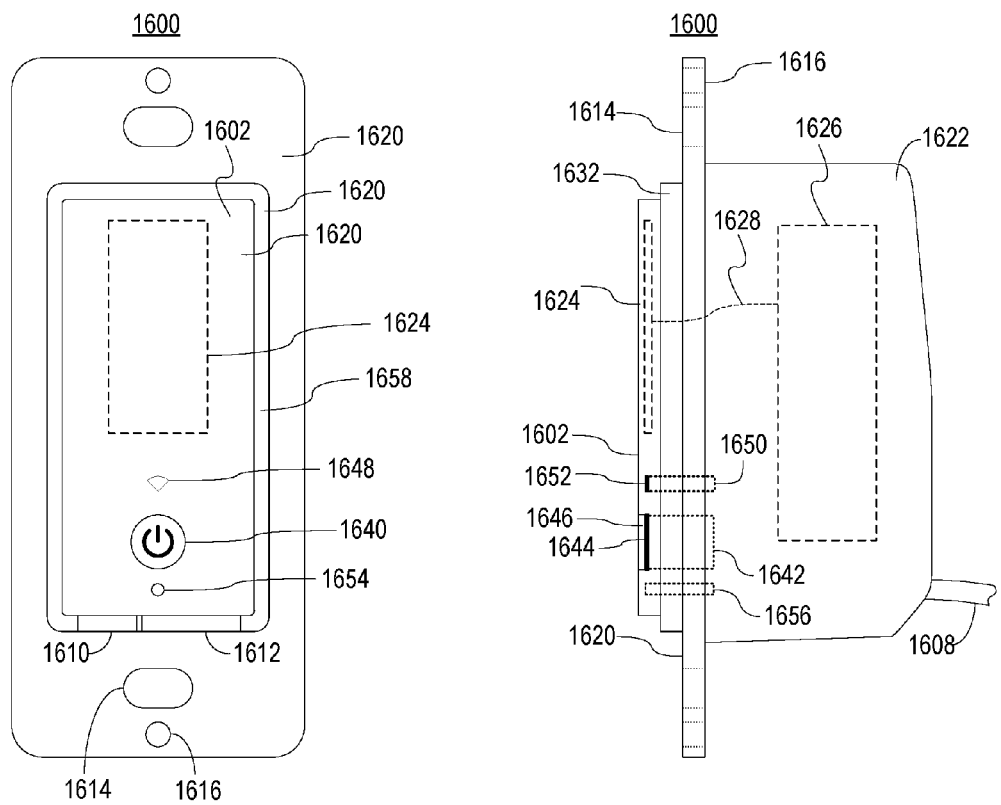
FIG. 16 is an illustration of an example of front and side views of a network device, in accordance with an embodiment of the invention.

FIG. 16 illustrates example views of a network device 1600, with the left panel showing a front view and the right panel showing a side view. Network device 1600 is stylized as an in-wall light switch style structure. The network device 1600 may include any of the network devices 102, 104, or 106 described herein. In some embodiments, the network device 1600 may be a home automation network device. For example, the network device 1600 may include a home automation switch that may be coupled with a home appliance. A user may access the network device 1600 in order to control, and/or configure various home appliances located within the user's home. The user may access the network device 1600 remotely (e.g., wirelessly). For instance, the user may remotely control appliances such as a television, radio, light, microwave, iron, space heater, wall A/C unit, washer, dryer, fan, and/or the like.

In some embodiments, the network device 1600 may include a WiFi enabled switch that connects home appliances and other electronic devices to a compatible 802.11b/g/n/ac WiFi network. The network device 1600 may thus allow users to locally or remotely turn devices on or off from anywhere, program customized notifications, and/or change device status, position, speed or level, among other types of control. The network device 1600 may further allow a user to create custom schedules or have devices respond to sunrise or sunset, indoor or outdoor temperature, audio level, light level, sensor conditions, etc.

The network device 1600 can include a main switching element 1602 (e.g., a power switch) that may be depressed in order to change a power state of an electrical device drawing power through network device 1600. In the embodiment shown in FIG. 16, main switching element 1602 is configured similar to a decorator style rocker switch, but with a push-button (e.g., momentary) configuration instead of a two-state (i.e., on/off) configuration. Other configurations of a main switching element 1602 can be used. The room-facing wall 1620 (e.g., which can include a panel, such as panel 715) can include one or more main switching elements 1602, some of which may be used to send a wireless signal and/or command from the network device 1600 instead of used to change the power state of an electrical device drawing power through the network device 1600.

In some embodiments, one or more light sources may be integrated with or located behind the room-facing wall 1620, such as behind a main switching element 1602. For example, a light-emitting diode (LED) may be located on a circuit board under the main switching element 1602. The light source may be illuminated when the network device 1600 is providing power to the electrical device, and may not be illuminated when the network device 1600 is not providing power to the electrical device. In the embodiment shown in FIG. 16, main switching element 1602 is configured similar to a decorator style rocker switch, but with a push-button configuration instead of a two-state (i.e., on/off) configuration. Any display can be presented using a light source and optionally one or more of a light pipe to direct the light source, a mask to provide a user-recognizable pattern to the light source, and a lens.

In other embodiments, a variable level switch, such as a dimmer type switch, is provided on room-facing wall 1620 of network device 1600. In further embodiments, a touch screen display, is provided on room-facing wall 1620 of the network device 1600, such as to allow a multitude of user inputs, such as to control and program network device 1600. Including a touch screen display on network device 1600, for example, optionally provides for the ability to use network device 1600 as both a network device (102, 104, 106) and an access device 108.

The network device 1600 further includes a communications signal indicator 1604. The signal indicator 1604 may indicate whether the network device 1600 has access to a communications signal, such as a WiFi signal. For example, the signal indicator 1604 may include a light source (e.g., a LED) that illuminates when the network device 1600 is connected to a communications signal. The light source may depict different colors or other characteristics (e.g., flashing, dimming, or the like) to indicate different levels of signal strength or mode of operation.

The network device 1600 includes a restore button 1610. The restore button 1610 may allow a user to reset the network device 1600 to factory default settings. For example, upon being depressed, the restore button 1610 may cause all software on the device to be reset to the settings that the network device 1600 included when purchased from the manufacturer.

Resetting these settings to factory default can include removing wireless access settings (e.g., SSID, password, and others), network IDs, security keys, saved rules, stored names and/or images, user settings, and other information.

In some embodiments, the restore button 1610 can respond only to certain predetermined patterns of being depressed, such as press-and-hold, multiple presses, or multiple presses and hold. In some embodiments, the restore button 1610 can respond to different patterns of being depressed with different results, such as restoring the network device 1600 to factory defaults when the button is pressed and held for a certain length of time (e.g., five seconds), but only removing the wireless access settings (e.g., not removing saved rules, stored names, and/or stored images) when the button is pressed five times in quick succession and then held for ten seconds. In some embodiments, the restore button 1610 can be used to only reset the user-defined rules and/or other user-defined settings of the network device 1600, without removing any wireless access settings, for example if a user desired to use the network device 1600 within the same network, but for a different purpose (e.g., moving the network device 1600 to a different room).

The restore button 1610 can be located on the room-facing wall 1620 such that the button is readily accessible by a user while the network device 1600 is installed in a wall. In one embodiment, the restore button 1610 is located inline with a bezel 1658. The restore button 1610 can be shaped to follow the contour and shape of the bezel 1658 so as to remain unobtrusive. The main switching element 1602 can extend past the bezel 1658 so that the restore button 1610 is not inadvertently pressed.

The network device 1600 also includes a restart button 1612. The restart button 1612 may allow a user to cycle the power of network device 1600. For example, upon being depressed, the restart button 1612 may cause the network device to reboot, simulating disconnection from and reconnection to line power (e.g., an electrical supply). In some embodiments, the restart button 1612 can physically disconnect power to one or more elements (e.g., processors) of the network device 1600. In other embodiments, the restart button 1612 can simply provide a reset signal to one or more elements (e.g., processors) of the network device 1600 to cause such elements to restart.

The restart button 1612 can be located on the room-facing wall 1620 such that the button is readily accessible by a user while the network device 1600 is installed in a wall. In one embodiment, the restart button 1612 is located inline with the bezel 1658. The restart button 1612 can be shaped to follow the contour and shape of the bezel 1658 so as to remain unobtrusive. The main switching element 1602 can extend past the bezel 1658 so that the restart button 1612 is not inadvertently pressed.

The restore button 1610 and restart button 1612 can each be located on a user-facing surface (e.g., the room-facing wall 1620) of the network device when the network device is recessed in a structure (e.g., mounted in a wall or in an electrical box).

The network device 1600 further includes electrical terminals 1608, here depicted as wires extending from the back of network device 1600 and coupled to electrical box-facing wall 1622, for connection to line power, for providing electrical power to network device 1600, and for providing switchable electrical power to an electrical device. In some embodiments, a variety of electrical terminals are useful, including electrical wires, screw terminals, barrier terminals, push-in terminals and the like. Various electrical codes may dictate which electrical terminal types are required or permitted for network device 1600. Electrical terminals 1608 allow the network device 1600 to be connected to line power providing 200V, 120V, or the like. In turn, an electrical device, such as an outlet, socket, light fixture or appliance, may be connected to network device 1600. Once the network device 1600 is registered according to the techniques described above, a power state or other controllable aspects of the electrical device connected to the network device 1600 may be controlled by a user using an access device (e.g., access device 108).

The network device 1600 includes a housing configured to be installed in an electrical box, similar to the placement of conventional light switches and electrical outlets. Mounting apertures 1614 are included for attaching the network device 1600 to an electrical box, such as an electrical box located inside a wall. Cover plate holes 1616 are included for attaching a wall plate over network device 1600, similar to the attachment of a switch/wall plate over a conventional light switch or electrical outlet. The front view of the network device 1600 in the left panel of FIG. 16 shows room-facing wall 1620 of network device 1600. Room-facing wall 1620 of the network device 1600 and electrical box-facing wall 1622 of the network device 1600 are both shown in the right panel of FIG. 16.

The network device 1600 includes a wireless antenna 1624 mounted on room-facing wall 1620. In the embodiment shown, the wireless antenna 1624 is positioned below a room-facing surface 1621 of main switching element 1602, so the wireless antenna 1624 is not visible to a user when looking at the room-facing wall 1620 of network device 1600. Room-facing surface 1621 is opposite wall-facing surface 1623 of main switching element 1602 (i.e., wall-facing surface 1623 faces towards the inside of network device 1600). A circuit board 1626 is positioned within network device 1600 to include various components, such as a data processor and wireless transceiver. A transmission line 1628 connects the wireless antenna 1624 to the wireless transceiver on the circuit board 1626. In some embodiments, the transmission line 1628 is a coaxial cable, providing an electrically shielded radio frequency transmission line between the wireless antenna 1624 and the wireless transceiver. When network device 1600 is mounted in an electrical box placed in a wall, the wireless antenna 1624 will be positioned at least partially in front of a plane defined by the room-facing surface of the wall. This configuration provides the network device 1600 with the capability of reducing or minimizing interference for wireless transmissions between the wireless antenna 1624 to a wireless access point, gateway or other wireless device due to the wall, electrical box or associated building materials.

In some embodiments, the wireless antenna 1624 can be a three-dimensional wireless antenna. The three-dimensional wireless antenna can provide superior reception of polarized radio signals. In some embodiments, multiple wireless antennas, that are positioned a distance apart, can be used to improve upon reception when one of the antennas is located in a null path.

In one instance, a power display 1640 can be illuminated to indicate that the network device 1600 is providing power to the electrical device and can be turned off to indicate no power is being provided to the electrical device. The power display 1640 can comprise a light source located on a circuit board under the main switching element 1602, and can optionally include one or more of a light pipe 1642, a mask 1644, and a lens 1646.

The light pipe 1642 can be used to keep excess light from spilling in undesired directions. The light pipe 1642 can be a hollow piece of black plastic, a fiber optic tube, or any other suitable structure. The mask 1644 can block portions of the light source in order to create a pattern. For example, the mask 1644 of a power display 1640 can be shaped to give the light a user-recognizable power button shape. The mask 1644 can be incorporated into the lens 1646. The lens 1646, with or without a mask 1644, can be incorporated into room-facing wall 1620, such as the main switching element 1602.

The network device 1600 can include a network status display 1648 that provides information about the status of the network device's 1600 network connectivity, such as wireless connectivity and signal strength. The network status display 1648 can include a light source, a light pipe 1650, and a mask 1652. The mask 1652 can provide a shape to the light, such as the shape of concentric arcs gradually increasing in size, signifying radiating radio waves. Without a lens or other opening, the light from the network status display 1648 can pass through translucent material of the room-facing wall 1620, such as the main switching element 1602. The light source may depict different colors or other characteristics (e.g., flashing, dimming, or the like) to indicate different levels of signal strength or mode of operation.

The network device 1600 can include a nightlight display 1654. The nightlight 1654 can be illuminated whenever the electrical device is turned off or whenever the electrical device is turned off and the ambient light is below a preset level. The nightlight display 1654 can include a light source and a light pipe 1656. In some embodiments, the nightlight 1654 may not have a light pipe 1656, and can illuminate a larger portion of the room-facing wall 1620, such as a larger portion of the main switching element 1602.

Because the various displays (e.g., power display 1640, network status display 1648, nightlight display 1654, and others) can be located anywhere on the room-facing wall 1620, the displays can be located on the main switching element 1602 (e.g., as shown in FIG. 16), inline with a bezel 1658, through a cover, or elsewhere visible to a user when the network device 1600 installed.

In some embodiments, each display can include one or more light sources capable of providing one or more colors of light (e.g., a bicolor LED).

Figure 17:
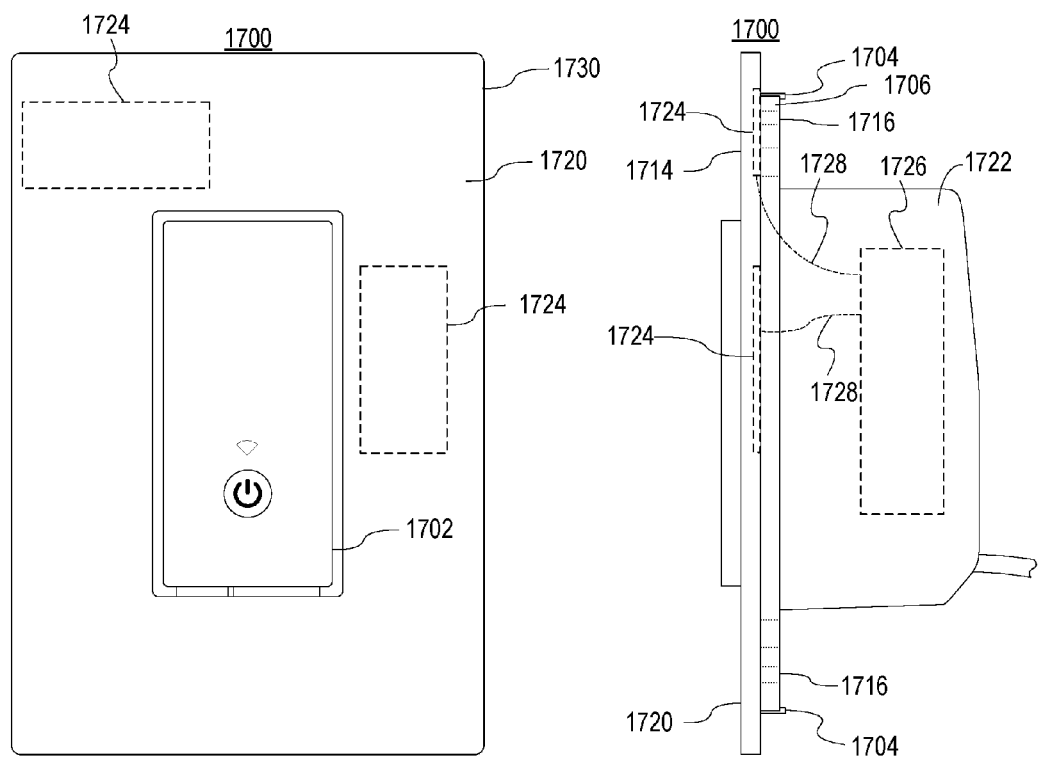
FIG. 17 is an illustration of an example of front and side views of a network device, in accordance with an embodiment of the invention.

FIG. 17 illustrates example views of a network device 1700, with the left panel showing a front view and the right panel showing a side view. The network device 1700 may include any of the network devices 102, 104, or 106 described herein. Network device 1700 includes a power button 1702, room-facing wall 1720, electrical box-facing wall 1722 and circuit board 1726. The network device 1700 may be similar or identical to network device 1600, but the network device 1700 includes a cover plate 1730 and two mounting apertures 1714 for mounting network device 1700 in an electrical box. The cover plate 1730 includes clips 1704 to secure the cover plate 1730 to a support plate 1706 of the network device 1700. Clips 1704 allow the cover plate 1730 to be secured to the support plate 1706 without the need to use a screw or other fastener through cover plate apertures (e.g., cover plate holes 735), thus creating a clean front. Flexure of the cover plate 1730 allows clips 1704 to bend far enough to pass over the bottom and/or top of the support plate 1706 to remove and attach the cover plate 1730 to the support plate 1706.

Inclusion of the cover plate 1730 provides for the ability to mount a wireless antenna 1724 at a location that is more forward facing or proud, such that when network device 1700 is mounted in an electrical box in a wall, the wireless antenna 1724 is not placed within the wall or within the electrical box, but is located outside the wall or electrical box, minimizing or reducing wireless signal interference and/or signal degradation due to the electrical box, the wall and associated building materials. In addition, placing the wireless antenna 1724 at an external location eliminates the requirement to include a wireless antenna directly on the circuit board 1726, providing additional space on circuit board 1726 for inclusion of other components, such as sensors, power switching. For example, a large area of circuit board 1726 could be occupied by the required antennas for transmitting with sufficient gain in the 2.4 GHz or 5 GHz frequency, as about 3-6 cm in length are required for half-wavelength dipole antennas at these frequencies.

In addition, cover plate 1730 provides additional spatical area for including additional components, such as wireless antennas, switches, touch screen interfaces and the like. In the embodiment shown in FIG. 17, cover plate 1730 includes two wireless antennas 1724 mounted on room-facing wall 1720 below a surface of cover plate 1730, so the wireless antennas 1724 are not visible to a user when looking at the network device 1700 when installed into an electrical box. Wireless antennas 1724, however, may be visible from a back view of the network device 1700. Transmission lines 1728 connect the wireless antennas 1724 to wireless transceiver(s) on the circuit board 1726. When network device 1700 is mounted in an electrical box placed in a wall, the wireless antennas 1724 will be positioned at least partially in front of a plane defined by the room-facing surface of the wall. This configuration provides the network device 1700 with the capability of reducing or minimizing interference for wireless transmissions between the wireless antenna 1724 to a wireless access point, gateway or other wireless device due to the wall, electrical box or associated building materials. Additionally, the use of multiple wireless antennas 1724 optionally allows the network device 1700 to transmit at multiple frequencies (e.g., 2.4 GHz and 5 GHz), to transmit simultaneously with vertical and horizontal polarity and/or to include improved reception and transmission characteristics.

Figure 18:
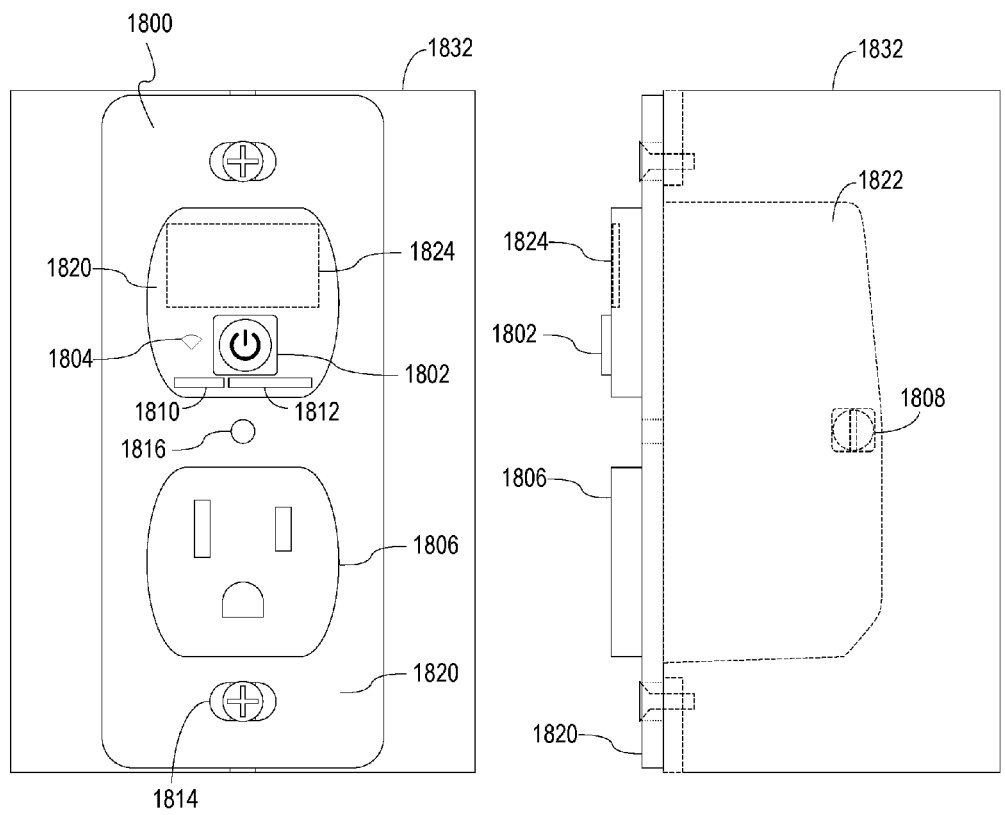
FIG. 18 is an illustration of an example of front and side views of a network device, in accordance with an embodiment of the invention.

FIG. 18 illustrates example views of a network device 1800 mounted in an electrical box 1832, with the left panel showing a front view and the right panel showing a side view. Network device 1800 is stylized as an in-wall outlet fixture, such as could be covered by a typical outlet cover plate. The network device 1800 may include any of the network devices 102, 104, or 106 described herein. In some embodiments, the network device 1800 may be a home automation network device. For example, the network device 1800 may include a home automation switch that may be coupled with a home appliance. A user may wirelessly access the network device 1800 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1800 may include a WiFi enabled switch that connects home appliances and other electronic devices to a compatible 802.11b/g/n/ac WiFi network. The network device 1800 may thus allow users to locally or remotely turn devices on or off from anywhere, program customized notifications, and/or change device status. The network device 1800 may further allow a user to create custom schedules or have devices respond to sunrise or sunset.

The network device 1800 includes a power button 1802 that may be depressed in order to change a power state of an electrical device drawing power through network device 1800. In some embodiments, a light source may be integrated with or located behind the power switch. For example, a light-emitting diode (LED) may be located on a circuit board under the power button 1802. The light source may be illuminated when the network device 1800 is providing power to the electrical device, and may not be illuminated when the network device 1800 is not providing power to the electrical device. In the embodiment shown in FIG. 18, power button 1802 is configured with a push-button configuration.

The network device 1800 further includes a communications signal indicator 1804. The signal indicator 1804 may indicate whether the network device 1800 has access to a communications signal, such as a WiFi signal. For example, the signal indicator 1804 may include a light source (e.g., a LED) that illuminates when the network device 1800 is connected to a communications signal. The light source may depict different colors or other characteristics (e.g., flashing, dimming, or the like) to indicate different levels of signal strength or mode of operation.

The network device 1800 includes a restore button 1810. The restore button 1810 may allow a user to reset the network device 1800 to factory default settings. For example, upon being depressed, the restore button 1810 may cause all software on the device to be reset to the settings that the network device 1800 included when purchased from the manufacturer. The network device 1800 also includes a restart button 1812. The restart button 1812 may allow a user to cycle the power of network device 1800. For example, upon being depressed, the restart button 1812 may cause the network device to reboot, simulating disconnection from and reconnection to line power.

The network device 1800 further includes electrical terminals 1808, here depicted as screw terminals coupled to electrical box-facing wall 1822, for connection to line power for providing electrical power to network device 1800 and switchable electrical power to an outlet 1806. Electrical terminals 1808 allows the network device 1800 to be connected to line power providing 200V, 120V, or the like. In turn, an appliance may be connected to network device 1800 by plugging in the appliance to outlet 1806. Once the network device 1800 is registered according to the techniques described above, a power state of outlet 1806 may be controlled by a user using an access device (e.g., access device 108).

The network device 1800 includes a housing configured to be installed in an electrical box 1832, similar to the placement of conventional light switches and electrical outlets. Mounting apertures 1814 are included for attaching the network device 1800 to electrical box 1832, such as where electrical box 1832 is mounted inside a wall. Cover plate aperture 1816 is included for attaching a wall plate over network device 1800, similar to the attachment of a switch/wall plate over a conventional light switch or electrical outlet. The front view of the network device 1800 in the left panel of FIG. 18 shows room-facing wall 1820 of network device 1800. Room-facing wall 1820 of the network device 1800 and electrical box-facing wall 1822 of the network device 1800 are both shown in the right panel of FIG. 18.

The network device 1800 includes a wireless antenna 1824 mounted on a most forward facing or proud location of room-facing wall 1820. In the embodiment shown, the wireless antenna 1824 is positioned beneath a surface of room-facing wall 1820, so the wireless antenna 1824 is not visible to a user when looking at the network device 1800. When network device 1800 is mounted in electrical box 1832 placed in a wall, the wireless antenna 1824 will be positioned at least partially in front of, and optionally fully in front of, a plane defined by the room-facing surface of the wall. This configuration provides the network device 1800 with minimized or reduced interference for wireless transmissions between the wireless antenna 1824 to a wireless access point, gateway or other wireless device due to the wall, electrical box or associated building materials as compared to a configuration where the antenna is located within the wall and/or within electrical box 1832.

Figure 19:
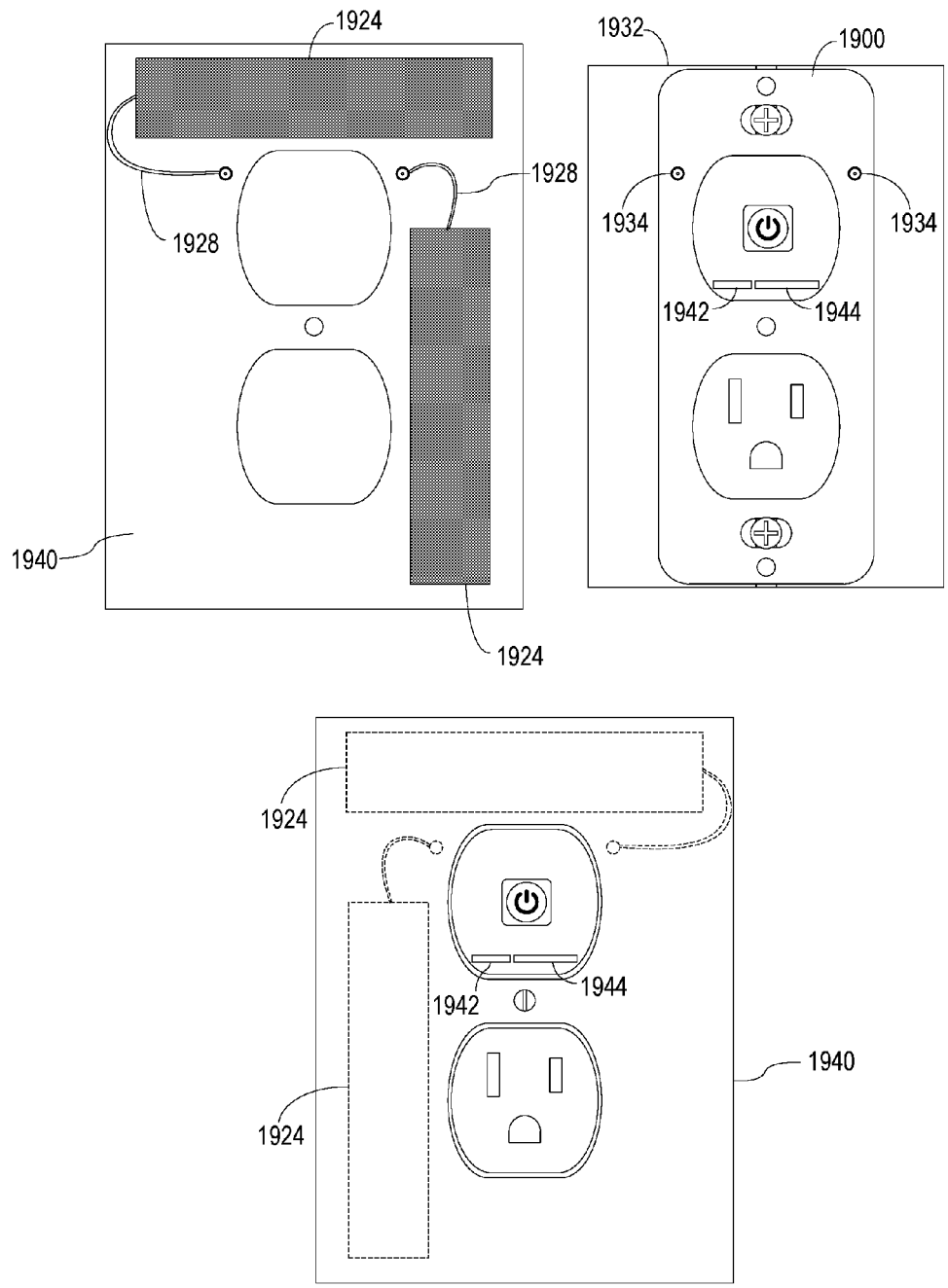
FIG. 19 is an illustration of an example of views of a network device, in accordance with an embodiment of the invention.

FIG. 19 illustrates example views of a network device 1900 mounted in an electrical box 1932, with the top left panel showing a rear view of a cover plate 1940, the top right panel showing a front view of network device 1900 and the bottom panel showing a front view of network device 1900 with mounted cover plate 1940. The network device 1900 may include any of the network devices 102, 104, or 106 described herein. The network device 1900 may be similar or identical to network device 1800, but the network device 1900 further includes coaxial connectors 1934 for connecting external wireless antennas 1924 to network device 1900.

The cover plate 1940 includes two wireless antennas 1924 positioned on the back side of the cover plate, with transmission lines 1928 providing for connection of the wireless antenna to the coaxial connectors 1934, which in turn provide a connection to wireless transceiver(s) located within the housing of network device 1900. When cover plate 1940 is attached over network device 1900 mounted in electrical box 1932, wireless antennas 1924 are not visible to a user. In some embodiments, the cover plate 1940 is provided as a separate component to network device 1900. In other embodiments, the cover plate 1940 is provided as a removable component to network device 1900. In other embodiments, the cover plate 1940 is provided as an integrated component of network device 1900. The configuration illustrated in FIG. 19 allows wireless antennas 1924 to be mounted at a location more forward facing or proud than a majority of network device 1900. In the embodiment shown, when network device 1900 is mounted in electrical box 1932 placed in a wall and covered by cover plate 1940, the wireless antennas 1924 will be positioned fully in front of a the room-facing surface of the wall. This configuration provides the network device 1900 with reduced or minimized interference for wireless transmissions between the wireless antenna 1824 to a wireless access point, gateway or other wireless device due to the wall, electrical box or associated building materials as compared to a configuration where the antenna is located within the wall and/or within electrical box 1932.

Figure 20:
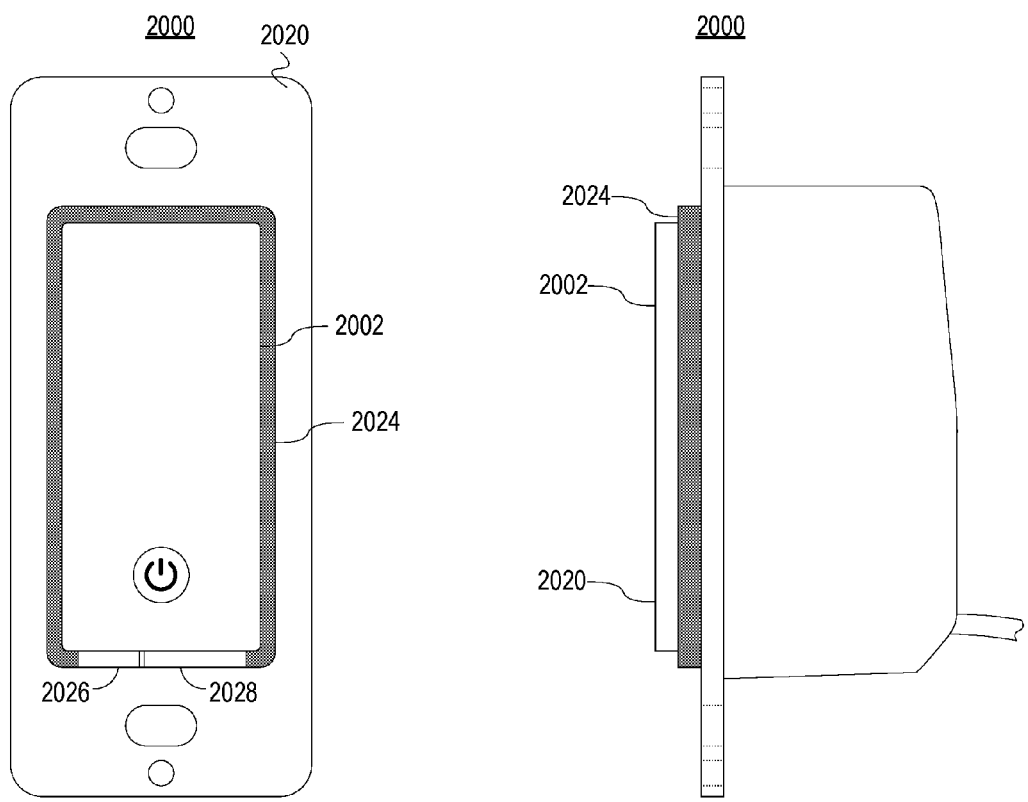
FIG. 20 is an illustration of an example of front and side views of a network device, in accordance with an embodiment of the invention.
Figure 21:
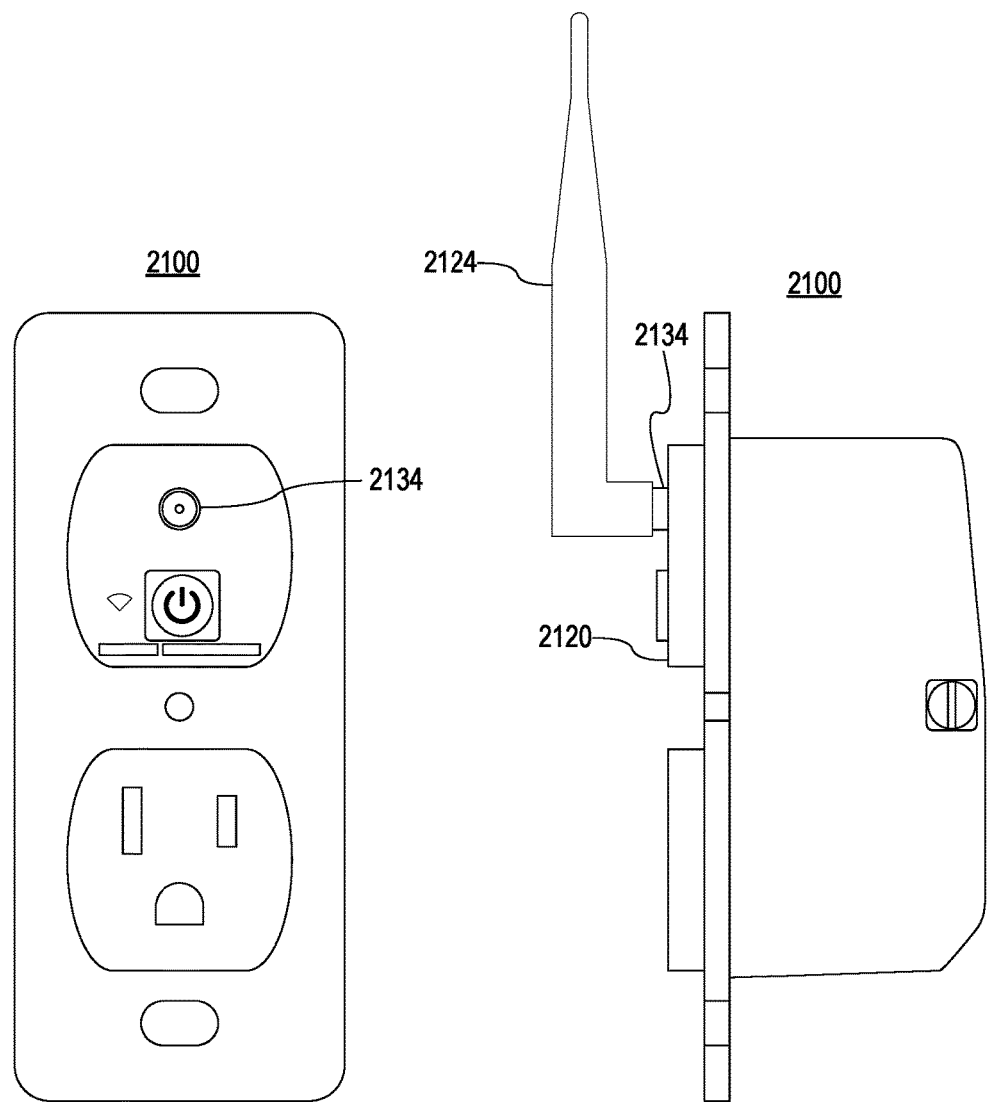
FIG. 21 is an illustration of an example of front and side views of a network device, in accordance with an embodiment of the invention.
Figure 22:
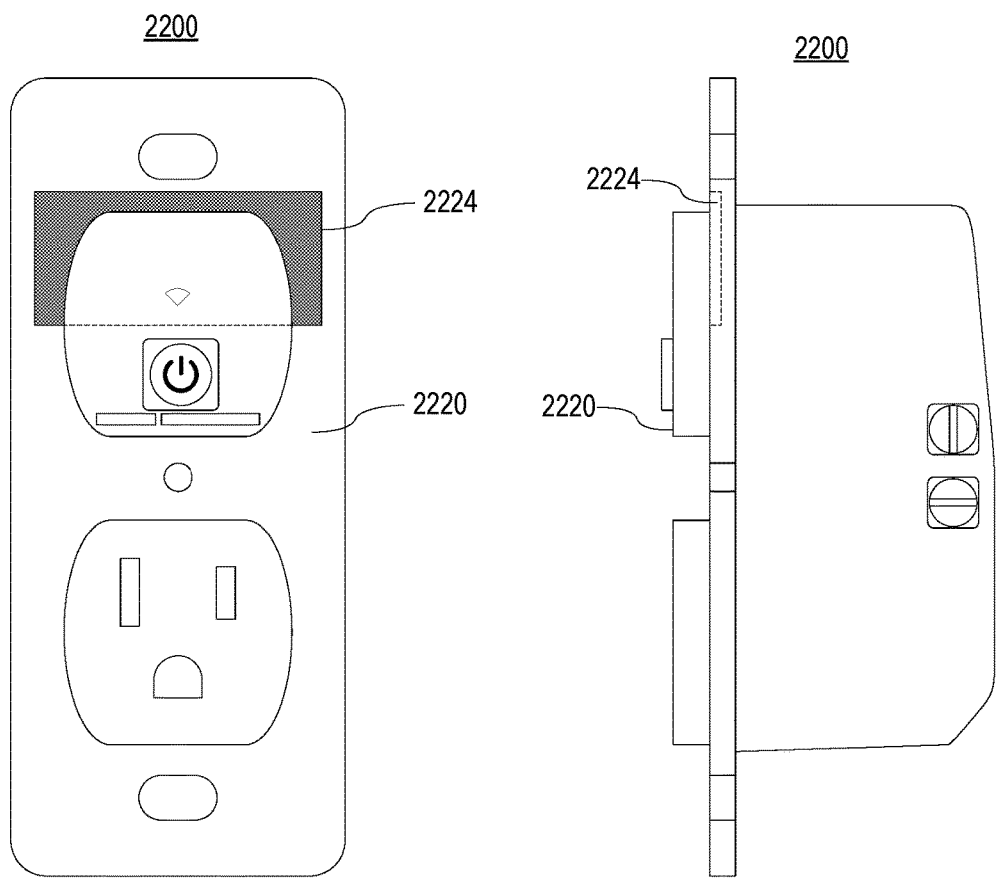
FIG. 22 is an illustration of an example of front and side views of a network device, in accordance with an embodiment of the invention.

In various embodiments, the wireless antenna(s) of a network device can be located with any configuration and at any location on or in the network device. In a specific embodiment, the wireless antenna, or optionally a portion thereof, is positioned in front of a wall when the network device is mounted in an electrical box located in a wall. For example, FIG. 20 shows a network device 2000 embodiment where the wireless antenna 2024 is mounted on the room-facing wall 2020 of the network device 2000, surrounding power button 2002. Here, the wireless antenna 2024 is not covered by another component. In another embodiment, shown in FIG. 21, network device 2100 includes a coaxial connector 2134 on the room-facing wall 2120, allowing a high-gain external wireless antenna 2124 to be attached. Although wireless antenna 2124 is depicted as an omni-directional antenna, in other embodiments, an external directional wireless antenna is utilized. In another embodiment, shown in FIG. 22, network device 2200 includes a wireless antenna 2224 that is partially covered beneath room-facing wall 2220 and partially exposed. As such, wireless antenna 2224 is visible to a user looking at room-facing wall 2220 when network device 2200 is mounted in an electrical box, although the visible portion of wireless antenna 2224 would be at least partially obscured by a cover plate mounted over the outlet fixture. In addition, in the embodiment shown in FIG. 22, wireless antenna 2224 is embedded in the structure of room-facing wall 2220. Other embodiments are contemplated where the wireless antenna is partially embedded in the housing wall of the network device. For embodiments where a wireless antenna is exposed, a non-conducting coating is optionally provided on a surface of the exposed wireless antenna.

Figure 23A:
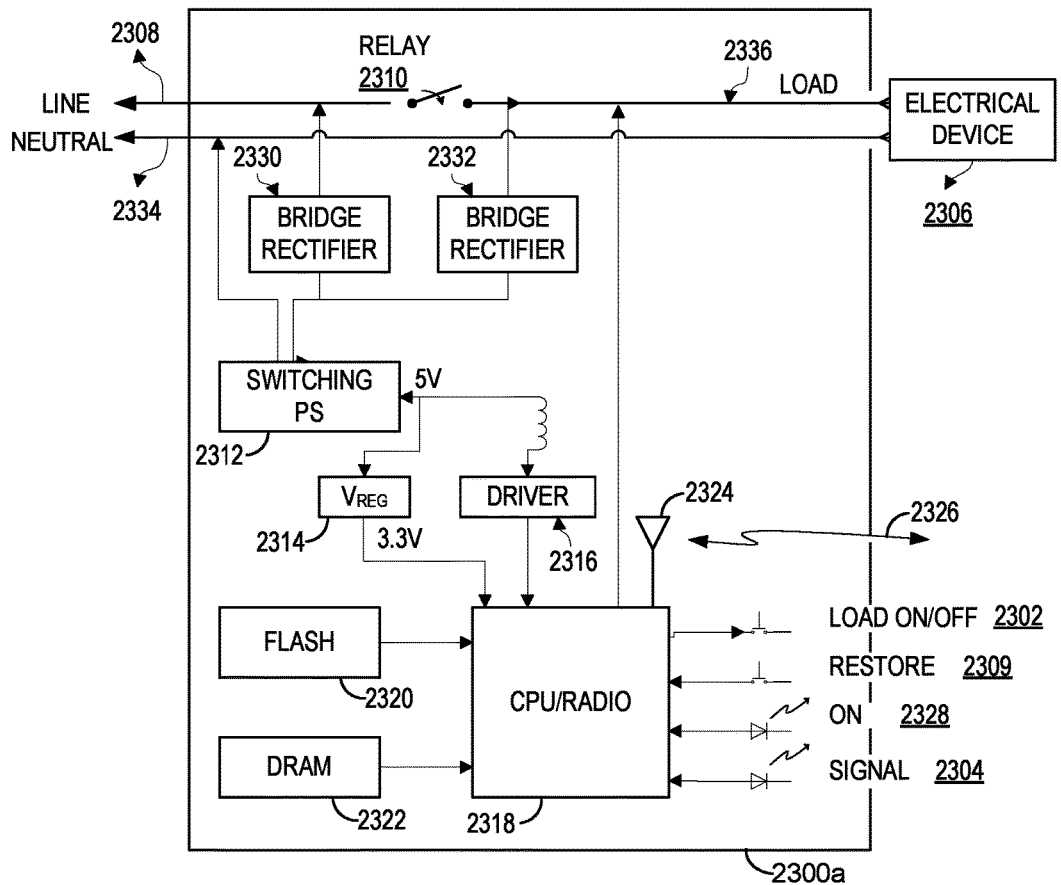
FIGS. 23A-B are examples of a block diagram of a network device, in accordance with embodiments of the invention.

FIG. 23A is an example of a block diagram of a network device 2300*a* depicting different hardware and/or software components of the network device 2300*a*. The network device 2300*a* includes the electrical device 2306, which may be an outlet, light switch or any other device described herein, the connection to line power 2308, the power button 2302, the restore button 2309, and the communications signal indicator 2304. The network device 2300*a* also includes light source 2328 associated with the power button 2302. As previously described, the light source 2328 may be illuminated when the network device 2300*a* is powered on.

The network device 2300*a* further includes a relay 2310. The relay 2310 is a switch that controls whether power is relayed from the line power 2308 to the electrical device 2306. The relay 2310 may be controlled either manually using the power button 2302 or remotely using wireless communication signals. For example, when the power button 2302 is in an ON position, the relay 2310 may be closed so that power is relayed from the line power 2308 to the electrical device 2306. When the power button 2302 is in an OFF position, the relay 2310 may be opened so that current is unable to flow from the line power 2308 to the electrical device 2306. As another example, an application or program running on an access device may transmit a signal that causes the relay 2310 to be opened or closed. For instance, an access application may display a graphical interface on the access device that includes a power button. The user may tap or otherwise select the power button, and the access application may send a communication signal (e.g., over a WiFi network) to the network device 2300*a* instructing the network device 2300*a* to open or close the relay 2310.

The network device 2300*a* further includes flash memory 2320 and dynamic random access memory (DRAM) 2322. The flash memory 2320 may be used to store instructions or code relating to an operating system, one or more applications, and any firmware. The flash memory 2320 may include nonvolatile memory so that any firmware or other program can be can updated. In the event the network device 2300*a* loses power, information stored in the flash memory 2320 may be retained. The DRAM 2322 may store various other types of information needed to run the network device 2300*a*, such as all runtime instructions or code.

The network device 2300*a* further includes a CPU/Radio 2318. The CPU/Radio 2318 controls the operations of the network device 2300*a*. For example, the CPU/Radio 2318 may execute various applications or programs stored in the flash memory 2320 and/or the dynamic random access memory (DRAM) 2322. The CPU/Radio 2318 may also receive input from the various hardware and software components, interpret the input, and perform one or more functions in response to the input. As one example, the CPU/Radio 2318 may determine whether the power button 2302 has been pressed, and determines whether the relay 2310 needs to be opened or closed. The CPU/Radio 2318 may further perform all communications functions in order to allow the network device 2300*a* to communicate with other network devices, one or more gateways, a cloud network, and/or one or more access devices. While the CPU and radio of the network device 2300a are shown to be combined in the CPU/Radio 2318, one of ordinary skill in the art will appreciate that, in some embodiments, the CPU and radio (also referred to herein as a wireless transceiver) may be separately located within the network device 2300a. For example, CPU circuitry may be situated at a separate location on a circuit board from the location of radio circuitry, the CPU circuitry may be located on a different circuit board from the radio circuitry, or the like. Further, the network device 2300a may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 2300a does not include a cellular network transceiver radio or interface, and thus may not be configured to directly communicate with a cellular network. In some embodiments, the network device 2300a may include a cellular network transceiver radio, and may be configured to communicate with a cellular network using the cellular network transceiver radio.

The network device 2300a may communicate with other devices and/or networks via wireless signal 2326 using antenna 2324. For example, antenna 2324 may include a 2.4 GHz antenna, a 5 GHz antenna, or the like, that can transmit and receive WiFi communications signals. The antenna 2324 may include other types of antennas that can communicate Bluetooth® signals, Zigbee® signals, Ultra-Wideband (UWB) signals, WiFi-Direct signals, BLE signals, and/or the like. In some embodiments, the antenna 2324 may be configured to communicate different types of signals, such as the WiFi signals, Bluetooth® signals, Zigbee® signals, UWB signals, WiFi-Direct signals, BLE signals, and/or the like. In some embodiments, the network device 2300a may include multiple antennas for communicating different types of communication signals. As one example, the network device 2300a may include both a 2.4 GHz antenna and a 5 GHz antenna.

The network device 2300a further includes a driver 2316, a switching power supply 2312, and a voltage regulator 2314. The driver 2316 may include instructions or code that can be used to translate control signals or commands received from applications running on the DRAM 2322 to commands that the various hardware components in the network device 2300a can understand. In some embodiments, the driver 2316 may include an ambient application running on the DRAM 2322. The switching power supply 2312 may be used to transfer power from the line power 2308 to the various loads of the network device 2300a (e.g., CPU/Radio 2318). The switching power supply 2312 may efficiently convert the voltage and current characteristics of the electrical power to a level that is appropriate for the components of the network device 2300a. For example, the switching power supply 2312 may perform AC-DC conversion. In some embodiments, the switching power supply 2312 may be used to control the power that is relayed from the line power 2308 to the electrical device 2306. The voltage regulator 2314 may be used to convert the voltage output from the switching power supply 2312 to a lower voltage usable by the CPU/Radio 2318. For example, the voltage regulator 2314 may regulate the DC voltage from 5V to 3.3V.

In various embodiments, functions may be stored as one or more computer-program products, such as instructions or code, in a non-transitory machine-readable storage medium, such as the flash memory 2320 and/or the DRAM 2322. The network device 2300a can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described herein with respect to part or all of one or more processes. The memory, such as the flash memory 2320 and/or the DRAM 2322, may be a processor-readable memory and/or a computer-readable memory that stores software code (programming code, instructions, etc.) configured to cause a processor(s) within the CPU/Radio 2318 to perform the functions described. In other embodiments, one or more of the functions described may be performed in hardware.

A set of these instructions and/or code might be stored on a non-transitory machine-readable storage medium, such as the flash memory 2320 and/or the DRAM 2322. In some cases, the storage medium might be incorporated within a computer system, such as the CPU/Radio 2318. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 2300a and/or might take the form of source and/or installable code, which, upon compilation and/or installation on the network device 2300a (e.g., using any of a variety of generally available compilers, installation programs, compression/decompression utilities, etc.) then takes the form of executable code.

The network device 2300a can include a neutral connection 2334, a line connection 2308, and a load connection 2336 that connect the network device 2300a to the electrical supply 2340 and the electrical device 2306. The electrical supply 2340 can include a line supply 2342 and a neutral supply 2344. Both the neutral connection 2334 and the neutral wire of the electrical device 2306 can be connected to the neutral supply 2344. The line connection 2308 and load connection 2336 are connected, in series, between the line supply 2342 and the electrical device 2306, to switch the electrical device 2306.

The switching power supply 2312 can draw power through the neutral connection 2334 and either the line connection 2308 or load connection 2336, allowing the network device 2300a to operate even if the line connection 2308 and load connection 2336 are installed improperly (e.g., if the load connection 2336 is connected to the line supply 2342 and the line connection 2308 is connected to the electrical device 2306). The switching power supply 2312 is connected to a first bridge rectifier 2330 that is connected to the line connection 2308 and a second bridge rectifier 2332 that is connected to the load connection 2336. The dual bridge rectifiers 2330, 2332 prevent undesired current from flowing between the line connection 2308 and load connection 2336. The dual bridge rectifiers 2330, 2332 allow the switching power supply 2312 to receive power from the line supply 2342 regardless as to whether the line connection 2308 or the load connection 2336 is connected to the line supply 2342. The dual bridge rectifiers 2330, 2332 can increase the ease of installation significantly and reduce the number of instances where a user believes a device is malfunctioning when the actual problem is incorrect installation, whether due to user error or incorrect wire labeling from the electrical supply 2340.

Figure 23B:
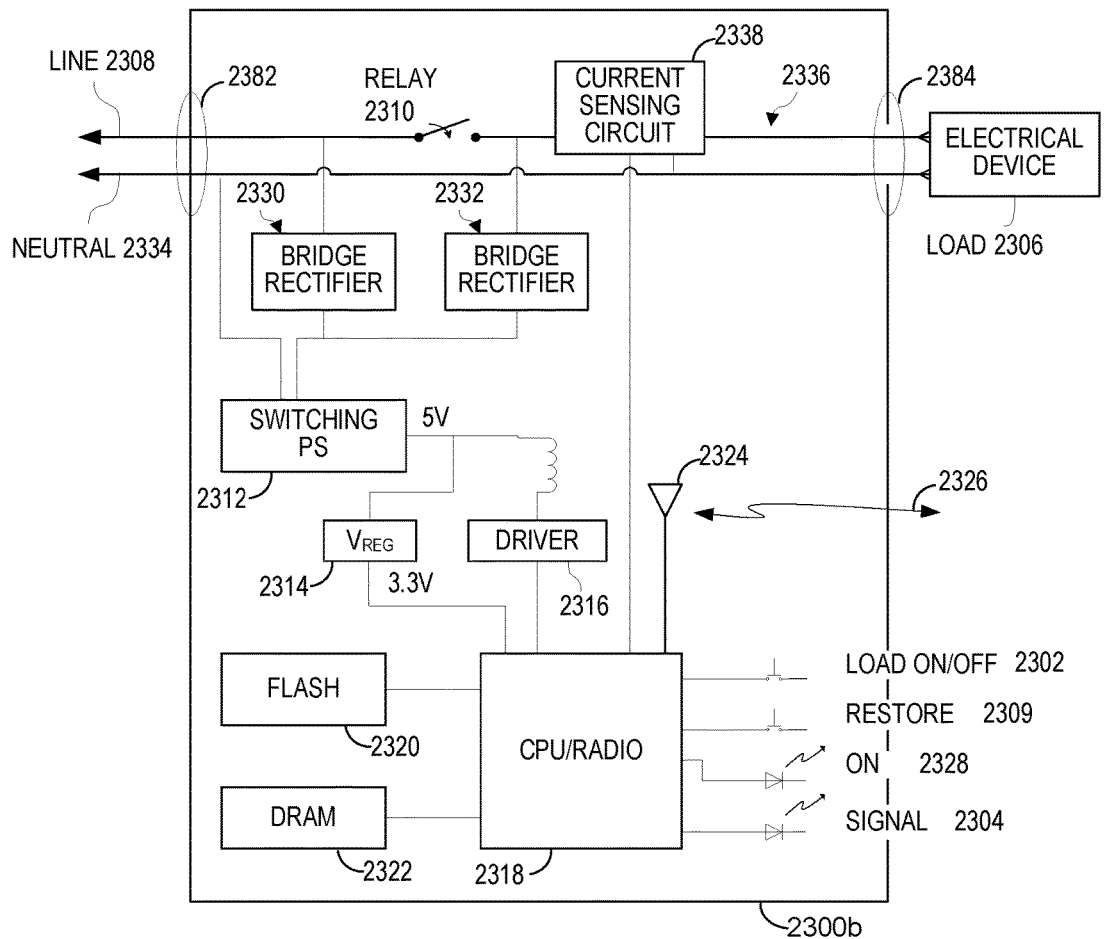

FIG. 23B is another example of a block diagram of a network device 2300b depicting different hardware and/or software components of the network device 2300b. Network device 2300b can be, for example, any of the network devices described herein. The network device 2300b includes output power interface 2384, input power interface 2382, power button 2302, restore button 2309, and the communications signal indicator 2304. The network device 2300b also includes light source 2328 associated with the power button 2302. As previously described, the light source 2328 may be illuminated when the network device 2300b is powered on. Light source 2328 may also provide one or more colors to indicate different status and/or operating conditions of network device 2300b and/or an electrical device 2306 coupled to network device 2300b via output power interface 2384. Various other components of network device 2300b may be similar to similarly numbered components depicted in FIG. 23A and described in corresponding text.

The network device 2300b further includes a relay 2310. The relay 2310 is a switch coupled between input power interface 2382 and output power interface 2384 that controls whether power is relayed from input power interface 2382 to output power interface 2384 to power electrical device 2306. Hence, relay 2310 is used to control the power path between input power interface 2382 and output power interface 2384. The relay 2310 may be controlled either manually using the power button 2302 or remotely using wireless communication signals. For example, when the power button 2302 is in an ON position, the relay 2310 may be closed so that power is relayed from the input power interface 2382 to the electrical device 2306. When the power button 2302 is in an OFF position, the relay 2310 may be opened so that current is unable to flow from input power interface 2382 to the electrical device 2306. As another example, an application or program running on an access device may transmit a signal that causes the relay 2310 to be opened or closed. For instance, an access application may display a graphical interface on the access device that includes a power button. The user may tap or otherwise select the power button, and the access application may send a communication signal (e.g., over a Wi-Fi network) to the network device 2300b instructing the network device 2300b to open or close the relay 2310.

The network device 2300b can include a neutral connection 2334 and a line connection 2308 that connect the network device 2300b to an electrical supply via input power interface 2382, and a load connection 2336 that can provide power to electrical device 2306 via output power interface 2384. The switching power supply 2312 can draw power through the neutral connection 2334 and either the line connection 2308 or load connection 2336, allowing the network device 2300b to operate even if the line connection 2308 and load connection 2336 are installed improperly (e.g., if the load connection 2336 is connected to the line supply 2342 and the line connection 2308 is connected to the electrical device 2306). The switching power supply 2312 is connected to a first bridge rectifier 2330 that is connected to the line connection 2308 and a second bridge rectifier 2332 that is connected to the load connection 2336. The dual bridge rectifiers 2330 and 2332 prevent undesired current from flowing between the line connection 2308 and load connection 2336. The dual bridge rectifiers 2330 and 2332 allow the switching power supply 2312 to receive power from the line supply 2342 regardless as to whether the line connection 2308 or the load connection 2336 is connected to the line supply 2342. The dual bridge rectifiers 2330 and 2332 can increase the ease of installation significantly and reduce the number of instances where a user believes a device is malfunctioning when the actual problem is incorrect installation, whether due to user error or incorrect wire labeling from the electrical supply 2340.

According to some embodiments, network device 2300b may also include a current sensing circuit 2338 for sensing the electrical current draw of electrical device 2306 to detect an abnormal current draw state of electrical device 2306. Current sensing circuit 2338 can be implemented, for example, by coupling a resistor in series with the power path and deriving the current draw from the voltage across the resistor. In some embodiments, to reduce the power consumed by current sensing circuit, a low resistance resistor can be used, and an op amp can also be used to amplify the voltage difference across the resistor. In some embodiments, current sensing circuit 2338 can be implemented, for example, using an inductor or a Hall effect sensor to measure the current draw via inductive coupling such current sensing circuit 2338 does not draw power from the load current. The electrical current draw of electrical device 2306 as sensed by current sensing circuit 2338 can be provided to CPU/radio 2318 such that the data processor of CPU/radio 2318 can monitor and analyze the electrical current draw of electrical device 2306.

Figure 24:
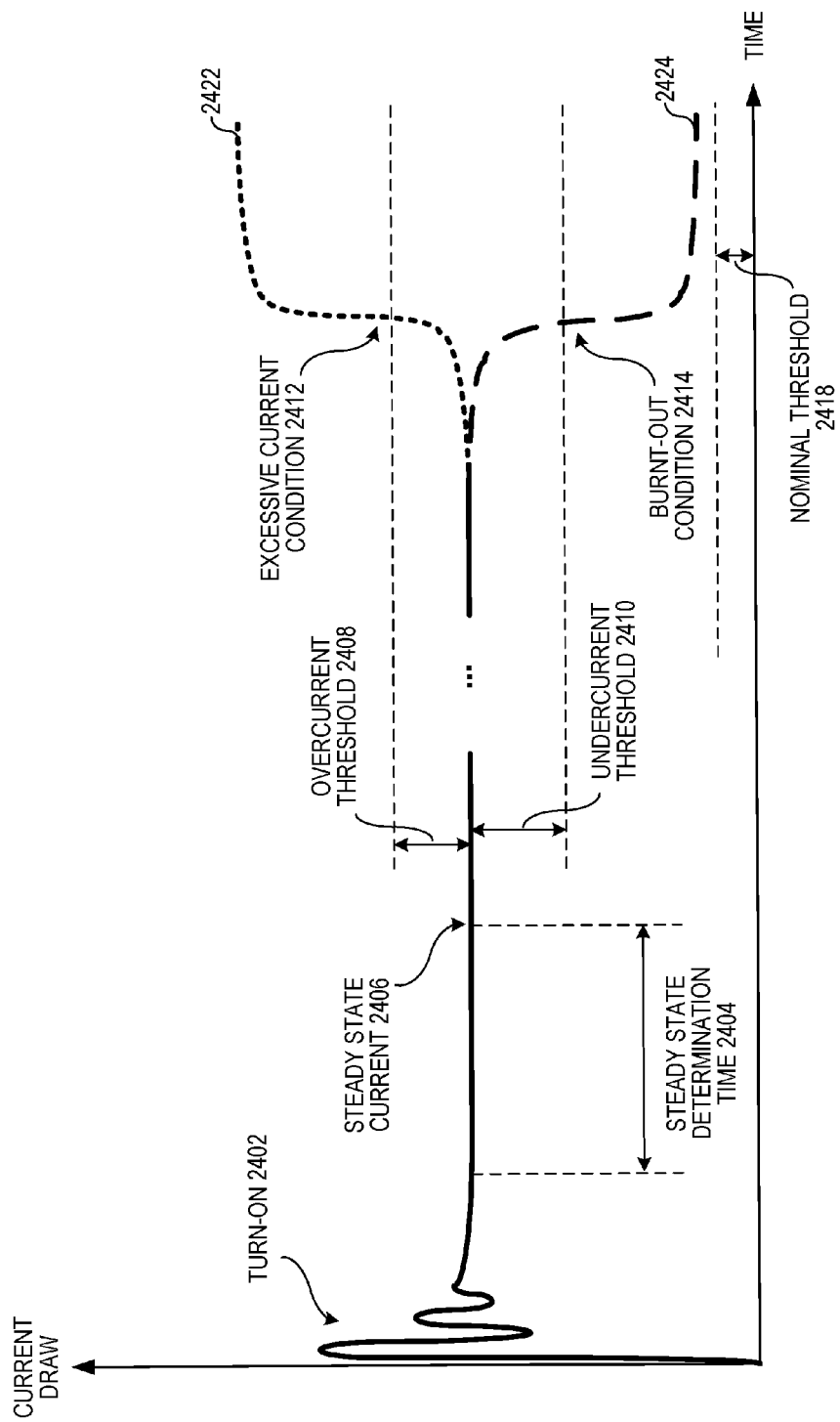
FIG. 24 illustrates an example of the current draw of an electrical device over time, in accordance with some embodiments of the invention.

The data processor of CPU/radio 2318 can be configured to monitor the electrical current draw of electrical device 2306 when the power path 2336 of network device 2300b is in an enabled state (e.g., when relay 2310 is closed), and to determine a steady state current amount of electrical device 2306 by monitoring the electrical current draw of electrical device 2306 over a steady state determination time period. Referring to FIG. 24 (may not be drawn to scale) which illustrates an example of the electrical current draw of electrical device 2306 over time according to some embodiments, the steady state current amount of electrical device 2306 is initially determined over a steady state determination time period 2404 when the power path 2336 of network device 2300b is in an enabled state. The steady state determination time period 2404 can have a duration of, for example, 5 minutes, 10 minutes, 15 minutes, 30 minutes, etc. In some embodiments, to filter out potential current spikes and ringing during power-up of electrical device 2306 when the power path 2336 is turned-on at 2402, the steady state determination time period 2404 does not start right away at the time when power path 2336 is enabled, but instead begins shortly after a delay (e.g., 100 millisecond, 200 milliseconds, 500 milliseconds, 1 second, etc.) from the time when power path 2336 is enabled. During the steady state determination time period 2404, the electrical current draw of electrical device 2306 is monitored and an average current (e.g., a root-mean square (RMS) current, etc.) over that time period is determined. This average current may be used as the steady state current value 2406 of electrical device 2306.

In some embodiments, if power path 2336 does not stay enabled for the entire duration of the steady state determination time period 2404 (e.g., due to a user instructing network device 2300b to turn off the electrical device 2306 shortly after turning it on), the steady state current value 2406 of electrical device 2306 can be determined the next time that power path 2336 is enabled for the entire duration of the steady state determination time period 2404. In some embodiments, the average current over the shortened steady state determination time period 2404 can also be used as the initial steady state current value 2406 of electrical device 2306.

According to some embodiments, after the initial steady state current value is determined, the steady state current value 2406 can be updated over time. In some scenarios, the steady state current draw of electrical device 2306 may change or drift over time, for example, due to aging or temperature fluctuations of electrical device 2306. To account for this drift over time, the steady state current value 2406 can be updated continuously while power path 2336 is in the enabled state. For example, the steady state current amount 2406 can be updated continuously while the power path is in an enabled state as a rolling average of the electrical current draw over the most recent duration of the steady state determination time period 2404 (e.g., over the most recent 5 minutes, 10 minutes, 15 minutes, 30 minutes, etc. that power path 2336 is in the enabled state). In some embodiments, the steady state current amount 2406 can be updated at a periodic interval. For example, the steady state current amount 2406 can be updated each hour, one a day, once a month, etc. by recalculating the average electrical current draw of electrical device 2306 over the steady state determination time period 2404 each time the steady state current amount 2406 is to be updated. In some embodiments, the steady state current amount 2406 can be updated based on an event such as user input instructing network device 2300b to recalculate the steady state current amount 2406, user input to turn on electrical device 2306, etc.

In some scenarios, electrical device 2306 may have its own power button to turn electrical device 2306 on and off at the electrical device 2306 such that electrical device 2306 can be turned off even though relay 2310 is closed and the power path in network device 2300b is enabled. If electrical device 2306 is turned off at the electrical device 2306, the current draw sensed by current sensing circuit 2338 may be zero or approximately zero, and determining or updating the steady state current amount 2406 under this condition may result in an incorrect steady state current value. To avoid including this condition when the electrical device 2306 is turned off at the electrical device 2306 in the determination of the steady state current amount 2406, the steady state current amount 2406 can be calculated over a steady state determination time 2404 when the power path 2336 in network device 2300b is in the enabled state and when the electrical current draw sensed by current sensing circuit 2338 is above zero or above a nominal value (e.g., 5 milliamps, 10 milliamps, etc.).

Once the CPU/radio 2318 has determined the steady state current amount 2406 of electrical device 2306, this value can be stored in the memory (e.g., flash 2320 or DRAM 2322) of network device 2300b and be used to detect an abnormal current draw state of electrical device 2306. As the steady state current amount 2406 is updated, the steady state current amount 2406 stored in memory can be overwritten with the update value, or the updated value can be stored separately to maintain a set of historic steady state current values for electrical device 2306. In some embodiments, if the electrical device 2306 is disconnected from the output power interface 2384 of network device 2300b, this may indicate that the user is removing electrical device 2306 and installing a different electrical device onto network device 2300b. In such a scenario, the steady state current amount 2406 stored in the memory of network device 2300b can be erased or reset such that a new steady state current amount for the new electrical device can be determined when the new electrical device is installed.

Using the steady state current amount 2406 determined for electrical device 2306, network device 2300b can be configured to detect an abnormal current draw state of electrical device 2306 when the electrical current draw of the electrical device 2306 deviates from the steady state current amount 2406 by a threshold amount. An abnormal current draw state may occur, for example, due to malfunctioning of the electrical device 2306. For example, if the electrical device 2306 is a lighting device, an abnormally low current draw may occur when the lighting device burns out through prolonged use of the lighting device beyond its lifetime. As another example, an abnormally high current draw may occur if a malfunction in the light device ballast or other electronics/circuits in electrical device 2306 results in an electrical short (e.g., due to overheating, etc.).

In some embodiments, the threshold amount for triggering detection of the abnormal current draw state can be set based on a percentage of the steady state current amount 2406 (e.g., 10%, 20%, 25%, 30%, 40%, 50%, etc. of the steady state current amount 2406). Alternatively, the threshold amount can be set based on a fixed value (e.g., 50 milliamps, 100 milliamps, etc. above or below the steady state current amount 2406). Referring to FIG. 24, two threshold amounts may be used—an overcurrent threshold amount 2408 for detecting an excessive current condition 2412 of electrical device 2306, and an undercurrent threshold amount 2410 for detecting a burnt-out condition 2414 of electrical device 2306. In some embodiments, the magnitude of the overcurrent threshold amount 2408 and the undercurrent threshold amount 2410 can be the same. For example, the overcurrent threshold amount 2408 can be set at a certain percentage of steady state current amount 2406 above steady state current amount 2406, or at a fixed current amount above steady state current amount 2406; and the undercurrent threshold amount 2410 can be set at the same percentage or fixed current amount below steady state current amount 2406.

In some embodiments, the magnitude of the overcurrent threshold amount 2408 and the undercurrent threshold amount 2410 can be set differently. For example, as shown in FIG. 24, the magnitude of the undercurrent threshold amount 2410 can be set at a higher percentage of the steady state current amount 2406 than the overcurrent threshold amount 2410. Alternatively, the undercurrent threshold amount 2410 can be set at a lower percentage of the steady state current amount 2406 than the overcurrent threshold amount 2410. As another example, the undercurrent threshold amount 2410 can also be set at a fixed value below the steady state current amount 2406, and the overcurrent threshold amount 2410 can be set at a different fixed value above the steady state current amount 2406.

During the course of using electrical device 2306, at some point in time, the electrical current draw of electrical device 2306 may deviate from the steady state current amount 2406 to indicate a malfunction at electrical device 2306. For example, at some point in time, the electrical current draw of electrical device 2306 as sensed by current sensing circuit 2338 may increase above the steady state current amount 2406 beyond the overcurrent threshold amount 2408 to indicate an excessive current condition 2412 as shown by the dotted curve 2422 in FIG. 6. As another example, at some point in time, the electrical current draw of electrical device 2306 as sensed by current sensing circuit 2338 may decrease below the steady state current amount 2406 beyond the undercurrent threshold amount 2408 to indicate a burn-out condition 2414 as shown by the dashed curve 2424.

As mentioned above, in some scenarios, electrical device 2306 may have its own power button that can be used to turn on and off electrical device 2306 at the electrical device 2306. As such, in a situation where electrical device 2306 is turned off via its own power button instead of via network device 2300b, the electrical current draw of electrical device 2306 as sensed by current sensing circuit 2338 while the power path 2336 of network device 2300b is in the enabled state may drop to zero or close to zero. To avoid falsely detecting a burnt-out condition in such a situation, burn-out condition 2414 may be detected when the electrical current draw of the electrical device 2306 is below the steady state current amount 2406 by the undercurrent threshold amount 2410 and also above a nominal threshold current amount 2418 (e.g., 5 milliamps, 10 milliamps, etc.). In an actual burnt-out condition, it is expected that some electronics or circuits within electrical device 2306 (e.g., circuits in the ballast) may still function and draw some nominal current. Thus, the inclusion of the nominal threshold current amount 2418 as a criteria for detecting burn-out condition 2414 can be used to differentiate between an actual burnt-out condition and the situation where electrical device 2306 is turned off at the electrical device 2306.

In some embodiments, to reduce the likelihood of false triggers by transient currents, the triggering condition for detection of the abnormal current draw state of electrical device 2306 may require the electrical current draw of the electrical device 2306 to deviate from the steady state current amount 2406 by the undercurrent or overcurrent threshold amount for a predetermined duration (e.g., 10 seconds, 30 seconds, 1 minute, 5 minutes, etc.). In this manner, transient current spikes or dips exceeding the thresholds can be prevented from triggering the detection of an abnormal current draw state.

In response to detecting the abnormal current draw state of electrical device 2306, network device 2300b may transmit (e.g., via antenna 2324) an abnormal current draw notification to an access device that is communicatively coupled to network device 2300b (e.g., using the networking techniques as described herein) to inform a user of possible malfunction at electrical device 2306. For example, the abnormal current draw notification may indicate an excessive current condition 2412 when the electrical current draw of the electrical device 2306 exceeds the steady state current amount 2406 by the overcurrent threshold amount 2408. As another example, the abnormal current draw notification may indicate a burnt out condition 2414 when the electrical current draw of the electrical device 2306 is below the steady state current amount 2406 by the undercurrent threshold amount 2410.

Upon receiving the abnormal current draw notification, the access device may display a message or an indicator on a user interface of the access device to inform the user of the abnormal current draw state of electrical device 2306. For example, a user interface of the access device may display an icon representing the operating state of electrical device 2306, and the icon may be displayed with a green color when electrical device 2306 is operating under normal conditions. When an excessive current condition 2412 is detected, the icon may be displayed with a red or orange color to indicate the electrical device 2306 is drawing an excessively large current. When a burnt-out condition 2414 is detected, the icon may be displayed with a yellow color to indicate the electrical device 2306 is drawing an abnormally low current.

According to some embodiments, network device 2300b itself may include a power status indicator on a housing of the network device 2300b. For example, the power status indicator can be implemented with light source 2328. Under normal operating conditions of electrical device 2306, the power status indicator may be illuminated with a green color when electrical device 2306 is turned on. When an excessive current condition 2412 is detected, light source 2328 may be illuminated with a red or orange color to indicate on the housing of network device 2300b that the electrical device 2306 is drawing an excessively large current. When a burnt-out condition 2414 is detected, light source 2328 may be illuminated with a yellow color to indicate on the housing of network device 2300b that the electrical device 2306 is drawing an abnormally low current.

It should be understood that in some embodiments, other color schemes or other ways (e.g., using different icons) of displaying or indicating the operating condition of electrical device 2306 can be used at the access device, and/or on the housing of network device 2300b. Once a user is notified of the abnormal current draw state, the user may remedy the problem, for example, by replacing the bulb of the lighting device or replacing electrical device 2306 altogether.

Figure 25:
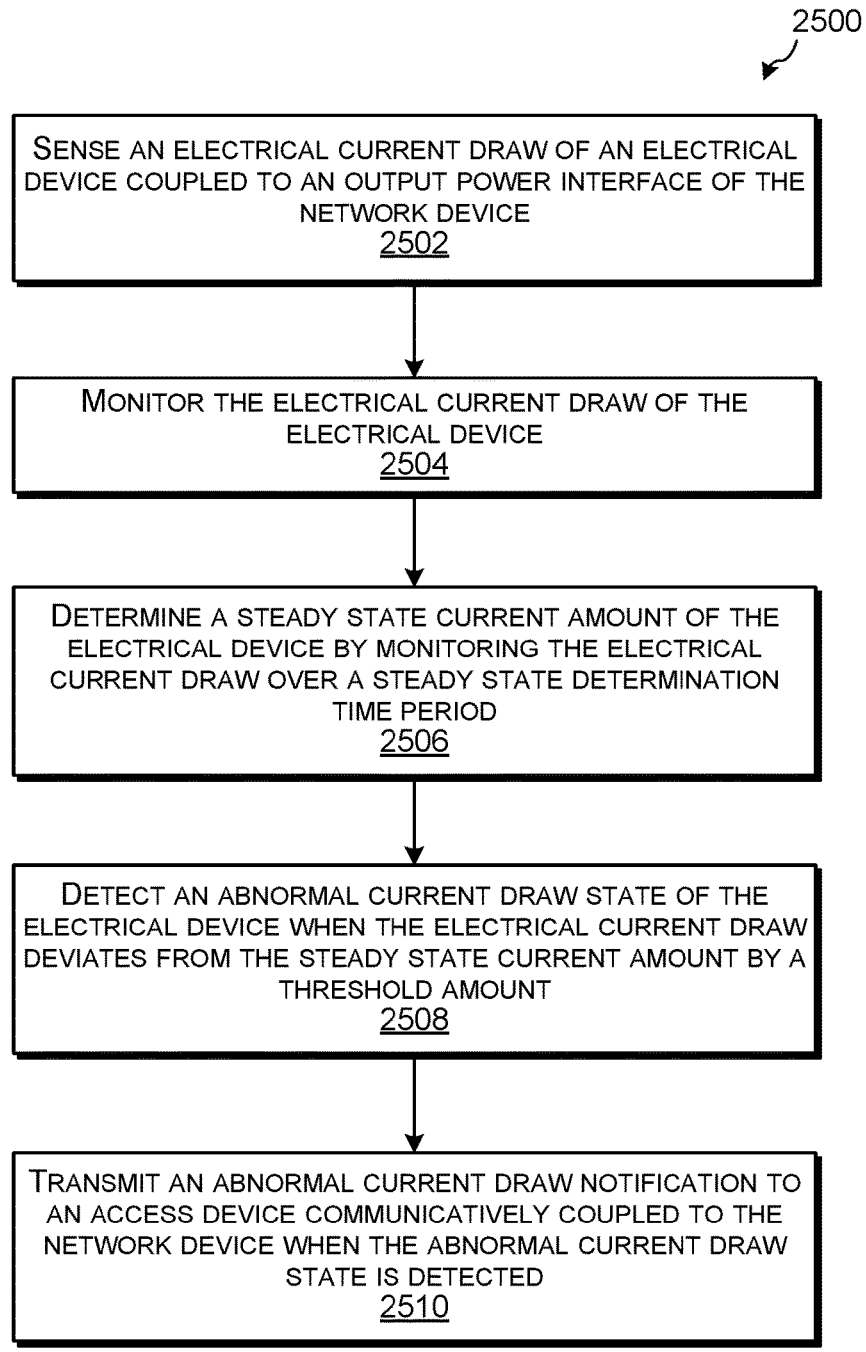
FIG. 25 illustrates a flow diagram of a process for detecting an abnormal current draw state of an electrical device, in accordance with some embodiments of the invention.

FIG. 25 illustrates a flow diagram of a process 2500 for detecting an abnormal current draw state of an electrical device, according to some embodiments. Process 2500 can be performed, for example, by network device 2300b such as a power switch, light switch, etc. The electrical device can be, for example, an appliance such as a lighting device or other types of electrical device that is coupled to an output power interface of the network device, and power can be supplied to the electrical device via a power path in the network device when that power path is in an enabled state.

At block 2502, the electrical current draw of an electrical device coupled to the output power interface of the network device is sensed by a current sensing circuit of the network device. At block 2504, the electrical current draw of the electrical device is monitored. At block 2506, a steady state current amount of the electrical device is determined by monitoring the electrical current draw of the electrical device over a steady state determination time period. In some embodiments, the steady state current amount can be continuously updated when the power path in the network device is in the enabled state (i.e. when power is supplied to the electrical device). In some embodiments, the steady state current amount can be updated at a periodic interval. If the electrical device is disconnected from the output power interface of the network device, the steady state current amount can be reset, such that when a new electrical device is connected to the output power interface of the network device, a new steady state current amount can be determined.

At block 2508, an abnormal current draw state (e.g., an excessive current draw condition, a burnt-out condition, etc.) of the electrical device is detected when the electrical current draw of the electrical device deviates from the steady state current amount by a threshold amount. The threshold amount can be set based on a percentage of the steady state current amount, or can be set based on a fixed value. In some embodiments, an overcurrent threshold amount above the steady state current amount can be used to detect an excessive current draw condition of the electrical device. For example, when the electrical current draw of the electrical device exceeds the steady state current amount by the overcurrent threshold amount, this may trigger detection of an excessive current draw condition of the electrical device. In some embodiments, an undercurrent threshold amount below the steady state current amount can be used to detect an burnt-out condition of the electrical device. For example, when the electrical current draw of the electrical device is below the steady state current amount by the undercurrent threshold amount, this may trigger detection of an burnt-out condition of the electrical device.

In some embodiments, to differentiate between an actual burnt-out condition and when a user turns off the electrical device at the electrical device, the burnt-out condition can be detect when both the electrical current draw of the electrical device is below the steady state current amount by the undercurrent threshold amount and is above a nominal threshold current amount. Furthermore, in some embodiments, to avoid false triggers due to transient currents, the abnormal current draw state (e.g., an excessive current draw condition, a burnt-out condition, etc.) of the electrical device can be detected when the electrical current draw of the electrical device deviates from the steady state current amount by the threshold amount (e.g., overcurrent threshold amount, undercurrent threshold amount, etc.) for a predetermined duration.

At block 2510, an abnormal current draw notification is transmitted to an access device communicatively coupled to the network device when the abnormal current draw state is detected. In some embodiments, the abnormal current draw notification may indicate an excessive current draw condition if the electrical current draw of the electrical device exceeds the steady state current amount by an overcurrent threshold amount. In some embodiments, the abnormal current draw notification may indicate a burnt out condition, for example, if the electrical current draw of the electrical device is below the steady state current amount by the undercurrent threshold amount, or if the electrical current draw of the electrical device is both below the steady state current amount by the undercurrent threshold amount and above a nominal threshold current amount. Upon receiving the abnormal current draw notification, the access device may display or otherwise indicate the detection of an abnormal current draw state of the electrical device to a user on a user interface of the access device (e.g., using different colors and/or icons, etc.).

Figure 26:
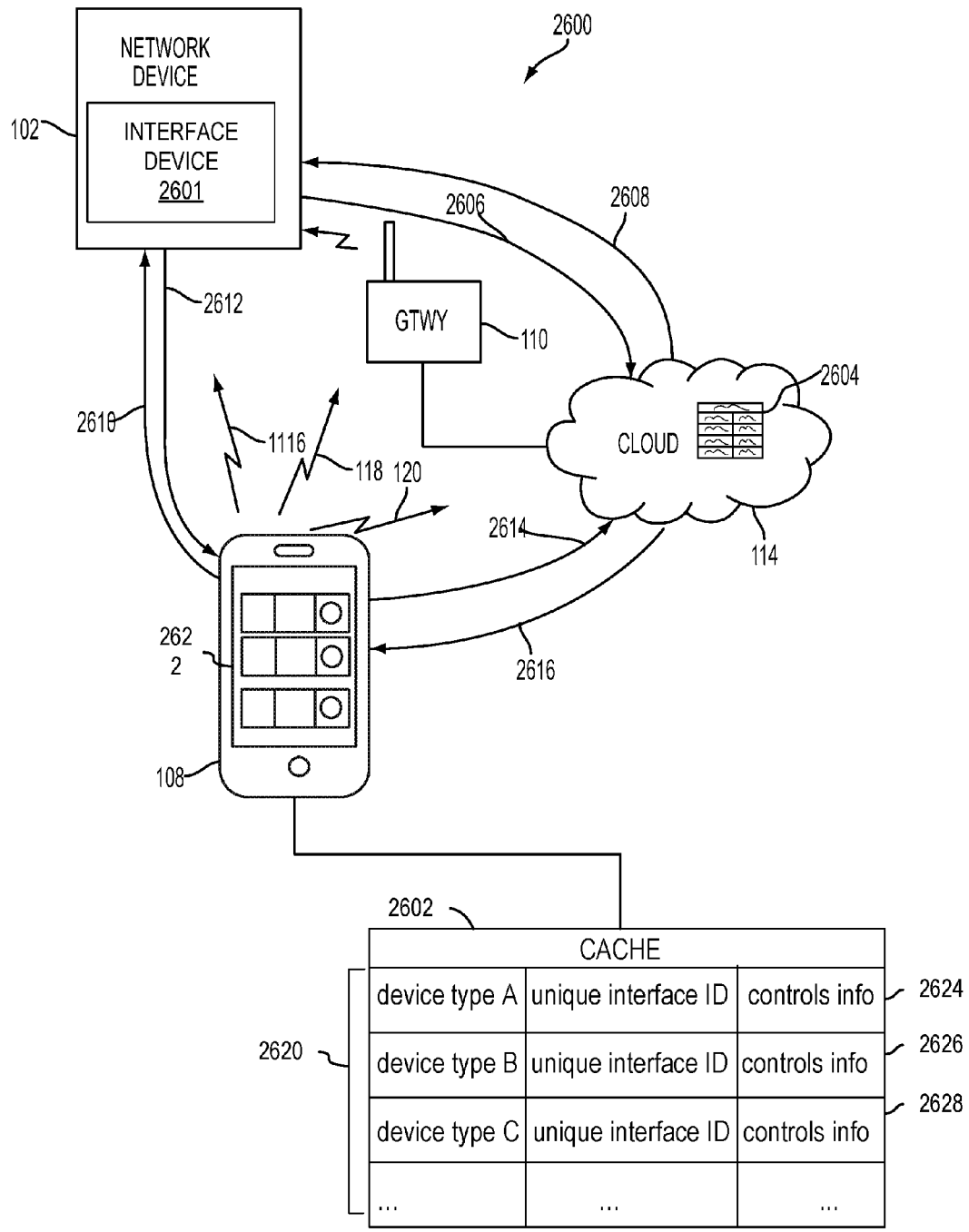
FIG. 26 shows an embodiment of a process for providing a visual interface module for controlling a device in a wireless network according to some embodiments of the invention.

FIG. 26 illustrates an embodiment of a process 2600 for providing a visual interface module for controlling a network device. As shown, the process 2600 may be performed by one or more computing devices, such as the network device 102, a server associated with cloud network 114, or the access device 108 described above with reference to FIG. 1. In some embodiments, the network device 102 is associated with a home automation network, such as the local area network 100 described above with respect to FIG. 1. Process 2600 is illustrated as a data flow diagram, the operation of which represents operations that can be implemented in hardware, computer instructions, or a combination thereof. Gateway 110 is connected to cloud network 114, and allows network device 102 to connect to the cloud network 114, the Internet, or other external networks via gateway 110. In some embodiments, the network device 102 may be a home automation network device that allows a user to access, monitor, control, and/or configure various appliances, such as a television, radio, light bulb, microwave, iron, fan, space heater, sensor, and/or the like. In some embodiments, the user can monitor and control network devices by interacting with a visual interface rendered by the gateway 110 (i.e., a web page for gateway 110), a visual interface rendered on display 2622 of the access device 108, or a visual interface rendered by the network device 102.

In an embodiment, an application may be run on the access device 108. The application may cause the access device 108 to present a display 2622 with a modular visual interface for each network device accessible on the local area network 100. When the application is run on the access device 108, the access device 108 can access a cache 2602. The cache 2602 can be a local cache located in onboard storage of the access device 108. The cache 2602 can contain a known interface list 2620 with records 2624, 2626 and 2628 including interface information for different, known types of network devices. As shown, each of records 2624, 2626 and 2628 can include a device type, a unique interface module ID, and controls information. The known interface list 2620 can include a record for each device known by the access device 108 to exist on the local area network 100. When the application is run on the access device 108, the access device 108 can access the known interfaces 2620 in the cache 2602 to present the display 2622, which lists modular interfaces for each network device on the local area network 100. In an example, the display 2622 can include a modular tile for each connected network device having an interface in the known interface list 2620. Examples of communications used to populate cache 2602 are described in the following paragraphs.

The process 2600 can include utilizing communication 2606 to register a visual interface module for a network device 102 with a server of cloud network 114. For simplicity, communication 2606 is shown as a direct communication between network device 102 and cloud network 114. However, it is to be understood that in an embodiment, communication 2606 can be sent from a manufacturer of network device 102 to cloud network 114. In an additional or alternative embodiment, communication 2606 is sent from third party interface developer to cloud network 114. For example, a third party developer of a visual interface module for network device 102 may initiate communication 2606 to cloud network 114. In the example of FIG. 26, communication 2606 includes registration information for the network device 102. For example, communication 2606 can include a unique device ID for network device 102. In some embodiments, the registration information may identify one or more capabilities of network device 102. The registration information can include a unique identifier for the network device, a default name of the network device, one or more capabilities of the network device, and one or more discovery mechanisms for the network device. In one example, communication 2606 can include a resource bundle corresponding to network device 102. The resource bundle can be embodied as a structured folder structure whose contents define all visual and interactive elements/areas in a tile. For example, a resource bundle can be a zip file sent from a device manufacturer or a third party developer that is submitted or uploaded to cloud network 114. The resource bundle includes a unique device ID and files defining graphical content of a visual interface module. The graphical content can include definitions of interactive elements/areas for the interface module. The resource bundle can include templates defining interactive control states for each of the interactive elements, language translations for tile text, any menus for the tile, and graphical content of the menus. For example, the resource bundle can define templates, text, and graphical content using a markup language, such as HTML5.

At 2606, the process 2600 includes transmitting an indication that network device 102 is associated with the network. For example, network device 102 may transmit the indication to the server of the cloud network 114. In some embodiments, transmitting may include transmitting a unique identifier (ID) for the network device 102. For example, the network device 102 may send a communication to the server indicating a unique interface module ID for the network device 102. In such embodiments, the server may then determine that a match between the unique interface module ID and a known interface exists. The cloud network 114 can include a data store 2604 of known interfaces. The access device 108 can download a visual interface module identified in data store 2604 from the cloud network 114, which can be used to render a modular interface within display 2622. In an embodiment, data store 2604 can be a tile database where each record in the database is uniquely identified by a tile ID.

Cloud network 114 can use the unique device ID to determine an interface module for network device 102. As shown in FIG. 26, cloud network 114 can access a data store 2604 of visual interface modules. A plurality of uniquely identified interface modules can be stored in data store 2604. For example, each interface module in data store 2604 can be associated with a unique interface module ID. In an embodiment, data store 2604 is a database configured to store modular tiles for a plurality of network devices, with each of the stored modular tiles being identified by a unique tile ID. For instance, the network device 102 having a unique device identifier may be matched with an existing interface module based on comparing information received from the network device 102 with information stored in data store 2604. In cases where an existing interface module for network device 102 is not found in data store 2604, cloud network 114 can use information in a resource bundle for the network device 102 to generate an interface module, where the resource bundle is provided as part of a registration process for a given network device. The generated interface module can then be stored in data store 2604 and assigned a unique interface module ID. In some embodiments, information in the resource bundle can be used to update an existing interface module stored in data store 2604. After determining the interface module for network device 102, cloud network 114 sends communication 2608 to network device 102 in order to provide a unique interface module ID to the network device 102. In one embodiment, communication 2608 can include a unique tile ID corresponding to a modular tile for network device 102 that is stored in data store 2604. In some embodiments, communication 2608 includes a unique tile ID corresponding to a modular tile defined for network device 102. Upon receiving communication 2608 with the unique interface module ID (i.e., a unique tile ID), the network device 102 can store the unique interface module ID. In one embodiment, for example, the unique interface module ID can be stored by an interface device 2601 of the network device 102 that is configured to provide the interface module ID to an access device or gateway. In an embodiment, the interface device 2601 is implemented as a 'smart module' in hardware and firmware, such as, for example, a system on a chip (SOC) integrated into the network device 102.

The interface device 2601 can include flash memory and dynamic random access memory (DRAM). The flash memory may be used to store instructions or code relating to an operating system, one or more applications, and any firmware. The flash memory may include nonvolatile memory so that any firmware or other program can be can updated. In the event the interface device 2601 loses power, information stored in the flash memory may be retained. The DRAM of the interface device 2601 may store various other types of information needed to run the interface device 2601, such as all runtime instructions or code. The flash memory or DRAM or a combination thereof may include all instructions necessary to communicate with network device 102.

The process 2600 can include sending, from the access device 108, intra-network communication 2610 including a query, to the network device 102. The query can be a request for information such as a query for capabilities, a request for an identity of the network device 102, and/or a request for a unique interface module ID. For example, communication 2610 can be sent from access device 108 to network device 102 to query network device 102 about its identity. In response to the query sent from access device 108, the process 2600 can include receiving intra-network communication 2612 at the access device 108 with device information for the network device 102. According to an embodiment, in response to the query, the network device 102 can send communication 2612 to inform the access device 108 of the identity and/or capabilities of the network device 102. For instance, in response to receiving the query, the network device 102 may send communications 2612 to the access device 108 with at least a unique interface module ID. The process 2600 can include utilizing intra-network device communications 2610 and 2612 as part of a discovery process for the network device 102. For example, when the network device 102 is initially connected to the network, it and access device 108 can automatically exchange communications 2610 and 2612 to provide the access device 108 with information that can be used to determine a basic, default visual interface stored in cache 2602.

Within the context of a modular tile framework, embodiments can dynamically render a functional user interface without having to download the appropriate interface template from a remote server, such as a server associated with the cloud network 114, in order to control a newly discovered network device. These embodiments can be used in cases where a connection to the Internet or the cloud network 114 is unavailable or unreliable, and immediate use of a newly discovered network device is desired. In this case, an application on the access device 108 or a stationary device such as gateway 110 could, based on certain information received from the network device 102, dynamically render a functional interface for immediate use. Such a functional interface may not be the ideal, visually optimized, interface that is downloadable from the cloud network 114. However, such a functional interface will suffice until the application is able connect to the Internet and/or the cloud network 114 and subsequently download the appropriate and visually optimized interface module for the network device 102.

In some embodiments, communication 2612 may be received when the network device 102 is rebooted (e.g., powered on, reset or restored to default settings, or the like). For example, when the network device 102 is rebooted, it may broadcast one or more messages on the local area network 100 to discover whether there are any access devices in the local area network 100. For example, communication 2612 may be broadcast according to a UPnP protocol during a discovery process. The network device 102 may receive communications 2610 from access device 108 indicating that it is located within the local area network 100 and interrogating network device 102 about its functionalities. That is, after receiving a broadcast message from network device 102, access device 108 may then query network device 102 by sending communication 2610 in order to receive the communication 2612 including information about the network device.

After receiving communication 2612, if the access device 108 can access the cloud network 114, it sends a communication 2614 to the cloud network 114 as a request for an interface module for the network device 102. Communication 2614 is described in further detail below. Otherwise, if the access device 108 cannot access the cloud network 114, the access device 108 looks up the unique interface module ID received from the network device 102 in cache 2602. As discussed above, cache 2602 can be a local cache stored on the access device 108. Basic properties for known interfaces can be stored in cache 2602 as a device type and controls information. These basic properties can include, for example, a default icon, a default name, and interactive elements or interactive areas for controlling one or more primary functionalities of a network device. The primary functionalities can include, for example, powering the network device on and off. The basic properties can also include controls information for secondary functionalities.

In some embodiments, when the access device is connected to the cloud network 114, the access device 108 sends communication 2614 to query the cloud network 114 about network device 102. The communication 2614 can include at least the unique interface module ID for the network device 102. At this point, the cloud network 114 can compare the unique interface module ID of the network device 102 to known interface module IDs stored in data store 2604 in order to determine that there is a match between the unique interface module ID sent with communication 2614 and a known interface module. If the cloud network 114 finds an interface module in its data store 2604, it transmits the interface module to the access device 108 via communication 2616. For example, if the access device 108 is currently using a default interface module for network device 102 that was determined based on exchanging communications 2610 and 2612, and then subsequently is able to connect to the cloud network 114, communications 2614 and 2616 between the access device 108 and the cloud network 114 can be used to obtain an updated interface module for the network device 102.

Upon receiving communication 2616 from the cloud network 114, the access device 108 populates a record in cache 2602 corresponding to the network device 102 with device type and controls information received via communication 2616. That is, when the access device is remote from the local area network 100, it can exchange communications 2614 and 2616 with the cloud network 114 to receive an interface module for a network device. Information received via communications 2616 can be used to populate records of cache 2602. Records in cache 2602 can be updated using modular interfaces received via communication 2616. In additional or alternative embodiments, new records can be created in cache 2602 when communication 2616 includes a modular interface for a newly discovered network device.

Records 2624, 2626, 2628 in cache 2602 store device types, unique interface module IDs, and controls information for known network devices. The access device 108 uses the records in cache 2602 to render visual interfaces in the display 2622. For example, the display 2622 can include a navigable list of modular tiles corresponding to network devices in the local area network 100.

Display 2622 can also include an indicator representing a state of network device 102. In embodiments, communications 2612 and/or 2614 can include a last known state of the network device 102 and/or historical data associated with the network device 102. In one embodiment, such state information can be based on information received via communication 2612 from the network device 102 when the access device 108 is connected to the local area network 100. In this way, display 2622 of the access device 108 can reflect a current state and historical data for the network device 102 when the access device is not connected to the local area network 100. In additional or alternative embodiments, the state information can be based on information received via communication 2616 from the cloud network 114 when the access device 108 is connected to the cloud network 114. Using the state information, an interface module or tile for the network device 102 within display 2622 can indicate an 'on' or 'off' state for the network device 102 when the network device is powered on or off.

Figure 27:
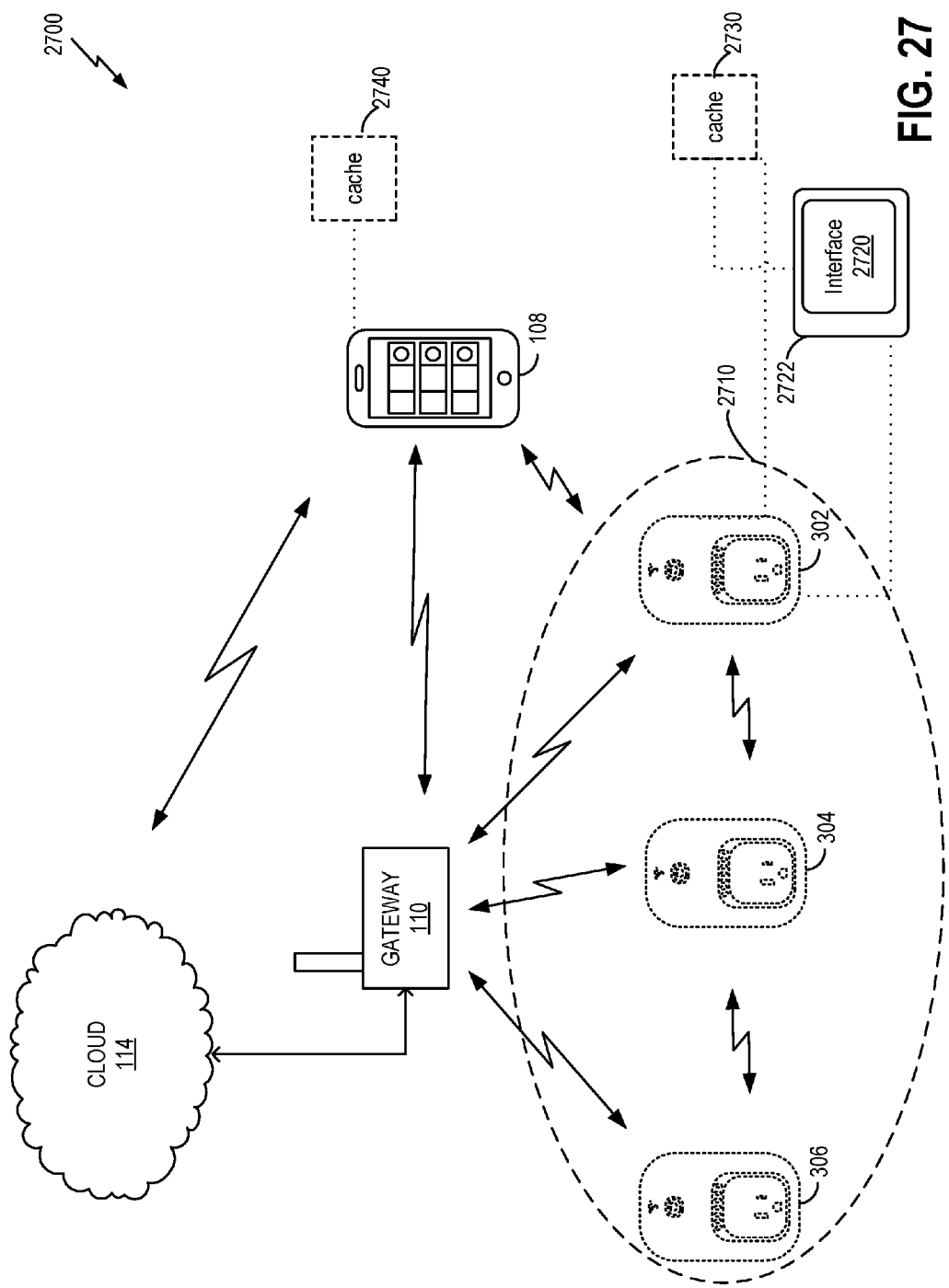
FIG. 27 illustrates an example of a network environment including network devices configured to operate according to embodiments of the invention.

FIG. 27 illustrates an example of a network 2700 including network devices configured to operate together according to embodiments of the present invention. Network 2700 may include elements described with reference to FIGS. 1-5, such as network device 302, network device 304, and network device 306, access device 108, cloud 114, and gateway 110. As explained earlier, access device 108 may communicate with network devices 302, 304, 306 via gateway 110 and/or cloud 114.

Network devices 302, 304, 306 may be operated based on one or more rules. A rule may indicate one or more conditions for performing an action. In one example, a rule may be defined by a time period (e.g., 5 pm to 7 pm) that indicates when a setting (e.g., a power state) for each of multiple devices, such as each of network devices 302, 304, 306, is to be adjusted. In some exemplary instances, a condition may be defined such that the condition is satisfied when (for example) an attribute or a setting of a network device changes in a defined manner (e.g., by a defined amount) or reaches (or exceeds) a defined value or state, a defined time arrives, a time period (e.g., triggered based on an event) elapses, a weather-related event (e.g., event based on temperature or atmospheric pressure) occurs, a sunrise and/or sunset event occurs (e.g., as determined using external data), a sidereal event (e.g., sidereal time and offset) occurs, an event is detected based on data collected by a sensor (e.g., a motion sensor or a proximity sensor), an event related to a communication network occurs (e.g., network activity associated with one, more or all (e.g., particular or unspecific) devices in a network exceeds a threshold or includes activity of a defined type), a sensor measurement collected by a network device sensor exceeds or matches a defined value, a third-party computing system detects an event (e.g., an If This Then That (IFTTT)® event indicated by a service of IFTTT, Inc.), a defined interaction with an interface (e.g., a physical interface or a graphical interface) of a device is detected (e.g., an adjustment of a setting by at least a defined amount or identifying a condition-defined setting), a person or device (e.g., access device) is identified as being within a defined geographical region or distance from a defined location (e.g., location of a building or of a device), an audio event occurs, a video event occurs, or combinations thereof.

An action performed based on satisfaction of a condition may include adjusting operation of one or more network devices. Examples of actions may include, without limitation, adjusting a setting or an attribute related to operation of a device (e.g., by a defined amount or to a defined setting or attribute value), sending a communication (e.g., sending an email notification or a message to a device), configuring a network (e.g., adjusting a setting of a network), configuring a device (e.g., a network device), sending a communication to configure operation of a network (e.g., adjust network bandwidth, control access to a resource, control access to a website, or combinations thereof. Operation of a network device may be adjusted by modifying a value of a setting or an attribute for that network device. A state of a network device may be configured by adjusting one or more attributes or one or more settings of the network device.

In some instances, one or more rules can be managed based on input received from a device operated by a user. For example, a rule may be created, modified, or deleted in response to detecting corresponding user input. In some embodiments, one or more rules may be pre-defined for a network device. A pre-defined rule may be defined or effectuated based on a type of device. A rule (e.g., a pre-defined rule, a learned rule and/or a rule defined based on user input) may be modified based on input received from a device operated by a user and/or activity patterns. Multiple rules can apply to one or more network devices. A rule may be modified or created by interacting with an interface, such as any of interfaces illustrated in any of FIGS. 34-38. For example, an interface (e.g., a graphical interface or a physical interface) accessible at an access device (e.g., access device 108) or an interface (e.g., interface 720 described further below) of a device may receive input for configuring a rule.

In some embodiments, any of devices 302, 304, 306 and/or access device 108 in FIG. 27 may include or may be coupled to a device 2722. In one example, device 2722 may be coupled to network device 302. Device 2722 may implement or include an interface 2720. Interface may display information and/or receive input corresponding to interaction with interface 2720. The information displayed may correspond to operation of any of network devices 302-306 and/or access device 108. The information may indicate one or more rules for controlling operation of network device 302, 304, 306.

Interface 2720 may include any human-to-machine interface with network connection capability that allows access to a network. For example, interface 2720 may include a stand-alone interface (e.g., a cellular telephone, a smartphone, a home computer, a laptop computer, a tablet, a PDA, a computing device, a wearable device such as a smart watch, a wall panel, a keypad, or the like), an interface that is built into an appliance or other device e.g., device 2722, a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, interface 2720 may include a graphical interface. Interface 2720 may be provided using hardware, firmware, software, or a combination thereof. For example, interface 2720 may be presented by an application, a web browser, a proprietary program, or any other program executed and operated by the device 2722. Interface 2720 may include or implement any of the interfaces described below with reference to FIGS. 34-38.

Information corresponding to one or more rules may be stored in a machine-readable storage medium, such as a caching device (e.g., cache). The machine-readable storage medium may be accessible by any of network devices 302, 304, 306, access device 108, and/or device 2722 in network 2700. As explained with reference to FIG. 4, network devices 302, 304, 306 may each have access to a machine-readable storage medium such as cache. For example, cache 2730 may be accessible by device 2722 and/or network device 302. In another example, access device 108 may include or have access to cache 2740. In some embodiments, information corresponding to one or more rules may be transmitted to other devices to ensure that the devices are informed about rules for operation. The information may be transmitted periodically or intermittently. In some embodiments, updates or changes to the information may be communicated to other devices. The data corresponding to the information may be generated by one device (e.g., access device 108) and stored by another device.

In one exemplary instance, each of a set of network devices 302, 304 and 306 includes a cache. The cache can store one or more rules, and the one or more rules included in the cache may, or may not, vary across the network devices. For example, the one or more rules in a cache of a network device may selectively include those pertaining to the network device (e.g., as determined based on the device's type, location, use activity or identification). As another example, the one or more rules may be the same across caches. Nonetheless, rule conditions or rule-initiation instructions (e.g., received from another device) may specify a subset of devices that are to perform a rule action.

In another exemplary instance, a device (e.g., network device, gateway, cloud server or access device) includes a cache storing one or more rules and evaluates initiation conditions as specified in the rules. Upon detecting a satisfaction of a condition, the device can (in some instances) identify a network device to perform an action and can transmit a communication to the network device that includes part or all of the rule and/or an instruction to perform the action.

Instances that include remote rule evaluation and/or over-inclusive rule storage provide a flexibility in rule application. When a network device is moved or otherwise adjusted (e.g., setting adjustment or sensor data collection specification), the device need not identify a new set of applicable rules. Rather, its routine rule evaluation and/or communication receipt can be used to identify appropriate condition-responsive actions to perform.

A machine-readable storage medium (e.g., cache 2740 or cache 2730) may store data, some or all of which may be related to operation of one or more network devices. For example, a cache in network 2700 may include data regarding statuses of network devices within a local area network, e.g., network 2700. The statuses of network devices may include information indicating one or more scenes and/or modes that are active or inactive with respect to those network devices. The data may indicate whether the status of a network device corresponds to an active or an inactive state of scene and/or a mode. The stored data may include information related to one or more rules.

A rule may indicate a configuration 2710 for operation of network devices 302, 304, 306. A rule may indicate when to initiate one or more actions for controlling operation of the network devices defined by configuration 2710. A rule may indicate an adjustment to an attribute or a setting of each of network devices 302, 304, 306 for configuration 2710. For example, a rule may indicate a condition such as a time period (e.g., 5 pm to 7 pm) when to adjust a power state to "on" for multiple devices, such as each of network devices 302, 304, 306. Collectively, network devices 302, 304, 306 in configuration 2710 may be configured to operate together when a condition for operation of configuration 2710 is satisfied.

In some embodiments, a "scene" (also referred to herein as a macro) may be initiated based on a condition. A rule may be configured to initiate a scene. A scene may be defined as a set of actions that can be triggered at an instant in time. Actions defining a scene may be initiated for a rule when the condition(s) for the rule are satisfied. In some embodiments, a single event (e.g., interacting with a graphical interface of an access device) may trigger a scene. A scene may include controlling operation of multiple devices when the condition(s) for the rule are satisfied. For example, a rule may be defined by a configuration that includes a group of network devices, all of which are operated when the condition(s) for the rule are satisfied.

In some embodiments, a "mode" may be initiated based on a condition. A mode may be initiated by a rule. A mode may be defined as a set of actions that persist for a time period. A mode may include controlling operation of a group of devices defined by a configuration. The group of devices may be controlled based on the configuration for the time period corresponding to the mode. In some embodiments, one or more actions triggered for a mode may include actions that can be performed for a rule. The actions may include one or more of those described above with reference to a scene. However, actions performed for a mode may persist until a condition (e.g., a "mode condition") is satisfied. A mode condition may be defined by an event, including the events described above for a condition of a rule. In comparison to a scene, once a scene is initiated, the actions for the scene do not persist once they are performed. In one example, a mode that is configured to control operation of a group of network devices may correspond to a state of operation of each network device in the group of network devices. In this example, an away mode may correspond to a power state of "OFF" to control operation of a group of network devices to an "OFF" power state. Examples of modes include a home mode, an away mode, and a sleep mode. Any number of modes may be defined, including one or more different home modes, away modes, or sleep modes.

In some embodiments, one or more scene and/or modes may be pre-defined (e.g., a template scene or a template mode). Scenes and modes may be pre-defined based on previous actions (e.g., a pattern of behavior), such as operation of devices. In some embodiments, a scene or a mode may be pre-defined based on one or more preferences provided by a user.

Figure 28:
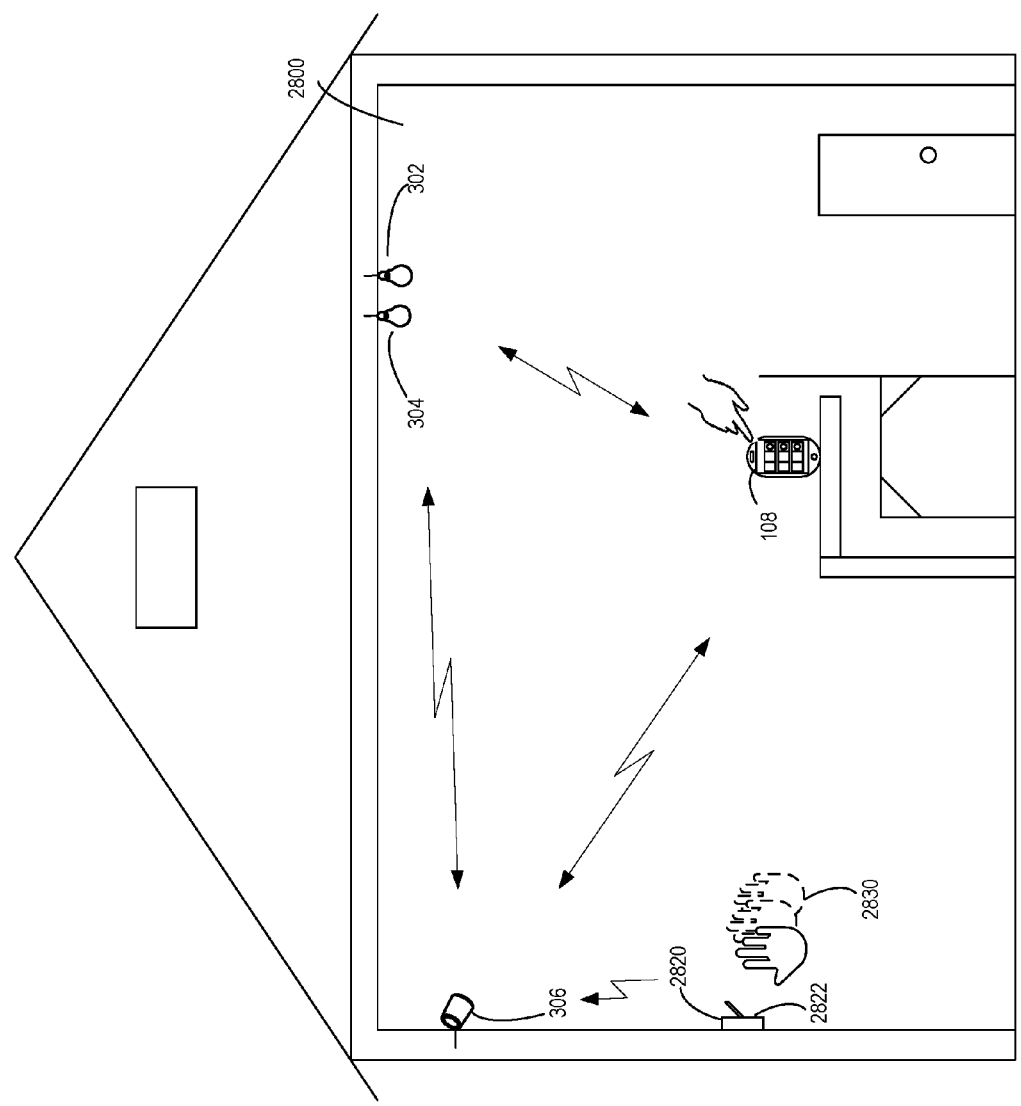
FIG. 28 illustrates an example of network devices operating within a network environment according to embodiments of the invention.

Now turning to FIG. 28, an example of network devices operating within a network 2800 according to embodiments of the present invention. The example shown in FIG. 28 may be implemented in many different environments (e.g., a house) and may have many different applications.

Network 2800 may include network devices such as network device 302, network device 304, and network device 306. In the example shown in FIG. 28, each of network devices 302 and 304 is represented as a light and network device 306 is represented as a sensor (e.g., motion sensor). However, in some instances, network devices 302 and 304 may not be the lights themselves, but rather each device may be a network device that is connected to a different light or light bulb. In some instances, network device 306 may not be the sensor itself, but rather may be a network device that is connected to a sensor.

Network devices 302, 304, 306 may be configured to operate according to one or more rules. As explained above, a rule may be stored on one or more devices in network 2800, including any of the devices that are operated based on the rule. A rule may be configured at one device based on input received at that device and then transmitted to one or more other devices (e.g., all devices in a network or one or more devices that are to perform an action upon satisfaction of a condition defined in the rule). For example, input may be provided to access device 108 to define a rule and access device 108 may transmit the rule to network devices 302, 304, 306 active within network 300. In another example, device 2820 may include an interface (e.g., a graphical interface) that receives input to configure a rule. Device 2820 may transmit the rule to access device 108 and network devices 302, 304, 306. Data may be transmitted from Devices in network 2800 may each store information about one or more rules so that any of those devices, if indicated in an action for a rule, can individually operate according to the rule. In some embodiments, one device may determine whether a condition for a rule is satisfied and may transmit data to indicate another device to operate based on the rule.

Devices in network 300, e.g., any one of network devices 302, 304, 306, may be configured to operate according to one or more rules. A scene or a mode may be initiated for a rule. For example, a group of network devices (e.g., network devices 302, 304, and 306) may be operated as part of a scene or a mode of operation for a rule.

In one example shown in FIG. 28, operation of network device 304 and network device 302 may be controlled based on detecting a condition for the rule (e.g., an interaction with a graphical interface of access device). The actions to control operation of network devices 302, 304 may be included in a scene or a mode initiated for the rule. For example, access device 108 may detect the condition for the rule. Access device 108 may transmit data indicating the rule that has been enacted. The data may include adjustments to control operation of network devices 302, 304. The adjustments may be determined based on a value for a setting or an attribute of those network devices 302, 304 in the rule. Network devices 302, 304 may be adjusted to a setting or an attribute corresponding to the rule. When a network device is adjusted for a mode, the network device may operate in that mode until a mode condition occurs when operation according to the mode may cease.

In another example illustrated in FIG. 28, operation of network devices 302, 304, 306 may be controlled based on device 2820 detecting a condition of a rule. Device 2820 may be a light switch that includes a computing device (e.g., device 2722). Device 2820 may detect interaction with an interface (e.g., a physical interface 2822) of device 2820. For example, the interaction may be adjusting a light switch. In this example, a rule may be defined such that the condition for activation of the rule is interaction with a light switch. Network devices 302, 304, 306 may be adjusted according to a scene initiated for the rule when the condition is satisfied. Device 2820 may transmit data to each of network devices 302, 304, 306 to adjust these network devices according to the scene.

In some embodiments, a network device (e.g., network device 306) may detect a condition for a rule and transmit data to cause other network devices 302, 304 to be operated according to the rule. For example, network device (e.g., a sensor) may detection motion by a person (e.g., waving hands 2830), which is defined as a condition for a rule. Upon detecting the motion, network device 306 may transmit data to network devices 302, 304 indicating the rule by which network devices 302, 304 are to operate. Network devices 302, 304 may determine operation based on the one or more settings or attributes to adjust for the scene according to the rule indicated by network device 306. In some embodiments, one or more of network devices 302, 304 may be notified about the rule by a device other than one that detected the condition.

Figure 29:
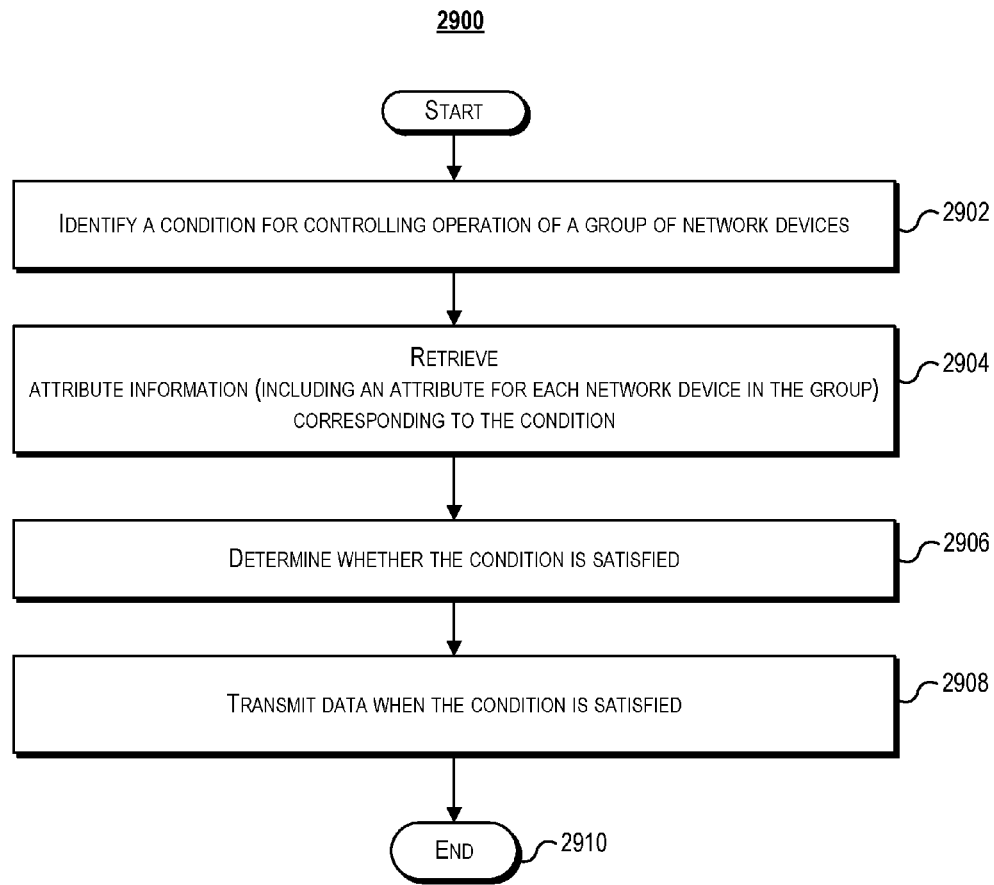
FIG. 29 shows a flowchart illustrating a process for operating network devices according to embodiments of the invention.

FIG. 29 shows a flowchart 2900 illustrating a process for operating network devices according to embodiments of the present invention. Specifically, process depicted by flowchart 2900 may be implemented to cause one or more actions to be implemented upon satisfaction of a condition. In some embodiments, the actions and the condition may be defined by a rule. The one or more actions may correspond to a scene or a mode. In some embodiments, the process depicted in FIG. 29 may be implemented by a computing device (e.g., access device 108 or device 2722) or a network device (e.g., network device 302).

The processing depicted with reference to FIG. 29 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 29 is not intended to be limiting. Other sequences of steps may also be performed according to alternative embodiments. For example, alternative embodiments of the present invention may perform the steps outlined above in a different order. Moreover, the individual steps illustrated in FIG. 29 may include multiple sub-steps that may be performed in various sequences as appropriate to the individual step. Furthermore, additional steps may be added or removed depending on the particular applications. One of ordinary skill in the art would recognize many variations, modifications, and alternatives. The process depicted by flowchart 2900 begins in at block 2902.

At block 2902, a condition for controlling operation of a group of network devices is identified. As explained above, a condition, when satisfied, may result in operation of a group of network devices being controlled. For example, a condition may be based on a time period, which when satisfied (e.g., the time period occurs), causes one or more actions to be performed that cause operation of the network devices in the group to be controlled.

In some embodiments, a data source storing data about one or more rules may be processed (e.g., queried) to identify a condition for a rule. A rule may include one or more conditions. For purposes of illustration, the embodiments described with reference to FIG. 29 may be described based on a rule defined by a single condition. The data source may be processed for rules periodically or intermittently to identify a new condition for an existing rule or a condition for a new rule to control operation of a group of network devices.

In some embodiments, the group of network devices may include at least two different types of network devices. For example, the group of network devices may include a light bulb (e.g., 302 depicted in FIG. 28) and a motion sensor (e.g., 306 depicted in FIG. 28).

In some embodiments, a group of network devices may be controlled to enact a scene or a mode of operation when a condition for a rule is satisfied. In one example, a condition for controlling operation of a group of network devices may correspond to a mode for controlling operation of the group of network devices. The mode may be indicated in a rule that includes the condition. The rule may indicate the actions to perform to initiate the mode. The group of network devices may be adjusted according to the mode when the condition is satisfied. In another example, a condition may correspond to a scene for controlling operation of the group of network devices. The group of network devices may be adjusted according to the scene when the condition is satisfied. The scene may be indicated in a rule that includes the condition. The rule may indicate the actions to perform to initiate the scene.

At block 2904, processing may be performed to retrieve attribute information corresponding to the condition. For example, a data structure described with reference to FIG. 10 may be accessed to obtain action information corresponding to one or more actions to perform upon satisfaction of a condition for a rule. The action information may indicate attribute information. The attribute information may include an attribute for each network device in a group of network devices to be controlled for the condition identified at block 2902. The attribute may be related to operation of each network device in the group of network devices. For example, an attribute for a light bulb may correspond to an intensity of the light bulb. The attribute information for the attribute may include a value corresponding to the attribute. When the condition is satisfied, the network device corresponding to the attribute may be adjusted to cause the network device to operate according to the value corresponding to the attribute.

In some embodiments, at least two network devices in the group of network devices may have different attributes. For example, when group of network devices corresponding to a condition includes two light bulbs, the attribute for a first light bulb may correspond to intensity and the attribute for a second light bulb may correspond to power state. In some embodiments, network devices in the group of network devices may have different attributes because the network devices are of different types. For example, when a group of network devices corresponding to a condition includes a light bulb and a sensor, the attribute of the light bulb may corresponds to an intensity of the light bulb and the attribute for the sensor may correspond to a sensitivity level of the sensor.

In some embodiments, additional information such as actions may be retrieved corresponding to a condition of a rule. Examples of actions corresponding to a rule are described with reference to FIGS. 30-32.

Processing is performed to determine whether a condition is satisfied at block 2906. The processing performed to determine satisfaction of the condition may vary based on the condition. The processing may include performing multiple computing operations to determine information that can be used assess whether the condition has been satisfied. For example, when a condition is based on a time period (e.g., time of day, a date, a sunrise or sunset event), processing is performed to determine information for assessing whether the time period has occurred. A computing device may use system information determined by a processor of the computing device. The system information may include information such as time, which can be used to assess the condition. In some embodiments, processing may include querying local memory (e.g., cache) for stored information to assess the time period. In some embodiments, processing may include communicating via cloud 114 to determine time-related information such as the occurrence of sunrise and/or sunset.

Processing performed at block 2906 may include transmitting data to a network or one or more network devices. When a condition is defined based on an event related to operation of a network device (e.g., the status of the network device), that network device or another network device may be contacted to determine its status if known by that network device. Data may be transmitted to request status information about network devices including the network device identified in the condition. In some embodiments, a computing device that implements processing at block 2906 may search local memory (e.g., cache) to identity a status of the network device. As explained above, cache accessible to a network device or an access device can store status information about operation of network devices. The status information about the network device indicated in the condition may be analyzed to determine whether the event has occurred. When the computing device cannot determine the status from local memory, the computing device may communicate a request to other network devices on the network to determine the status of the network device.

In some embodiments, processing performed at block 2906 may include processing input received via an interface (e.g., a graphical interface or a physical interface). A condition may be defined based on occurrence of an interaction via an interface and/or one or more other criteria related to the interaction (e.g., a type of the interaction or a length of the interaction). The type of interaction may include one or more interactions. When the type of interaction is multiple interactions, the type of interaction may be based on continuous or non-continuous interactions. Interactions may include, without limitation, a touch, a tap, a flick, a pinch, a press, a swipe, a drag, a slide, other motion-based interactions, a presence of a person or an object, or combinations thereof. In some embodiments, the type of interaction may be based on use of one or more parts of a human body.

In one embodiment, a scene may be enacted when an interaction at a graphical interface of an access device occurs to control operation of a particular network device. To determine whether the interaction satisfying the condition has occurred, input received via interaction with an interface may be analyzed to determine whether the interaction satisfies the condition. Continuing with the previous example, the input may be analyzed to determine whether the interaction occurs with an interactive area that corresponds to the network device in the graphical interface.

At block 2908, data may be transmitted when a condition is satisfied. The transmitted data may indicate information that causes one or more actions corresponding to the condition to be performed. The one or more actions may be defined by a rule that indicates the condition.

An action that corresponds to a condition of a rule may include adjusting operation of a network device. The transmitted data may indicate attribute information about the attribute related to operation of a network device in a group of network devices. The attribute information may include a value for operation of the network device based on the attribute. The network device may be operated based on the attribute information.

In some embodiments, a scale of values for the attribute indicating by the attribute information may be different from a scale of values by which operation of the network device is configured for that attribute. The attribute information for the attribute may be based on input provided by a user according to a scale understandable by the user. The scale of values configured for operation of the network device for that attribute may not be understandable by a user unless the user is familiar with a configuration of the network device. For example, a value of an attribute for brightness of a light bulb may be based on a scale of value from 0 to 100 percent understandable by a user, whereas a configuration of a network device that is a light bulb may be configured to operate for brightness on a scale of values from 0 to 255, specific to the network device. The value for the attribute of brightness indicated by the attribute information may be based on a scale understandable by a user.

An adjustment may be determined for operation of the network device based on the attribute information (e.g., the attribute information retrieved at block 2904) for an attribute. A value of the attribute indicated by the attribute information may be converted to a value of the attribute according to a scale of values configured for operation of the network device for the attribute. In some embodiments, the value of the attribute may be sent to the network device and the network device may determine an adjustment for the attribute based on a configuration of the network device. In some embodiments, scale of values for an attribute related to operation of a network device may be different based on the type of attribute, the type of network device, or combinations thereof. In some embodiments, the scale of values for an attribute may be different for network devices that are configured differently, produced by different manufacturers, or combinations thereof. In some embodiments, data may be stored, which indicates conversion information for a scale of values of an attribute related to operation of a network device. The conversion information may indicate a conversion of a scale of values configurable by a user and a scale of values based on a configuration of the network device.

The transmitted data may indicate multiple adjustments, each of the adjustments related to operation of a different network device in a group of network devices. Each of the network devices may be controlled based on the adjustment to the attribute indicated by the transmitted data. When the group of network devices includes at least two different types of network devices, the transmitted data may indicate an adjustment to control operation of each of the different types of network devices.

In some embodiments, the transmitted data may include information identifying a rule (e.g., a rule identifier). Network devices may store information indicating one or more rules, and the actions to perform for those rules. A network device may determine actions to perform based on a rule identified by the rule identifier. Accordingly, a network device may adjust operation based on an attribute indicated for an action in a rule. A network device may convert a value of the attribute for operation of the network device based on the attribute if the value of the attribute is based on a scale of values different from a configuration of the network device.

Alternatively or additionally, the transmitted data may include information to cause a scene or a mode to be initiated when a condition is satisfied. The scene or the mode may be defined by a rule that indicates the condition. When a rule indicates initiating a scene or a mode upon satisfaction of a condition, the transmitted data may include information that causes the scene or the mode to be enacted. A scene or a mode may be defined by one or more actions, much like a rule. When an action for a scene or a mode includes controlling operation of a group of network devices, the transmitted data may cause a group of network devices to be adjusted for operation according to the scene or the mode. As explained above, one or more network devices may be adjusted based on transmitted data. For example, the transmitted data may indicate an adjustment to an attribute related to operation of a network device for a scene or a mode. In some embodiments, the transmitted data may indicate an identifier of a scene (e.g., a scene identifier) or an identifier of a mode (e.g., a mode identifier). A network device may store information about scenes and modes, such that the network device may determine action(s) for a scene or a mode based on the identifier included in the transmitted data. The network device may adjust its operation when indicated as an action for a scene or a mode. The operation may be adjusted based on the attribute indicated by an action in the scene or the mode.

An action corresponding to a condition may include sending communications, such as an electronic message (e.g., an email message or a SMS message) to one or more recipients. The transmitted data may indicate information about satisfaction of the condition determined at 2906. In one example, when a condition for a scene is satisfied, an email message may be sent to a computing device associated with a recipient. The email message may indicate information about the scene that is enacted and the actions performed for the scene. In such a case, data may be transmitted to an address (e.g., an email address or an IP address) indicated by a rule. The address may correspond to a recipient. Examples are described further below for configuring recipients of a message as an action for a rule.

Figure 30:
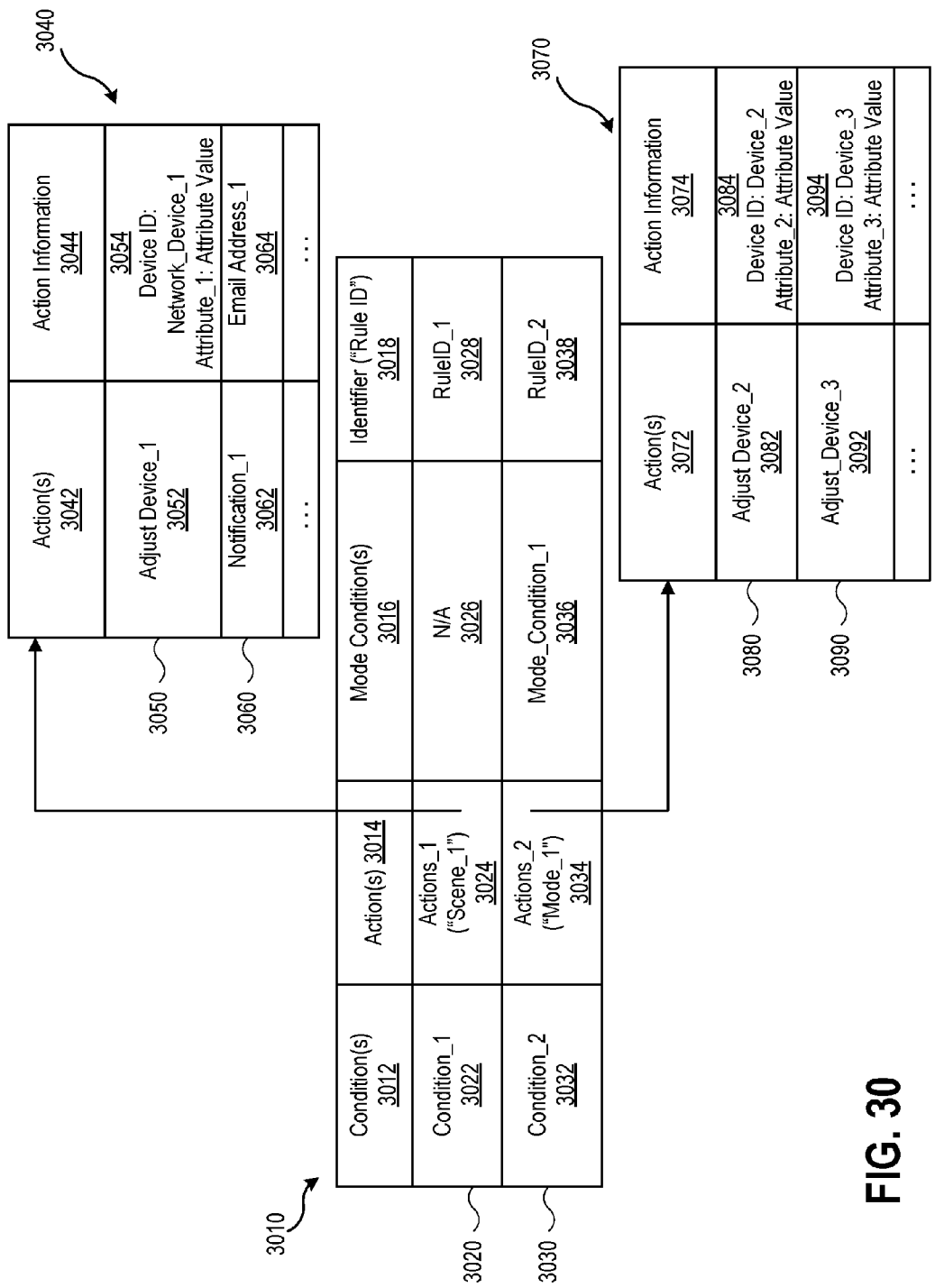
FIG. 30 shows a block diagram of various data structures for storing information about scenes and modes according to embodiments of the invention.

FIG. 30 shows a block diagram of various data structures for storing information about scenes and modes according to embodiments of the present invention. Each of the data structures shown in FIG. 30 may be implemented as one or a combination of many types of data structures including, without restriction, an array, a record, a relational database table, a hash table, a linked list, or other types of data structures. Any one of an access device (e.g., access device 108), a network device (e.g., network device 302), and/or a computing device (e.g., device 2722), each of which may be coupled to a network device may implement these data structures to store data.

For purposes of illustration, the data structures depicted in FIG. 30 are shown in a particular format and/or arrangement; however, the data structures may be implemented using more or less data structures implemented in a different format and/or arrangement than shown. In some embodiments, data stored using data structure 3010 may include information about one or more conditions and the corresponding action(s) to perform for those condition(s). In some embodiments, a separate data structure like data structure 3010 may be implemented for each distinct rule. As explained above, a rule may indicate one or more actions that may be performed upon satisfaction of a condition. The one or more actions may correspond to a scene or a mode. Actions can include controlling operation of a device, sending a notification, and/or triggering another rule. In the example shown in FIG. 30, data stored in data structure 3010 may include multiple entries (e.g., records) 3020, 3030, each of which indicates a condition 3012, one or more actions 3014, and an identifier ("Rule ID") 3018. Rule ID 3018 may be used to identify information in a record and may correspond to an identifier of a rule defined by information in the record. In some embodiments, an entry of data structure 3010 may include information indicating one or more conditions for operating a mode ("Mode Condition(s)"). The conditions may be defined when action(s) 3014 correspond to a mode.

Record 3020 may indicate a condition ("Condition_1") 3022 and one or more actions ("Actions_1") 3024. Actions_1 3024 may define a scene ("Scene_1"). In some embodiments, actions for a record in data structure 3010 may be stored in a different data structure. The record may include a reference to a location in memory of the data in the data structure storing the actions. For example, Actions_1 3024 may indicate a reference to a memory location of data structure 3050, which stores data indicating actions for Scene_1. In some embodiments, the reference may be defined by a join operation (e.g., a database table join operation) whereby data structure 3010 is linked or associated with data structure 3050 by record 3020. In this example, mode conditions 3026 for record 3020 has a null value (e.g., a value of 0) indicating that mode conditions are not applicable for Actions_1 3024 defined for Scene_1. In some embodiments, Actions_1 3024 may indicate an identifier for a scene (e.g., a scene identifier). The scene identifier may be associated with one or more actions in data structure 3040. Using the scene identifier, Actions_1 3024 may be identified in data structure 3010 for Scene_1. Record 3020 may include RuleID_1 3028 indicating a rule identifier corresponding to information the record.

Data structure 3040 may include multiple entries (e.g., records), each of which indicates an action 3042 and action information 3044 defining information to perform an action for a scene. For example, record 3050 may include Adjust_Device_1 3052 that indicates an action to adjust operation of a network device. Record 3050 may include action information 3054 to control operation of a device ("Network Device 1") (e.g., network device 304). Action information 3054 for record 3050 may indicate a device identifier of Network Device 1 ("Network_Device_1") and attribute information, e.g., "Attribute_1." Attribute_1 may indicate a value for adjusting operation of Network Device 1. As explained above, an attribute may have a value that is within a range of values. The range of values may be based on the attribute configured for the device (e.g., Network Device 1). In some embodiments, the range of values may be based on a scale of values displayed to a user. The scale of values may be different from the range of values based on a configuration of the device for the attribute. As such, the value of the attribute may have to be converted to the range of values based on the configured for operation of the device based on the attribute. As explained above, an adjustment may be transmitted to cause operation of Network Device 1 to be adjusted to the value indicated for Attribute_1. Attribute_1 may be defined based on input received using an interface at a device. The input may be provided by a user configuring Network Device 1 for a Scene_1.

In another example, record 3060 may indicate Notification_1 3062 that indicates an action to send a notification about Scene_1. Record 3060 may include action information 3064 to indicate information (e.g., a network address or an email address) where to send a notification for Notification_1 3062. In the example of FIG. 30, action information 3064 indicates Email_Address 1 3064 where Notification_1 3062 is to be sent.

In some embodiments, data structure 3040 may indicate an identifier for a scene (e.g., a scene identifier) when a scene is to be initiated for a rule. The scene identifier may be associated with one or more actions in data structure 3040. One or more actions 3042 may be identified in data structure 3040 based on a scene identifier.

Record 3030 may indicate a condition ("Condition_2") 3032 and one or more actions ("Actions_2") 3024. Actions_2 3034 may define a mode of operation ("Mode_1"). Mode_1 3034 may indicate a reference to a memory location of data structure 3070, which stores data indicating actions for Mode_1. Record 3030 may include RuleID_2 3038 indicating a rule identifier corresponding to information the record. In this example, record 3030 includes a mode condition ("Mode_Condition_1") 3036 for enacting Mode_1 3034. Mode_1 may be operated until occurrence of Mode_Condition_1 3036. In some embodiments, Actions_2 3034 may indicate an identifier for a mode (e.g., a mode identifier). The mode identifier may be associated with one or more actions in data structure 3070. Using the mode identifier, Actions_2 3034 may be identified in data structure 3010 for Mode_1.

Data structure 3070 may include multiple entries (e.g., records), each of which indicates an action 3072 and action information 3074 defining information to perform action for a mode. For example, record 3080 may include Adjust_Device_2 3082 that indicates an action to adjust operation of a network device according to Mode_Condition_1 3036. Record 3080 may include action information 3084 to control operation of a device ("Network Device 2") (e.g., network device 302). Action information 3084 for record 3080 may indicate a device identifier of Network Device 2 ("Network_Device_2") and attribute information, e.g., "Attribute_2." Attribute_2 may indicate a value for adjusting operation of Network Device 2. As explained above, an adjustment may be transmitted to cause operation of Network Device 2 to be adjusted to the value indicated by Attribute_2. Attribute_2 may be defined based on input received using an interface at a device. The input may be provided by a user configuring Network Device 2 for a Mode_1. In another example, record 3090 may include Adjust_Device_3 3092 that indicates an action to adjust operation of a network device according to Mode_Condition_1 3036. Record 3090 may include action information 3094 to control operation of a device ("Network Device 3") (e.g., network device 306). Action information 3094 for record 3090 may indicate a device identifier of Network Device 3 ("Network_Device_3") and attribute information, e.g., "attribute_3." Attribute_3 may indicate a value for adjusting operation of Network Device 3. Network Device 2 and Network Device 3 may be similar or different types of network devices. If similar, Attribute_2 and Attribute_3 may correspond to different attributes of a network device, if Network Device 2 and Network Device 3 are similar or identical types of devices.

In some embodiments, one of actions 3072 in a record of data structure 3070 may indicate an identifier for a mode (e.g., a mode identifier) when a mode is to be initiated for a rule. The mode identifier may be associated with one or more actions in data structure 3040. One or more actions 3042 may be identified in data structure 3040 based on a mode identifier.

FIG. 31 shows examples of configurations of scenes according to embodiments of the present invention. For purposes of explanation, a table 3100 is depicted to illustrate examples of scenes (e.g., a movie scene, a reading scene, or a home scene). The examples shown in FIG. 31 may be implemented using one or more data structures, such as those described with reference to FIG. 30.

Table 3100 is shown with multiple scenes 3102. Each record in table 3100 may correspond to a different scene. In some embodiments, the scenes may be pre-defined. The pre-defined scene(s) may be configurable by a user. A scene may be pre-defined based on previous use of those devices, such as use of a combination of devices. In some embodiments, identical scenes may be defined, but identified as different scenes. A scene may be defined based one or more conditions 3104, such that the scene is initiated when condition(s) 3104 have been satisfied. For example, a scene may be defined by a rule, where the action(s) performed for the rule define the scene. Table 3100 may include one or more action(s) for a scene. Actions may include device action(s) 3106.

In one example, table 3100 includes a record 3110 indicating a configuration of a movie scene 3112. Device actions 3116 for movie scene 3112 may be initiated when condition 3114 occurs. Condition 3114 may be defined by one or more events related to watching a movie. For example, condition 3114 may be a state (e.g., power state of "ON") of a network device, such as a media device. When the media device (e.g., a television) is adjusted to a power state of "ON", device actions 3116 of record 3110 may be initiated. Device actions 3116 may include adjusting a power state of a light bulb (e.g., "Light_1" and "Light_2") and an appliance (e.g., "Kitchen_Appliance"). The states of each device may be adjusted differently. Device actions 3116 may include adjusting an attribute of a device, such as brightness of Light 1.

In another example, table 3100 includes a record 3120 indicating a configuration of a reading scene 3122. Device actions 3126 for reading scene 3122 may be initiated when condition 3124 occurs. Condition 3124 may be defined based on events that precede a time period when a user may prefer to read a physical document (e.g., a book). For example, condition 3124 may be defined by a time period (e.g., 5 pm to 9 pm) and a power state (e.g., a power state of "ON") of a lighting system (e.g., "Office Lighting"). When condition 3124 is satisfied, device actions 3126 of record 3120 may be initiated. Device actions 3126 may include adjusting a power state of a light bulb (e.g., "Light_3") and a media device (e.g., "Stereo"). The states of each device may be adjusted differently.

In yet another example, table 3100 includes a record 3130 indicating a configuration of a home scene 3132. Device actions 3136 for home scene 3132 may be initiated when condition 3134 occurs. Condition 3134 may be defined based on events that indicate when a user returns home. For example, condition 3134 may be defined by a time period (e.g., 5 pm to 27 am) and a power state (e.g., a power state of "ON") of a light bulb (e.g., "Hallway_Light"). When condition 3134 is satisfied, device actions 3136 of record 3120 may be initiated. Device actions 3136 may include adjusting a power state of a light bulb (e.g., "Kitchen_Light") and a security system (e.g., "Security System"). The states of each device may be adjusted differently.

FIG. 32 shows examples of configurations of modes according to embodiments of the present invention. For purposes of explanation, a table 3200 is depicted to illustrate examples of modes (e.g., a home mode, an away mode, or a sleep mode). The examples shown in FIG. 32 may be implemented using one or more data structures, such as those described with reference to FIG. 30.

Table 3200 is shown with multiple modes 3202. Each record in table 3200 may correspond to a different mode. In some embodiments, the modes may be pre-defined. The pre-defined mode(s) may be configurable by a user. A mode may be pre-defined based on previous use of those devices, such as use of a combination of devices. In some embodiments, identical modes may be defined, but identified as different modes. A mode may be defined based one or more conditions 3204, such that the mode is initiated when condition(s) 3204 have been satisfied. For example, a mode may be defined by a rule, where the action(s) performed for the rule define the mode. Table 3200 may include one or more action(s) for a mode. Actions may include device action(s) 3206. Table 3200 may include one or more mode conditions 3208. Device actions 3206 for a mode may be persistent such that they are maintained until mode condition(s) 3208 have been satisfied.

In one example, table 3200 includes a record 3210 indicating a configuration of a home mode 3212. Device actions 3216 for home mode 3212 may be initiated when condition 3214 occurs. Condition 3214 may be related to adjusting devices for a home environment when a home mode may be operated. For example, condition 3214 may be a time period (e.g., 4 pm-8 am) when a user is physically present at his home. When condition 3214 is satisfied, device actions 3216 may be initiated. Device actions 3216 may include adjusting a power state of a light bulb (e.g., "porch lighting") and an appliance (e.g., "Heater"). The states of each device may be adjusted differently. Device actions 3216 may persist until mode condition(s) 3218 are satisfied. In other words, the devices adjusted according to device actions 3216 may be maintained in a state adjusted for device actions until mode conditions 3218 is satisfied. Here, Porch_Lighting and Heater may be adjusted to a state indicated by device actions 3216 until a security system (e.g., "Security System") is adjusted to a power state of "ON" as indicated by mode condition 3218.

In another example, table 3200 includes a record 3220 indicating a configuration of an away mode 3222. Device actions 3226 for away mode 3222 may be initiated when condition 3224 occurs. Condition 3224 may be related to adjusting devices when a user may be away from an environment (e.g., a home). For example, condition 3224 may be state of a device, such as a security system (e.g., "Security System"), which corresponds to a state that indicates when a user is away. When condition 3224 is satisfied, device actions 3226 may be initiated. Device actions 3226 may include adjusting a power state of a light bulb (e.g., "Light_3") and an appliance (e.g., "Stereo"). The states of each device may be adjusted differently. Device actions 3226 may persist until mode condition(s) 3228 are satisfied. In other words, the devices adjusted according to device actions 3226 may be maintained in a state adjusted for device actions until mode conditions 3228 is satisfied. Here, Light_3 and Stereo may be adjusted to a state indicated by device actions 3226 until a security system (e.g., "Doorway_Light") is adjusted to a power state of "ON" as indicated by mode condition 3228.

In another example, table 3200 includes a record 3230 indicating a configuration of a sleep mode 3232. Device actions 3236 for sleep mode 3232 may be initiated when condition 3234 occurs. Condition 3234 may be related to adjusting devices when a user may be sleeping. For example, condition 3234 may be state of a device, such as an alarm clock (e.g., "Alarm Clock"), which corresponds to a state that indicates when a user is sleeping or will soon be sleeping. When condition 3234 is satisfied, device actions 3236 may be initiated. Device actions 3236 may include adjusting a power state of an appliance (e.g., "Television") and a light bulb (e.g., "Bedside_Lamp"). The states of each device may be adjusted differently. Device actions 3236 may persist until mode condition(s) 3238 are satisfied. In other words, the devices adjusted according to device actions 3236 may be maintained in a state adjusted for device actions until mode conditions 3238 is satisfied. Here, Television and Bedside_Lamp may be adjusted to a state indicated by device actions 3236 until a time period (e.g., 6 am) occurs as indicated by mode condition 3238.

Figure 33:
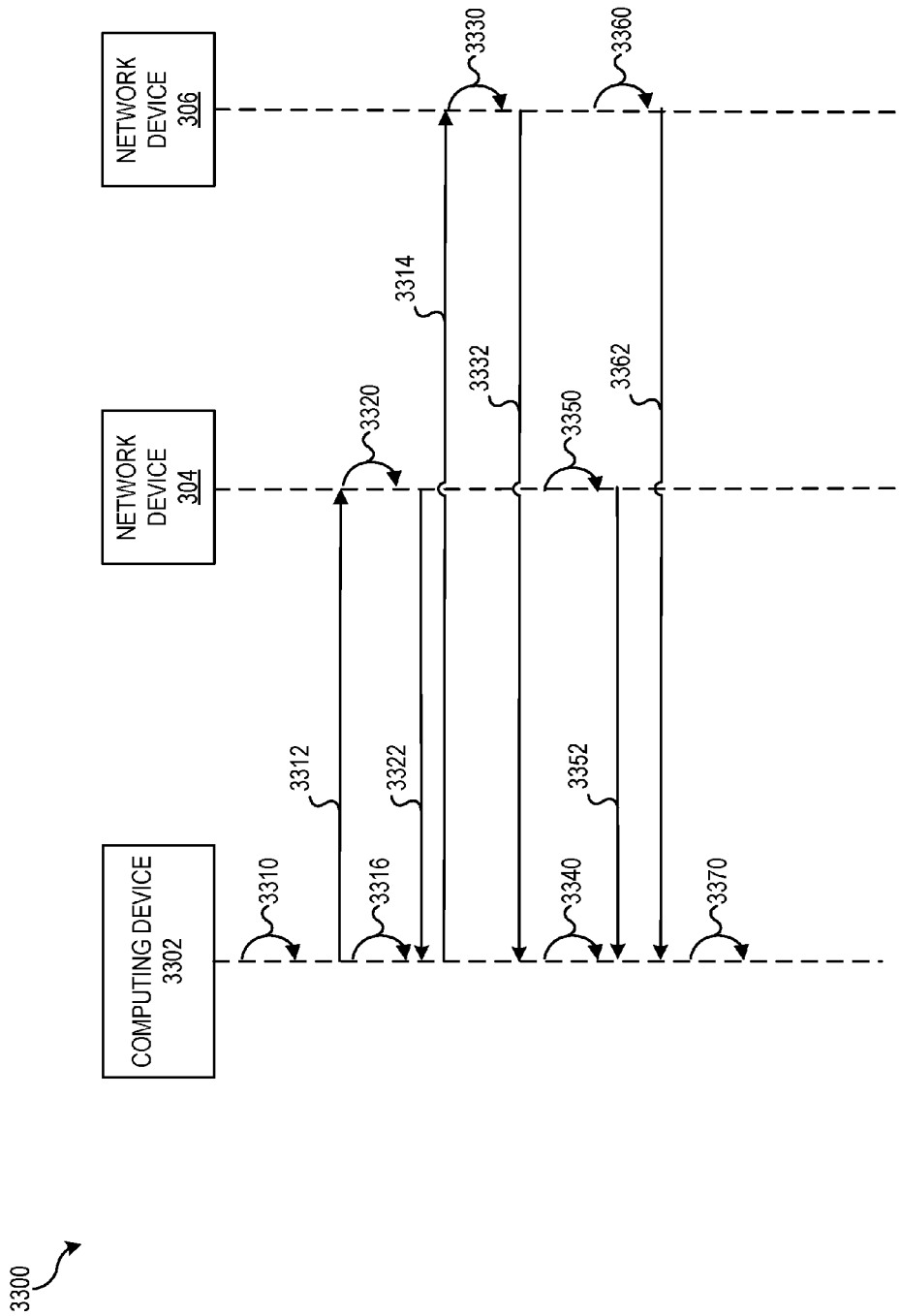
FIG. 33 illustrates a sequence diagram of a process for controlling operation of network devices according to embodiments of the invention.

FIG. 33 illustrates a sequence diagram of a process 3300 for controlling operation of network devices according to embodiments of the present invention. Specifically, FIG. 33 shows process 3300 that may be implemented to facilitate controlling operation of network devices for a scene or a mode. Computing device 3302 may be a computing device that implements the process described with reference to FIG. 29. Examples of computing devices 3302 may include, without limitation, an access device (e.g., access device 108), a network device (e.g., network device 302), or other devices (e.g., device 2722).

The following description of process 3300 includes techniques for transmitting data, such as those described with reference to FIG. 29. In some embodiments, computing device 3302 may transmit data to cause one or more actions to be performed (e.g., adjust operation of a network device), such as those performed when a condition of a rule is satisfied. Data may be transmitted to control operation of network devices 304, 306 when a condition is satisfied. In the example shown in FIG. 33, data may be transmitted by computing device 3302 to cause operation of one or more network devices 304, 306 to be adjusted for a scene or a mode.

The processing depicted with reference to FIG. 33 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 33 is not intended to be limiting. Other sequences of steps may also be performed according to alternative embodiments. For example, alternative embodiments of the present invention may perform the steps outlined above in a different order. Moreover, the individual steps illustrated in FIG. 33 may include multiple sub-steps that may be performed in various sequences as appropriate to the individual step. Furthermore, additional steps may be added or removed depending on the particular applications. One of ordinary skill in the art would recognize many variations, modifications, and alternatives. Process 3300 begins at 3310.

Before transmitting data, computing device 3302 may perform one or more operations 3310 to determine data to transmit to control operation of a group of network devices 304, 306 according to a scene or a mode when a condition is satisfied. Information about a scene or a mode stored in one or more data structures, such as those described with reference to FIG. 10, may be accessed to identify one or more settings or attributes to adjust network devices 304, 306 for the scene or the mode. Computing device 3302 may retrieve attribute information for an attribute of each of network devices 304, 306 to adjust for a scene or a mode. As explained earlier, data that is transmitted may include a value corresponding to each attribute of a network device to be adjusted. In some embodiments, computing device 3302 may determine an adjustment for a value of an attribute to a scale of values for that attribute configured for the network device to be adjusted. In some embodiments, a value of an attribute for operation of a network device may be adjusted by the network device to be adjusted instead of computing device 3302.

In some embodiments, operations 3310 may include retrieving information identifying a scene or a mode to be controlled. Operations 3310 may include processing the information to determine an identifier of a scene or a mode that is to be initiated. The identifier(s) may be included in the transmitted data, which a network device can use to identify the scene or the mode. The network device receiving the transmitted data can use the identifier to identify the actions to be performed by the network device according to the mode or the scene.

In some embodiments, computing device may perform operations 3310 to determine data to transmit to cause operation of network devices 304, 306 to be adjusted to turn off a mode. In this instance, transmitted data may include an instruction that indicates an identifier of a mode to cease if active. In some embodiments, for a mode, computing device 3302 may perform operations 3310 to determine whether the mode condition(s) for the mode have been satisfied. Upon determining that the mode condition(s) for the mode have been satisfied, the transmitted data may include the instruction to cease operation of the mode. The instructions may include an identifier of the mode, which a network device may use to retrieve information about the mode.

Computing device 3302 may transmit data 3312 and transmit data 3314 to network device 304 and network device 306, respectively. Data 3312 and data 3314 may be transmitted via a network (e.g., network 300). In some embodiments, computing device 3302 may transmit data 3312, 3314 via a remote network, e.g., cloud 114, when computing device 3302 is not located within a network to which network devices 304, 306 are connected. Computing device 3302 may transmit data by implementing techniques described above with reference to FIGS. 1-5 and 27.

The transmitted data (e.g., transmitted data 3312, 3314) may include information that causes a network device to adjust its operation according to a scene or a mode initiated when a condition is satisfied. For example, transmitted data may include an adjustment to control operation of a network device, such that when the transmitted data is received the network device may adjust a setting or an attribute according to the adjustment. In some embodiments, the transmitted data may include a value of an attribute related to operation of a network device as defined for the scene or the mode. The network device may convert the value of the attribute to an adjusted value according to a scale of values configured for operation of the network device based on that attribute.

In some embodiments, when computing device 3302 is a network device (e.g., network device 302), computing device 3302 may perform operations 3316 to transmit data to cause operation of computing device 3302 to be adjusted for operation according to a scene or a mode initiated when a condition is satisfied. Computing device 3302 may transmit data by sending a signal in computing device 3302 indicating that computing device 3302 is to be operated according to a scene or a mode. The signal may include information indicating a scene or a mode that is activated. The transmitted data may include an adjustment to control operation of computing device 3302 to adjust a setting or an attribute according to the adjustment. Computing device 3302 may convert the value of the attribute to an adjusted value according to a scale of values configured for operation of computing device 3302 based on that attribute.

Each of network device 304 and network device 306 may perform operations 3320 and 3330, respectively. For example, network devices 304, 306 may receive transmitted data 3312, 3314. In response to transmitted data 3312 and transmitted data 3314, network device 304 and network device 306, respectively, may send data 3322 (e.g., an acknowledgement signal) and data 3332 to computing device 3302 to confirm receipt of transmitted data 3312, 3314. In some embodiments, network devices 304, 306 may also send data indicating their own status to computing device 3302.

Computing device 3302 may perform operations 3340 in response to receiving data 3322, 3332. Data 3322, 3332 may be processed by computing device 3302 to determine whether network device 304 and/or network device 306 has been controlled based on transmitted data 3312 and transmitted data 3314, respectively. Computing device 3302 may cause an interface (e.g., an interface described with reference to FIG. 34 or 38) to be generated and displayed with information indicating a status of network devices 304, 306 based a response determined from processing data 3322 and 3332. The interface may indicate a status of network devices 304, 306 for a scene or a mode controlled based on transmitted data 3312, 3314.

Network device 304 and network device 306 may perform operations 3350 and operations 3360, respectively to adjust operation of the network device based on data 3312, 3314 received from computing device 3302. Operations 3350 and operations 3360 may further include adjusting operation of network device 304 and network device 306, respectively. In response to transmitted data 3312, 3314, each of network devices 304, 306 may control operation of the network device based on the transmitted data. When transmitted data 3312, 3314 indicates an operation to perform for a mode or a scene, each of network devices 304, 306 may adjust operation according to the mode or the scene. Operation may be adjusted based on an adjustment to an attribute indicated in transmitted data 3312, 3314. When the transmitted data indicates an instruction to cease operation for a mode, network devices 304, 306 may cease operation defined for the mode.

In some embodiments, an identifier in transmitted data may be used to identify a scene or a mode. Based on the identifier, network devices 304, 306 may retrieve (e.g., from accessible cache) information about the scene or the mode to determine actions to perform. Those actions may include adjusting operation of network devices 304, 306. In some embodiments, each of network devices 304, 306 may determine an adjustment for operation of the network device according to a value for an attribute indicated by transmitted data 3312, 3314. Techniques for determining an adjusted value of an attribute are described with reference to FIG. 29.

Each of network device 304 and network device 306 may perform operations 3320 and 3330, respectively. Each of network devices 304, 306 may determine whether operation of the network device has been adjusted for a scene or a mode based on transmitted data. Network device 304 and network device 306, respectively, may send data 3352 (e.g., an acknowledgement signal) and data 3362 to computing device 3302 to indicate a result of adjusting operation of network devices 304, 306 based on transmitted data. The result may indicate whether operation of a network device has been adjusted for a scene or a mode. In some embodiments, network devices 304, 306 may also send data indicating their own status to computing device 3302.

Computing device 3302 may perform operations 3370 to determine a result of operation of network devices 304, 306 for a scene or a mode. The result may be determined based on transmitted data 3352, 3362. In some embodiments, computing device 3302 may determine whether its operation has been adjusted for a scene or a mode when computing device 3302 is a network device. Computing device 3302 may cause an interface (e.g., an interface described with reference to FIG. 34 or 38) to be generated and displayed with information indicating a status of network devices 304, 306 based on the determined result. The interface may indicate a status of network devices 304, 306 for a scene or a mode controlled based on transmitted data 3312, 3314. In some embodiments, the interface may indicate a status about operation of each network device as the status is determined individually for each of the network devices. In some embodiments, when computing device 3302 communicates with network devices 304, 306 via a remote network, the status about operation of network devices for a scene or a mode may not be indicated until a result is determined for operation of all network devices to be controlled for the scene or the mode. The interface may indicate a status related to operation of network devices that are controlled to deactivate a mode including those network devices.

FIGS. 34-38 are examples of interfaces according to some embodiments. Each of the interfaces shown in FIGS. 34-38 may be implemented as a graphical interface. Each of the interfaces may be generated and displayed by a computing device (e.g., access device 108 or device 2722) according to some embodiments. In some embodiments, one computing device may generate a graphical interface and a different computing device may display the graphical interface. Some of the graphical interfaces depicted in FIGS. 34-38 may include one or more interactive components (e.g., an interactive area or an interactive element) to configure operation of a group of network devices.

Figure 34:
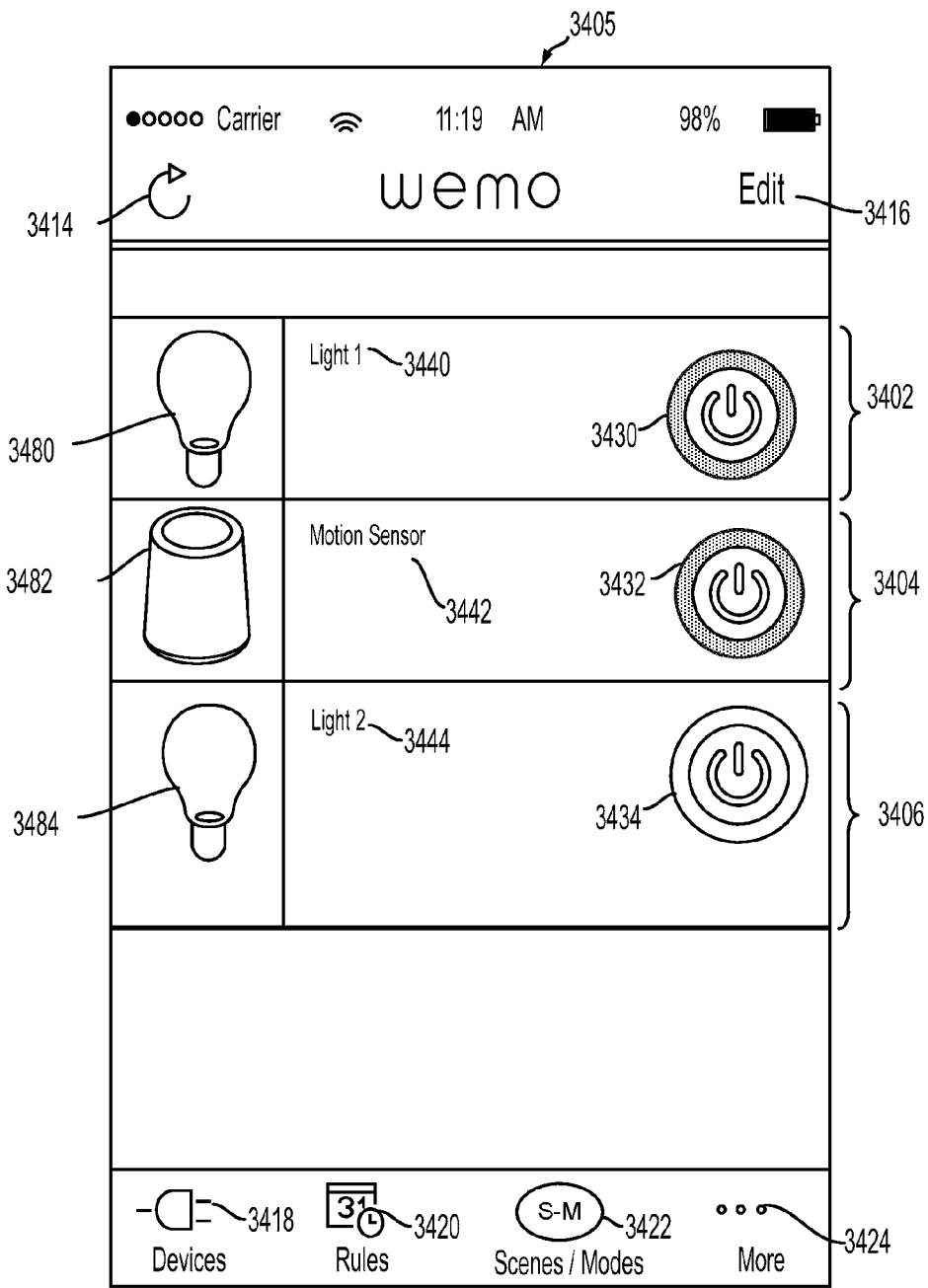
FIG. 34 shows an example of an interface for controlling operation of network devices according to embodiments of the invention.

FIG. 34 shows an example of an interface 3405 for controlling operation of network devices according to some embodiments. Interface 3405 may display modular tiles 3402, 3404, 3406 for interacting with network devices in a network. Modular tile 3402, modular tile 3404, and the modular tile 3406 may correspond to network device 302, network device 304, and network device 306, respectively. A modular tile may enable interactions to monitor and/or control operation of a network device corresponding to the modular tile. Interaction with a modular tile may enable a user to cause a status of the network device to be updated such that the tile may show a current status of the network device. In some embodiments, a modular tile may indicate a current status of a network device and may be modified to show updates in the status. In some embodiments, the status of a network device may indicate a scene or a mode for which that network device is operated and whether the status corresponds to an active or an inactive state of the scene or the mode. In some embodiments, the status of a network device corresponding to a modular tile may correspond to a change in status of the network device when the network device has been adjusted according to a scene or a mode.

A modular tile may include interactive areas or interactive elements to enable interaction with the modular tile. In some embodiments, the modular tile may be an interactive area or an interactive element to receive input to control operation of a network device corresponding to the tile. Modular tiles 3402, 3404, 3406 may each include respective icons 3480, 3482, 3484, and respective names 3450, 3452, 3454 corresponding to a network device. For example, modular tile 3402 corresponds to network device 302 (e.g., a light bulb) and includes an interactive element depicted as a power button 3430 for turning network device 302 on and off. In another example, modular tile 3404 corresponds to network device 304 (e.g., a motion sensor) and includes an interactive element depicted as a power button 3432 for turning network device 304 on and off. In another example, modular tile 3406 corresponds to network device 306 (e.g., a light bulb) and includes an interactive element depicted as a power button 3434 for turning network device 306 on and off.

An interactive element shown as a control (e.g., power button) in a modular tile may be displayed based on a state or a status of the network device corresponding to the tile including the control. An appearance of the interactive element may be altered to be visibly illuminated, colored, shaded, bolded, animated, modified to a different shape, or a combination thereof. In some embodiments, the interactive element may be modified to a modified interactive element. The modified interactive element may have a modified appearance that is different from an appearance of the interactive element before modification. Although depicted as a corresponding to a single network device, each modular tile may correspond to multiple network devices, or a group of network devices. For purposes of illustration, a modular tile is described herein as enabling control for operation of a network device. However, in some embodiments, a modular tile may enable control for operation of multiple network devices, some or all of which may be different.

In some embodiments, the modular tile may be an interactive element that is modified to reflect a status of a network device corresponding to the tile. The tile may be modified to a modified tile. The modified tile may have a modified appearance (e.g., a modified graphical appearance) that is different from an appearance (e.g., a graphical appearance) of the tile before modification. The appearance may be modified to reflect a current status or state of a network device corresponding to the tile. An appearance of the tile may be modified. For example, the tile may be modified to be visibly illuminated, colored, shaded, bolded, animated, modified to a different shape, or a combination thereof.

In some embodiments, a modular tile may be customizable by developers and/or manufacturers of the corresponding network devices. For, example, name 3444 of the modular tile 3404 is customized to indicate the name of a specific type of sensor (e.g., "Motion Sensor"). In additional or alternative embodiments, a modular tile may convey status information about a corresponding network device or network devices, including, but not limited to, a firmware version, a last known firmware update status, status for connectivity to a cloud network, an availability of the network device or network devices on the network, a firmware update status, a hardware update state, a software update status, connectivity errors or issues that the network device(s) may have encountered, communication issues between the network device(s) and other network devices, a power state, registration status (i.e., an indication that the network device has a key or does not), a primary mode of the network device (i.e., on, off), a secondary mode of the network device (i.e., standby, high, low, eco), other modes of operation, a schedule, settings (e.g., speed or sensitivity) for the network device, one or more attributes (e.g., brightness) related to operation of the network device, rules that may be in effect for the network device or related to operation of the network device, a scene that may be in effect for the network device, a mode that may be in effect for the network device, or a combination thereof.

Each of modular tiles 3402, 3404, 3406 may be chosen and displayed based on the type and/or capabilities of a network device (e.g., the network devices 3402, 3404, 3406). The interface 3405 may be flexible and may dynamically display the most appropriate modular tile 3402 based on an environment in which the application executes. For instance, interface 3405 may enable a mechanism in which a user may pre-configure a modular tile to display an appropriate message for a network device.

FIG. 34 shows that interface 3405 may include interactive elements (e.g., selectable icons and links) 3414, 3416, 3418, 3420, 3422, and 3424 outside of modular tiles 3402, 3404, 3406. For example, refresh icon 3414 may be selected to refresh information presented in interface 3405, such as, for example, status and state information displayed in or indicated by the modular tiles 3402, 3404, 3406. For instance, one or more of the statuses for each of modular tiles 3402, 3404, 3406, respectively, may be refreshed on an automatic, periodic basis, in addition to being manually updated when refresh icon 3414 is interacted with (e.g., selected).

In some embodiments, interface 3405 may include an edit link 3416. Interaction with edit link 3416 may enable one or more of modular tiles 3402, 3404, 3406 to be editable. For example, edit link 3416 may be selected to sort or re-order the sequence of the modular tiles 3402, 3404, 3406 displayed in the interface 3405. Upon interaction with the edit link 3416, interaction with one or more of modular tiles 3402, 3404, 3406 may cause that modular tile to be disabled or removed. Devices icon 3418 may be selected to cause a graphical interface to be presented with one or more network devices that are discovered in a network.

In some embodiments, interface 3405 may include a rules icon 3420. Interaction with a rules icon 3420 may enable a graphical interface that enables customization of display rules pertaining to the network devices. The graphical interface may provide one or more interactive elements to control one or more rules related to control of the network devices (e.g., the network devices 302, 304, 306). In some embodiments, interaction with rules icon 3420 may enable a graphical interface to enable a user to configure rules, scenes, modes, or combinations thereof, any or all of which may be stored locally on the network device presenting the interface 3405 or other network devices (e.g., network devices 302, 304, 306). The graphical interface may be presented in the interface 3405 or may be shown separately from interface 3405.

In some embodiments, interface 3405 may include an interactive element 3422 ("Scenes/Modes"). Interaction with interactive element 3422 may cause a graphical interface to be displayed that enables operation of scenes and/or modes. For the example, such a graphical interface may be interactive to receive input to initiate a scene or a mode that has been configured. The graphical interface may be displayed in interface 3405, concurrently with interface 3405, or separate from interface 3405. Examples of a graphical interface to configure and/or control operation of scenes and/or modes is described below with reference to FIGS. 35-38.

In some embodiments, interaction with some elements in interface 3405 may cause a scene or a mode to be initiated. For example, a scene or a mode may be initiated based on satisfaction of a condition defined based on interaction with interface 3405. The condition may be defined for interaction with a modular tile corresponding to a particular network device. In another example, a scene or a mode may be initiated based on a change in status related to operation of a network device. The scene or the mode may be configured for a condition defined based on the status of the network device.

In some embodiments, interface 3405 may include a more icon 3424. Interaction with more icon 3424 may provide one or more additional graphical interfaces to enable access to additional features for controlling and/or monitoring the network devices in a network. For example, an additional graphical interface may be displayed to control one or more settings and/or attributes of any network devices connected to a network.

Interface 3405 may receive input to adjust one or more settings and/or one or more attributes related to operation of a network device corresponding to a tile presented in the interface 3405. The functionalities may include secondary functionalities, tertiary functionalities, etc. beyond primary functionalities (e.g., power control). Interface 3405 may be interactive or may include interactive areas configured to receive input to assist the user in controlling functionality, settings, and/or attributes of a network device identified in interface 3405. Interface 3405 may be interactive or may include interactive areas to enable initiation of actions and additional actions. For example, each of modular tiles 3402, 3404, 3406 may be interactive to receive input. The input received via a modular tile may be used to control operation of a network device corresponding to the modular tile. The input may include one or more contacts by a user. A contact may include a tap, a touch, a click, a swipe, a circular motion, a selection, a continuous movement, other motions, other user interactions, user movements, or combinations thereof. In some embodiments, the input may be received as a series of inputs to control the network device corresponding to the modular tile. The contact may occur in one or more directions on interface 3405 or a modular tile.

The adjustment for controlling operation of the network device 306 may include adjusting an attribute or an setting (e.g., brightness) of the network device 306. The adjustment to the attribute can be based on an amount of the input, a length of time when the input is received, a distance of movement corresponding to the input, a direction of the input, or any other data obtained from the input. The network device can be adjusted from a last known state of operation or last known state of an attribute or setting.

Figure 35:
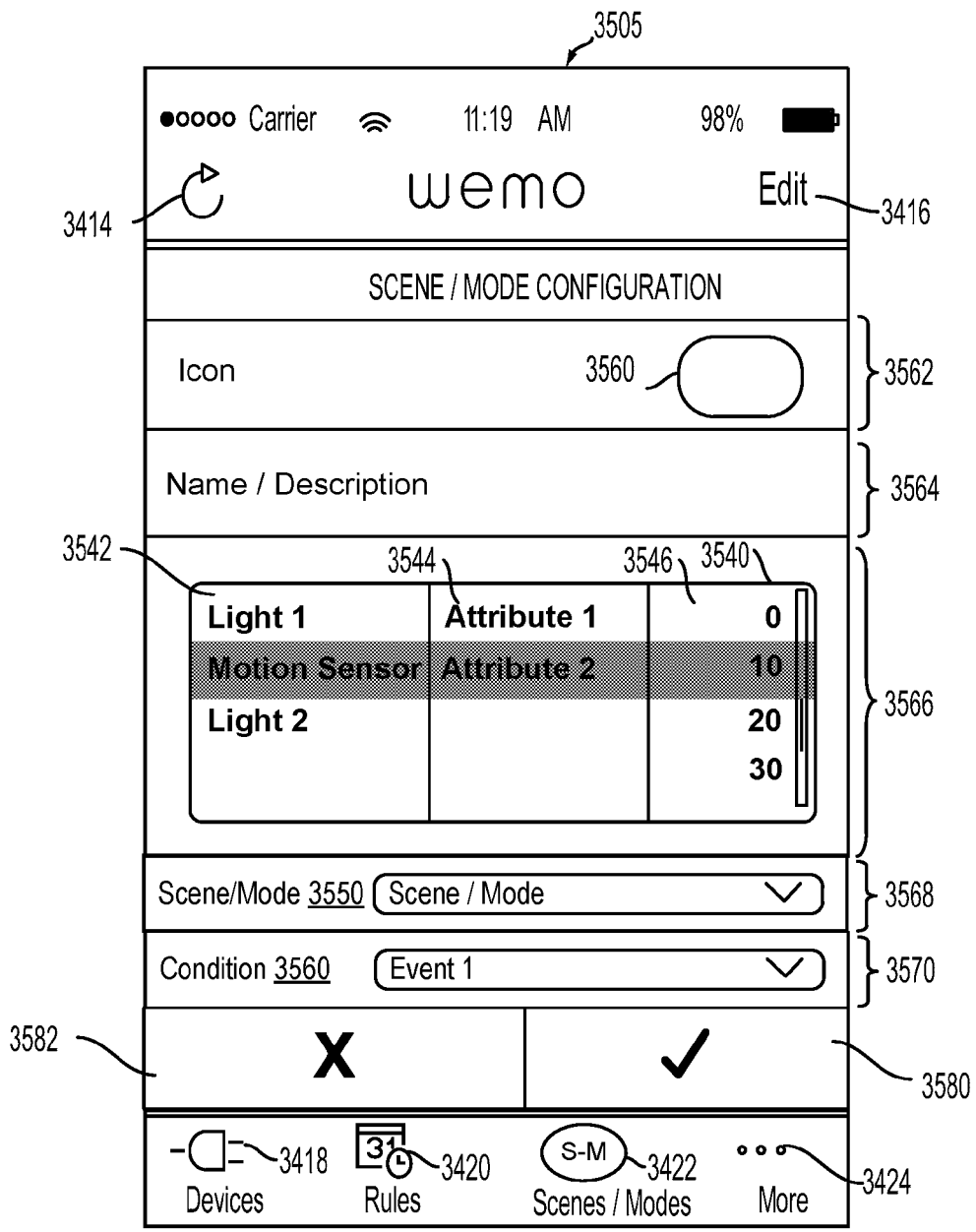
FIG. 35 shows an example of an interface for configuring a scene or a mode according to some embodiments of the invention.

FIG. 35 shows another example of an interface 3505 for configuring a scene or a mode according to some embodiments. Interface 3505 is an example of a graphical interface that may be interactive to receive input to configure a scene or a mode to control operation of one or more network devices. In some embodiments, interface 3505 may be interactive to enable receive input from a user to select one or more suggested scenes or modes of operation displayed by interface 3505. Interface 3505 may include elements described with reference to FIG. 34.

Interface 3505 may be displayed in a variety of ways. Interface 3505 may be presented based on interaction with interface 3405 shown in FIG. 34. For example, interaction with interactive element 3422 may trigger interface 3505 to be presented. In another example, interface 3505 may be presented in response to interaction with any one of modular tiles 3402, 3404, 3406. Interface 3505 may be presented to enable configuration of a scene or a mode for a network device that was adjusted using interface 3405. A scene or mode indicated in interface 3505 may be suggested based on the network device controlled in interface 3405. For example, based on interaction with a network device (e.g., light bulb), a configuration of a scene or a mode including that network device may be suggested.

Interface 3505 may include one or more modular tiles, each of which may include an interactive area or an interactive element to receive input to configure a scene or a mode. Interface 3505 may include modular tile 3562. Modular tile 3562 may include an icon 3460 that is descriptive of a scene or a mode. In some embodiments, icon 3560 may be an interactive element that receives input for indicating an image to associate with a scene or a mode. For example, interaction with icon 3560 may cause interface 3505 or an additional interface that is interactive to receive input for indicating a source of an image to associate with a scene or a mode. The source may be chosen from a data source containing multiple images, some of which may be user-defined.

Modular tile 3564 in interface 3505 may be interactive to receive input for configuring a name and/or description of a scene or a mode. In some embodiments, modular tile 3564 may display a suggested scene or a name.

Modular tile 3566 in interface 3505 may include an interactive element 3540. Interactive element 3540 may be interactive to receive input for configuring a setting or an attribute for a network device. In some embodiments, interactive element 3540 may include one or more interactive controls. Interactive control 3542 in interactive element 3540 may display one or more network devices (e.g., any of network devices 302, 304, 306) connected to a network. Interaction with interactive control 3542 may cause selection of one of the network devices.

Interactive control 3544 in interactive element 3540 may display one or more attributes or settings that are configurable for a network device selected using interactive control 3542. In some embodiments, a setting or an attribute displayed by interactive control 3542 may correspond to a secondary or a tertiary control that is adjustable for a network device. An attribute for a secondary or a tertiary control may be configurable when a primary attribute is set to a particular state (e.g., power state "ON"). In some embodiments, a tertiary control may be adjustable when an attribute corresponding to a secondary control is in a particular state. Interaction with interactive control 3544 may cause selection of one of an attribute or a setting for a network device selected using interactive control 3542.

Interactive control 3546 in interactive element 3540 may be adjustable to configure a value corresponding to an attribute or a setting selected using interactive control 3544. Interactive control 3546 may display one or more values for configuring a setting or an attribute of a network device. The value(s) may correspond to a scale for a setting or an attribute. In some embodiments the values may be based on a different scale understandable by a user. For example, a brightness setting for a light may be based on a scale of values from 0 to 100 corresponding to percentage of brightness, whereas the actual values for adjusting the brightness setting may correspond to a different scale based on a configuration of the brightness setting for the light.

In some embodiments, a setting or an attribute for a network device indicated by interactive element may be preset to a value. The value may correspond to a current value of the setting or the attribute. In some embodiments, the value may be a suggested value for a scene or a mode. In some embodiments, each setting or attribute of network devices displayed by interactive element 3546 may be set to a suggested value in interactive element 3546.

Modular tile 3568 in interface 3505 may include one or more interactive elements to provide input to indicate whether a configuration of network devices using interface 3505 is for a scene or a mode. For example, modular tile 3568 may include interactive element 3550 to indicate input (e.g., a selection) of a scene or a mode corresponding to a configuration determined based on input received via interface 3505.

Modular tile 3570 in interface 3505 may include one or more interactive elements to configure one or more conditions for a scene or a mode. The condition(s) may be configured for initiating a scene or a mode. One or more of the condition(s) may correspond to a mode condition indicating when to cease operation according to a mode. The conditions may include, without limitation, those conditions described herein, such as conditions that can be defined for a rule. In some embodiments, interactive element 3560 may present one or more conditions that are pre-defined.

In one example, modular tile 3570 may include interactive element 3560 to receive input for configuration of a condition for operating a scene or a mode. In some embodiments, the condition may specified using interactive element 3560 may be used to initiate a scene or a mode, which may include actions such as controlling operation of a group of network devices. As shown in FIG. 35, interactive element 3560 may include an event (e.g., "Event 1") corresponding to an event for initiating operation of a scene or a mode. The event may be defined by operation of a network device (e.g., an adjustment of a network device to a value for a particular setting or attribute). An event chosen for a condition may correspond to a mode condition. For example, Event 1 may be a time period, which can be defined based on time, date, other time-based criteria, or combinations thereof. One or more additional graphical interfaces may be displayed with interactive elements to define a condition for a scene or a mode.

Interface 3505 may include an interactive element 3580 to receive input to confirm (e.g., accept) a mode or a scene configured using one or more interactive elements in interface 3505. Interaction with interactive element 3580 may cause the information for configuration or a mode or a scene to be stored.

Interface 3505 may include an interactive element 3582 to receive input to discard a mode or a scene configured using interface 3505. Interaction with interactive element 3582 may cause the information for configuration or a mode or a scene obtained from interface 3505 to be discarded (e.g., not stored).

Figure 36:
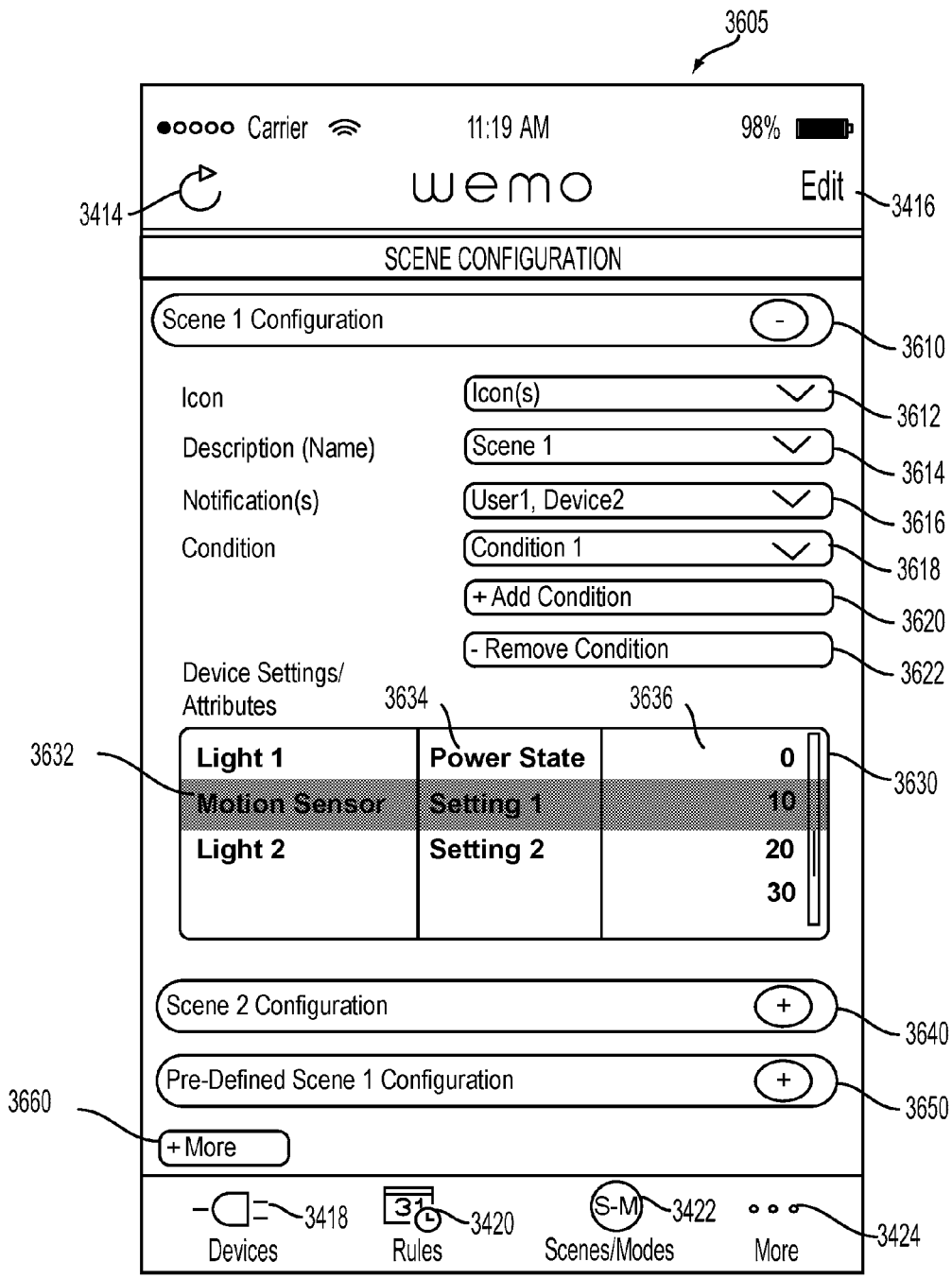
FIG. 36 shows an example of an interface for configuring a scene according to embodiments of the invention.

FIG. 36 shows an example of an interface 3605 for configuring a scene according to some embodiments. Interface 3605 is an example of a graphical interface that may be interactive to receive input to configure a scene. In some embodiments, interface 3605 may be interactive to enable receive input from a user to define conditions and actions for implementing a scene. Interface 3605 may include elements described with reference to FIG. 34.

Interface 3605 may be displayed in a variety of ways. Interface 3605 may be displayed in response to interaction with another graphical interface such as interface 3405 in FIG. 34 or interface 3505 in FIG. 35. For example, interaction with interactive element 3422 may trigger interface 3605 to be presented. In another example, interface 3605 may be presented in response to interaction with any one of modular tiles 3402, 3404, 3406.

Interface 3605 may be displayed using one or more modular tiles, each of which may include one or more interactive controls (e.g., an interactive area or an interactive element) to receive input to configure a scene. In some embodiments, interface 3605 may include an interactive control, e.g., interactive control 3610 ("Scene 1 Configuration"), interactive control 3640 ("Scene 2 Configuration"), and interactive control 3650 ("Pre-Defined Scene 1 Configuration"), for each distinct configuration of a scene. A configuration of a scene may be pre-defined with one or more conditions for the scene and one or more actions to be performed when those conditions are satisfied.

Interaction with an interactive control corresponding to a scene may cause interface 3605 to display one or more interactive controls for configuration of that scene. For a scene that is pre-defined, each of the interactive controls for configuration of a scene may be pre-selected with information for the corresponding interactive control of the scene.

FIG. 36 illustrates an example of interactive controls 3612, 3614, 3616, 3618, 3620, 3622, 3630 displayed by interface 3605 upon interaction with interactive control 3610 corresponding to "Scene 1". Interactive element 3612 ("Icon") may be interactive to receive input to associate an icon with a scene. Interactive element 3612 may include one or more pre-defined icons. Interactive element 3612 may receive input to indicate a location in storage (e.g., a file path to an image file) of an icon. Interactive element 3614 may be interactive to receive input for configuring a name and/or description of a scene. In some embodiments, interactive element 3614 may include one or more pre-defined names/descriptions.

Interactive element 3616 may be interactive to receive input to configure one or more notifications for a scene (e.g., Scene 1). A notification may be an action performed for operation of a scene. Notifications may include, without limitation, sending an electronic message to a destination computing device (e.g., a device associated with an IP address or a device that receives electronic messages).

Interactive element 3616 may include one or more selectable options to indicate destinations (e.g., an email address, a phone number, an IP address, a user, or a device) for receiving a notification about Scene 1. In some embodiments, interactive element 3616 may be interactive to receive input to indicate a destination to receive a notification.

In some embodiments, interactive element 3618 may be interactive to receive input to configure a condition for initiating a scene. As explained above, a condition may be based on an identifiable event (e.g., operation of a network device or occurrence of a time period). Interactive element 3618 may display one or more pre-defined conditions, which may be selected using interactive element 3618. In some embodiments, interactive element 3618 may include conditions that were previously defined for a different scene. In some embodiments, interactive element 3618 may be interactive to cause an additional graphical interface to be displayed with one or more additional interactive elements to configure a condition. Interface 3605 may include an interactive element 3620 ("Add Condition") to add a condition for operation of a scene. Interaction with interactive element 3620 may cause interface 3605 to display another interactive element similar to interactive element 3618 to enable an additional condition for a scene to be added. Interface 3605 may include an interactive element 3622 ("Remove Condition") to remove a condition for operation of a scene.

Interactive element 3630 may be interactive to receive input for configuring a network device to operate for a scene. Interactive element 3630 may be interactive to receive input for configuring a setting or an attribute for operation of a network device. In some embodiments, interactive element 3630 may include one or more interactive controls. Interactive control 3632 in interactive element 3630 may display one or more network devices (e.g., any of network devices 302, 304, 306) connected to a network. Interaction with interactive control 3632 may cause selection of one of the network devices.

Interactive control 3634 in interactive element 3630 may display one or more attributes or settings that are configurable for a network device selected using interactive control 3632. In some embodiments, a setting or an attribute displayed by interactive control 3632 may correspond to a secondary or a tertiary control that is adjustable for a network device. An attribute for a secondary or a tertiary control may be configurable when a primary attribute is set to a particular state (e.g., power state "ON"). In some embodiments, a tertiary control may be adjustable when an attribute corresponding to a secondary control is in a particular state. Interaction with interactive control 3634 may cause selection of one of an attribute or a setting for a network device selected using interactive control 3632.

Interactive control 3636 in interactive element 3630 may be adjustable to configure a value corresponding to an attribute or a setting selected using interactive control 3634. Interactive control 3636 may display one or more values for configuring a setting or an attribute of a network device. The value(s) may correspond to a scale for a setting or an attribute. In some embodiments the values may be based on a different scale understandable by a user. For example, a brightness setting for a light may be based on a scale of values from 0 to 100 corresponding to percentage of brightness, whereas the actual values for adjusting the brightness setting may correspond to a different scale based on a hardware configuration for the light.

In some embodiments, a setting or an attribute for a network device indicated by interactive element may be preset to a value. The value may correspond to a current value of the setting or the attribute. In some embodiments, the value may be a suggested value for a scene. In some embodiments, each setting or attribute of network devices displayed by interactive element 3636 may be set to a suggested value in interactive element 3636.

In some embodiments, interface 3605 may include one or more interactive controls to define other types of actions that are to be performed when the condition(s) for a scene has been satisfied. The other types of actions may include controlling operation of a network, e.g., such as adjusting a configuration of a network to deny access to a device.

In some embodiments, interface 3605 may include an interactive element 3660 ("More") to cause interface 3605 to display more information related to configuration of scenes. Interaction with interactive element 3660 may cause interface 3605 to be updated to display one or more additional interactive elements to enable configuration of scenes in addition to the scenes (e.g., Scene 1, Scene 2, and Pre-Defined Scene 1) which can be configured using interactive controls shown in FIG. 36. For example, interaction with interactive element 3660 may cause an additional interactive control ("Scene 3 Configuration") to be displayed. In some embodiments, interaction with interactive element 3660 may cause additional information to be shown about a configuration of a scene corresponding to an interactive control displayed in 3605, such as interactive control 3640 or interactive control 3650.

Figure 37:
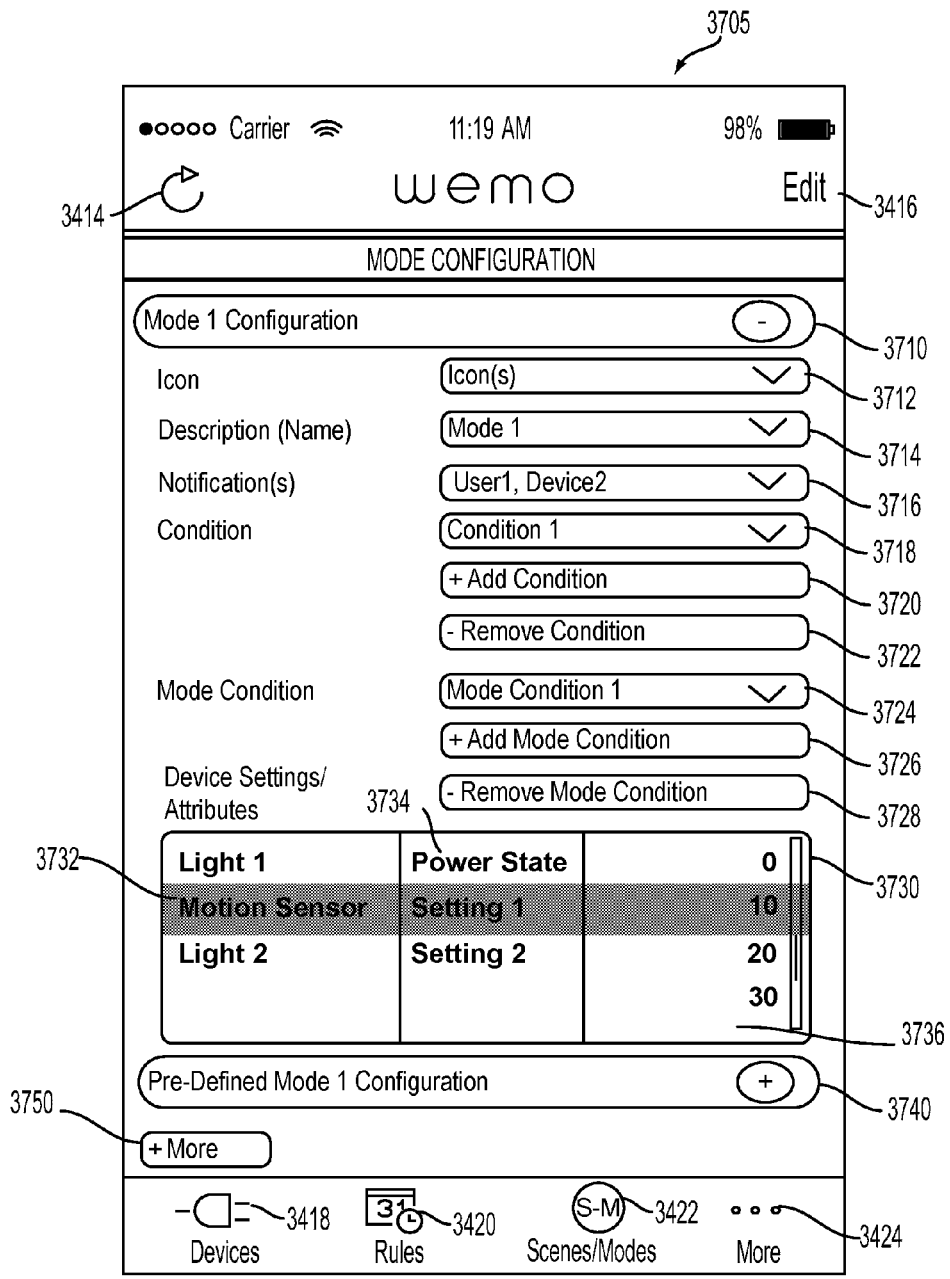
FIG. 37 shows an example of an interface for configuring a scene according to embodiments of the invention.

FIG. 37 shows an example of an interface 3705 for configuring a mode according to embodiments of the present invention. Interface 3705 is an example of a graphical interface that may be interactive to receive input to configure a mode. In some embodiments, interface 3705 may be interactive to enable receive input from a user to define conditions and actions for implementing a mode. Interface 3705 may include elements described with reference to FIG. 34.

Interface 3705 may be displayed in a variety of ways. Interface 3705 may be displayed in response to interaction with another graphical interface, such as interface 3405 in FIG. 34 or interface 3505 in FIG. 35. For example, interaction with interactive element 3422 may trigger interface 3705 to be presented. In another example, interface 3705 may be presented in response to interaction with any one of modular tiles 3402, 3404, 3406.

Interface 3705 may be displayed using one or more modular tiles, each of which may include one or more interactive controls (e.g., an interactive area or an interactive element) to receive input to configure a mode. In some embodiments, interface 3705 may include an interactive control, e.g., interactive control 3710 ("Mode 1 Configuration"), interactive control 3740 ("Pre-Defined Mode 1 Configuration"), for each distinct configuration of a mode. A configuration of a mode may be pre-defined with one or more conditions for the mode and one or more actions to be performed when those conditions are satisfied.

Interaction with an interactive control corresponding to a mode may cause interface 3705 to display one or more interactive controls for configuration of that mode. For a mode that is pre-defined, each of the interactive controls for configuration of a mode may be pre-selected with information for the corresponding interactive control of the mode.

FIG. 37 illustrates an example of interactive controls 3712, 3714, 3716, 3718, 3720, 3722, 3724, 3726, 3728, 3730 displayed by interface 3705 upon interaction with interactive control 3710 corresponding to "Mode 1". Interactive element 3712 ("Icon") may be interactive to receive input to associate an icon with a mode. Interactive element 3712 may include one or more pre-defined icons. Interactive element 3712 may receive input to indicate a location in storage (e.g., a file path to an image file) of an icon. Interactive element 3714 may be interactive to receive input for configuring a name and/or description of a mode. In some embodiments, interactive element 3714 may include one or more pre-defined names/descriptions.

Interactive element 3716 may be interactive to receive input to configure one or more notifications for a mode (e.g., Mode 1). A notification may be an action performed for operation of a mode. Notifications may include, without limitation, sending an electronic message to a destination computing device (e.g., a device associated with an IP address or a device that receives electronic messages). Interactive element 3716 may include one or more selectable options to indicate destinations (e.g., an email address, a phone number, an IP address, a user, or a device) for receiving a notification about Mode 1. In some embodiments, interactive element 3716 may be interactive to receive input to indicate a destination to receive a notification.

In some embodiments, interactive element 3718 may be interactive to receive input to configure a condition for initiating a mode. As explained above, a condition may be an identifiable event (e.g., operation of a network device or occurrence of a time period). Interactive element 3718 may display one or more pre-defined conditions, which may be selected using interactive element 3718. In some embodiments, interactive element 3718 may include conditions that were previously defined for a different mode. In some embodiments, interactive element 3718 may be interactive to cause an additional graphical interface to be displayed with one or more additional interactive elements to configure a condition. Interface 3705 may include an interactive element 3720 ("Add Condition") to add a condition for operation of a mode. Interaction with interactive element 3720 may cause interface 3705 to display another interactive element similar to interactive element 3718 to enable an additional condition for a mode to be added. Interface 3705 may include an interactive element 3722 ("Remove Condition") to remove a condition for operation of a mode.

In some embodiments, interactive element 3724 may be interactive to receive input to configure a mode condition for operating (e.g., terminating) a mode. As explained above, a mode condition may be an identifiable event (e.g., operation of a network device or occurrence of a time period). Interactive element 3724 may display one or more pre-defined mode conditions, which may be selected using interactive element 3724. In some embodiments, interactive element 3724 may include mode conditions that were previously defined for a different mode. In some embodiments, interactive element 3724 may be interactive to cause an additional graphical interface to be displayed with one or more additional interactive elements to configure a mode condition. Interface 3705 may include an interactive element 3726 ("Add Mode Condition") to add a mode condition for operation of a mode. Interaction with interactive element 3726 may cause interface 3705 to display another interactive element similar to interactive element 3724 to enable an additional mode condition for a mode to be added. Interface 3705 may include an interactive element 3728 ("Remove Condition") to remove a mode condition for operation of a mode.

Interactive element 3730 may be interactive to receive input for configuring a network device to operate for a mode. Interactive element 3730 may be interactive to receive input for configuring a setting or an attribute for operation of a network device. In some embodiments, interactive element 3730 may include one or more interactive controls. Interactive control 3732 in interactive element 3730 may display one or more network devices (e.g., any of network devices 302, 304, 306) connected to a network. Interaction with interactive control 3732 may cause selection of one of the network devices.

Interactive control 3734 in interactive element 3730 may display one or more attributes or settings that are configurable for a network device selected using interactive control 3732. In some embodiments, a setting or an attribute displayed by interactive control 3732 may correspond to a secondary or a tertiary control that is adjustable for a network device. An attribute for a secondary or a tertiary control may be configurable when a primary attribute is set to a particular state (e.g., power state "ON"). In some embodiments, a tertiary control may be adjustable when an attribute corresponding to a secondary control is in a particular state. Interaction with interactive control 3734 may cause selection of one of an attribute or a setting for a network device selected using interactive control 3732.

Interactive control 3736 in interactive element 3730 may be adjustable to configure a value corresponding to an attribute or a setting selected using interactive control 3734. Interactive control 3736 may display one or more values for configuring a setting or an attribute of a network device. The value(s) may correspond to a scale for a setting or an attribute. In some embodiments the values may be based on a different scale understandable by a user. For example, a brightness setting for a light may be based on a scale of values from 0 to 100 corresponding to percentage of brightness, whereas the actual values for adjusting the brightness setting may correspond to a different scale based on a hardware configuration for the light.

In some embodiments, a setting or an attribute for a network device indicated by interactive element may be preset to a value. The value may correspond to a current value of the setting or the attribute. In some embodiments, the value may be a suggested value for a mode. In some embodiments, each setting or attribute of network devices displayed by interactive element 3736 may be set to a suggested value in interactive element 3736.

In some embodiments, interface 3705 may include one or more interactive controls to define other types of actions that are to be performed when the condition(s) for a mode have been satisfied. The other types of actions may include controlling operation of a network, e.g., such as throttling network bandwidth.

In some embodiments, interface 3705 may include an interactive element 3750 ("More") to cause interface 3705 to display more information related to configuration of modes. Interaction with interactive element 3750 may cause interface 3705 to be updated to display one or more additional interactive elements to enable configuration of modes in addition to the modes (e.g., Mode 1 and Pre-Defined Mode 1) which can be configured using interactive controls shown in FIG. 37. For example, interaction with interactive element 3750 may cause an additional interactive control ("Mode 2 Configuration") to be displayed. In some embodiments, interaction with interactive element 3750 may cause additional information to be shown about a configuration of a mode corresponding to an interactive control displayed in 3705, such as interactive control 3740.

Figure 38:
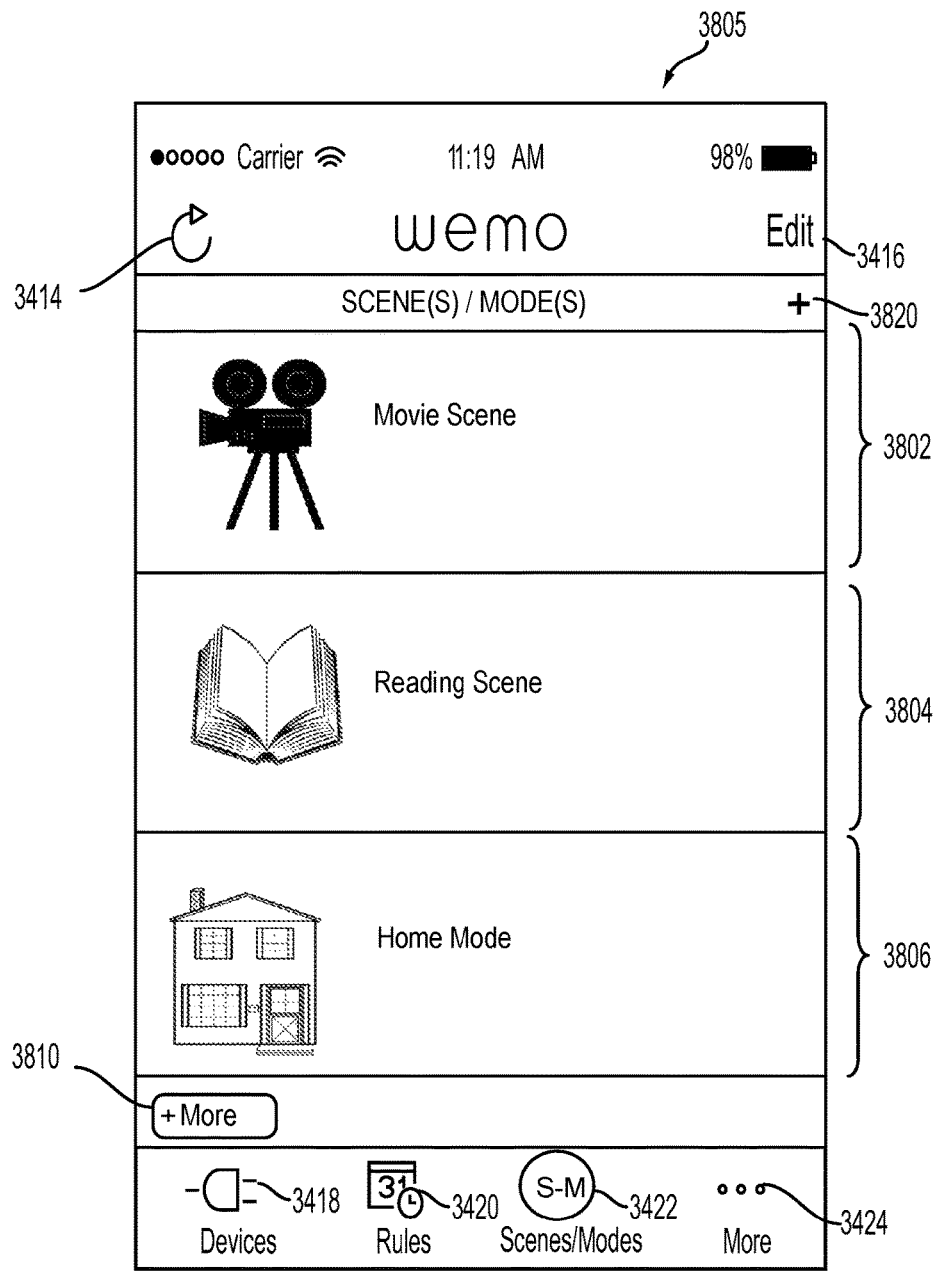
FIG. 38 shows an example of an interface for controlling scenes and modes according to some embodiments of the invention.

FIG. 38 shows an example of an interface 3805 for controlling scenes and modes according to some embodiments of the present invention. Interface 3805 may include one or more interactive controls to control (e.g., activate or deactivate) a scene or a mode. Scene(s) and/or the mode(s) identified in interface 3805 may be pre-defined or may be created using one or more interfaces described above. In some embodiments, interface 3805 may be displayed in response to interaction with interactive element 3422. Interface 3805 may include elements described with reference to FIG. 34.

Interface 3805 may display one or more modular tiles, e.g., modular tile 3802, modular tile 3804, modular tile 3806. A modular tile may be interactive and/or may include one or more interactive controls to control (e.g., activate and deactivate) a scene or a mode. A scene or a mode may be deactivated by interaction with the same control used to activate the scene or the mode. For example, each of modular tiles 3802, 3804, 3806 may be interactive to receive input to control a scene or a mode associated with the modular tile. As shown in FIG. 38, modular tile 3802 may be interactive to control a movie scene upon interaction with modular tile 3802. Modular tile 3804 may be interactive to control a or a movie scene upon interaction with modular tile 3802. Modular tile 3804 may be interactive to control a reading scene upon interaction with modular tile 3804. Modular tile 3806 may be interactive to control a home mode upon interaction with modular tile 3804. Alternatively or additionally, interface 3805 may display one or more interactive controls to control scenes and/or modes. Multiple scenes and/or modes may be controlled at once by a single interactive control.

Interface 3805 may display a status of scenes and/or modes. The status may indicate scenes and modes that are active and inactive. An appearance of one or more interactive controls, or a modular tile corresponding to a scene or a mode, may be displayed to indicate the status of the mode or the scene. To indicate status, an appearance may be altered to be visibly illuminated, colored, shaded, bolded, animated, modified to a different shape, or a combination thereof. For example, a modular tile may indicate a status of a scene or a mode corresponding to that modular tile. A status of a scene or a mode may include indicating a status of each network device operated according to that scene or mode. In some embodiments, a modular tile may indicate actions that have been performed for a scene or a mode corresponding to that modular tile. The status indicated for scenes and modes may also indicate those actions that could not be performed for those scenes and modes. In some embodiments, an interactive control or a modular tile corresponding to a mode may indicate information about the mode condition(s) for operation of that mode. Interaction with the interactive control or modular tile for a mode that is active may cause operation of the mode to cease.

In some embodiments, interface 3805 may include an interactive control ("More") 3810 that causes interface 3805 to display more information about scenes or modes. For example, interaction with interactive control 3810 may cause interface 3805 to display one or more interactive controls corresponding to additional scenes or modes. The additional scenes or modes may be presented in interface 3805 using techniques described above with reference to FIG. 38.

Interface 3805 may include an interactive control 3820 ("+") that enables one or more scenes and/or modes to be added, removed, or modified. In some embodiments, interaction with interactive control 3820 may cause any one of interfaces described with reference to FIGS. 35-37 to be displayed. An interface displayed as a result of interaction with interactive control 3820 may enable configuration of scenes and modes identified in interface 3805.

Figure 39:
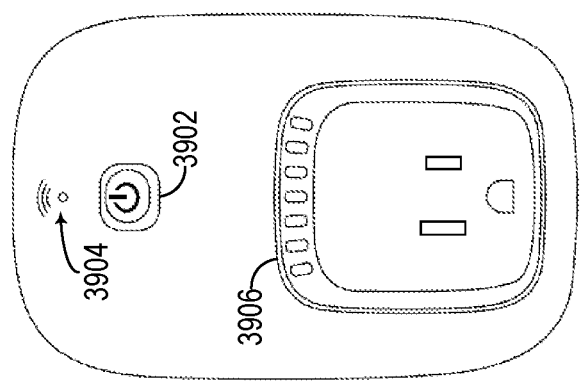
FIG. 39 is an illustration of an example of a front view of a network device, in accordance with some embodiments of the invention.
Figure 40:
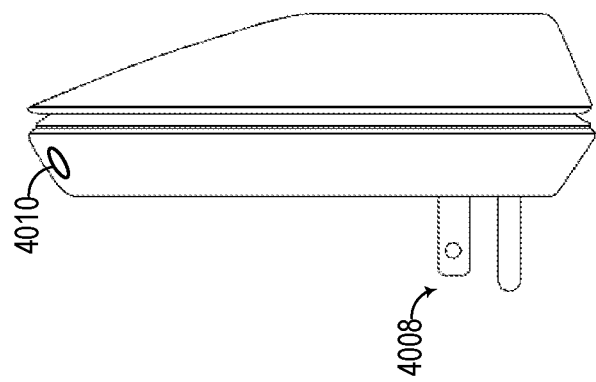
FIG. 40 is an illustration of an example of a side view of a network device, in accordance with some embodiments of the invention.

FIG. 39 illustrates an example of a front view of a network device 3900. FIG. 40 illustrates an example of a side view of the network device 3900. Network device 3900 can include one configured to communicate directly or indirectly (e.g., via a gateway or cloud network) with a secondary switch and/or can be configured to provide power to a lighting device, such as a lamp.

The network device 3900 may include any of the network devices 102, 104, or 106 described herein. In some embodiments, the network device 3900 may be a home automation network device. For example, the network device 3900 may include a home automation switch that may be coupled with a home appliance. A user may wirelessly access the network device 3900 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 3900 may include a WiFi enabled switch that connects home appliances and other electronic devices to a compatible 802.11b/g/n/ac WiFi network. The network device 3900 may thus allow users to locally or remotely turn devices on or off from anywhere, program customized notifications, and/or change device status. The network device 3900 may further allow a user to create custom schedules or have devices respond to sunrise or sunset.

The network device 3900 includes an power switch 3902 that may be depressed in order to turn the network device 3900 on and off. In some embodiments, a light source may be integrated with or located behind the power switch. For example, a light-emitting diode (LED) may be located on a circuit board under the power button 3902. The light source may be illuminated when the network device 3900 is powered on, and may not be illuminated when the network device 3900 is powered off.

The network device 3900 further includes a communications signal indicator 3904. The signal indicator 3904 may indicate whether the network device 3900 has access to a communications signal, such as a WiFi signal. For example, the signal indicator 3904 may include a light source (e.g., a LED) that illuminates when the network device 3900 is connected to a communications signal. The light source may depict different colors or other characteristics (e.g., flashing, dimming, or the like) to indicate different levels of signal strength or mode of operation.

The network device 3900 includes a restore button 4010. The restore button 4010 may allow a user to reset the network device 3900 to factory default settings. For example, upon being depressed, the restore button 4010 may cause all software on the device to be reset to the settings that the network device 3900 included when purchased from the manufacturer.

The network device 3900 further includes a plug 4008 and an outlet 3906. The plug 4008 allows the network device 3900 to be plugged into a wall socket, such as a socket providing 120V, 220V, or the like. In turn, an appliance may be plugged into the outlet 3906. Once the network device 3900 is registered according to the techniques described above, an appliance plugged into the socket 3906 may be controlled by a user using an access device (e.g., access device 108).

Figure 41:
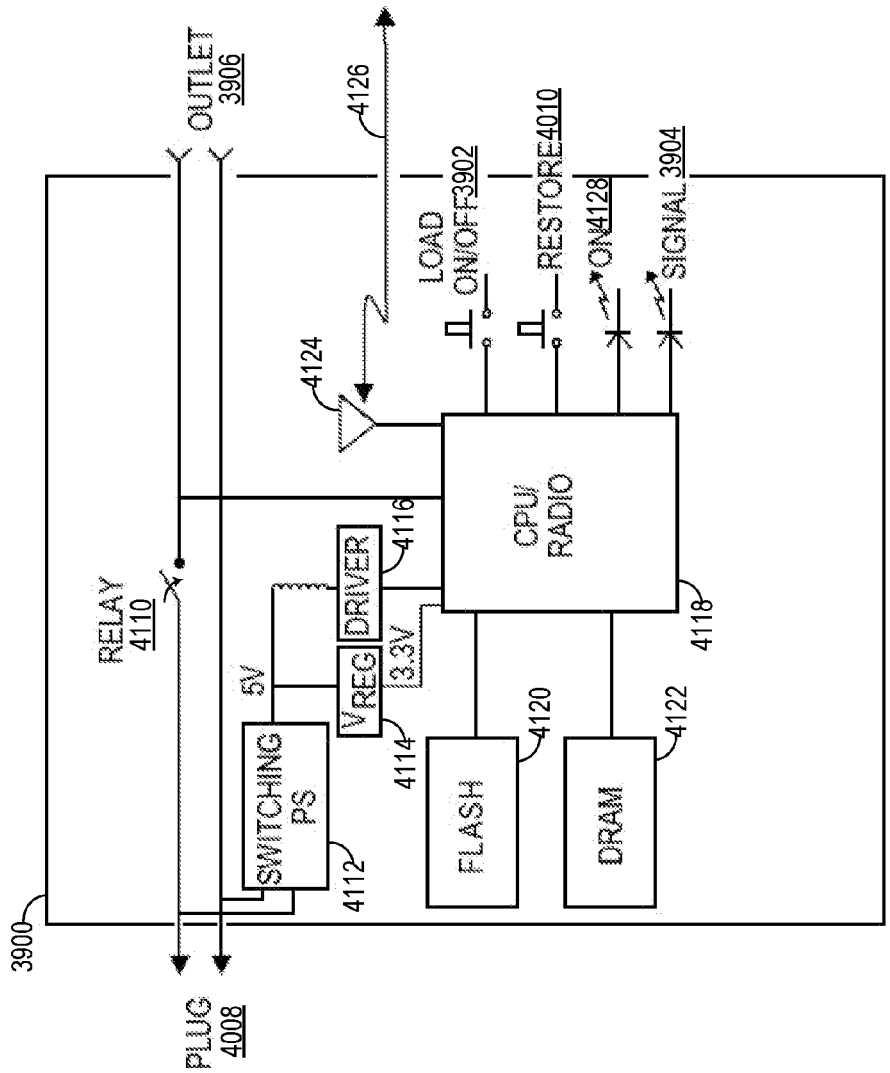
FIG. 41 is an example of a block diagram of a network device, in accordance with some embodiments of the invention.

FIG. 41 is an example of a block diagram of the network device 3900 depicting different hardware and/or software components of the network device 3900. As described above with respect to FIGS. 39 and 40, the network device 3900 includes the outlet 3906, the plug 4008, the power button 3902, the restore button 4010, and the communications signal indicator 3904. The network device 3900 also includes light source 4128 associated with the power button 3902. As previously described, the light source 4128 may be illuminated when the network device 3900 is powered on.

The network device 3900 further includes a relay 4110. The relay 4110 is a switch that controls whether power is relayed from the plug 4008 to the outlet 3906. The relay 4110 may be controlled either manually using the power button 3902 or remotely using wireless communication signals. For example, when the power button 3902 is in an ON position, the relay 4110 may be closed so that power is relayed from the plug 4008 to the outlet 3906. When the power button 3902 is in an OFF position, the relay 4110 may be opened so that current is unable to flow from the plug 4008 to the outlet 3906. As another example, an application or program running on an access device may transmit a signal that causes the relay 4110 to be opened or closed. For instance, an access application may display a graphical interface on the access device that includes a power button. The user may tap or otherwise select the power button, and the access application may send a communication signal (e.g., over a WiFi network) to the network device 3900 instructing the network device 3900 to open or close the relay 4110.

The network device 3900 further includes flash memory 4120 and dynamic random access memory (DRAM) 4122. The flash memory 4120 may be used to store instructions or code relating to an operating system, one or more applications, and any firmware. The flash memory 4120 may include nonvolatile memory so that any firmware or other program can be can updated. In the event the network device 3900 loses power, information stored in the flash memory 4120 may be retained. The DRAM 4122 may store various other types of information needed to run the network device 3900, such as all runtime instructions or code.

The network device 3900 further includes a CPU/Radio 4118. The CPU/Radio 4118 controls the operations of the network device 3900. For example, the CPU/Radio 4118 may execute various applications or programs stored in the flash memory 4120 and/or the dynamic random access memory (DRAM) 4122. The CPU/Radio 4118 may also receive input from the various hardware and software components, interpret the input, and perform one or more functions in response to the input. As one example, the CPU/Radio 4118 may determine whether the power button 3902 has been pressed, and determines whether the relay 4110 needs to be opened or closed. The CPU/Radio 4118 may further perform all communications functions in order to allow the network device 3900 to communicate with other network devices, one or more gateways, a cloud network, and/or one or more access devices. While the CPU and radio of the network device 3900 are shown to be combined in the CPU/Radio 4118, one of ordinary skill in the art will appreciate that, in some embodiments, the CPU and radio may be separately located within the network device 3900. For example, CPU circuitry may be situated at a separate location on a circuit board from the location of radio circuitry, the CPU circuitry may be located on a different circuit board from the radio circuitry, or the like. Further, the network device 3900 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 3900 does not include a cellular network transceiver radio or interface, and thus may not be configured to directly communicate with a cellular network. In some embodiments, the network device 3900 may include a cellular network transceiver radio, and may be configured to communicate with a cellular network using the cellular network transceiver radio.

The network device 3900 may communicate with other devices and/or networks via antenna 4124. For example, antenna 4124 may include a 2.4 GHz antenna, a 5 GHz antenna, or the like, that can transmit and receive WiFi communications signals. The network device 3900 may include other types of antennas that can communicate Bluetooth® signals, Zigbee® signals, Ultra-Wideband (UWB) signals, WiFi-Direct signals, BLE signals, and/or the like. In some embodiments, the antenna 4124 may be configured to communicate different types of signals, such as the WiFi signals, Bluetooth® signals, Zigbee® signals, UWB signals, WiFi-Direct signals, BLE signals, and/or the like. In some embodiments, the network device 3900 may include multiple antennas for communicating the different types of communication signals. As one example, the network device 3900 may include both a 2.4 GHz antenna and a 5 GHz antenna.

The network device 3900 further includes a driver 4116, a switching power supply 4112, and a voltage regulator 4114. The driver 4116 may include instructions or code that can be used to translate control signals or commands received from applications running on the DRAM 4122 to commands that the various hardware components in the network device 3900 can understand. In some embodiments, the driver 4116 may include an ambient application running on the DRAM 4122. The switching power supply 4112 may be used to transfer power from the outlet in which the plug 4008 is connected to the various loads of the network device 3900 (e.g., CPU/Radio 4118). The switching power supply 4112 may efficiently convert the voltage and current characteristics of the electrical power to a level that is appropriate for the components of the network device 3900. For example, the switching power supply 4112 may perform AC-DC conversion. In some embodiments, the switching power supply 4112 may be used to control the power that is relayed from the plug 4008 to the outlet 3906. The voltage regulator 4114 may be used to convert the voltage output from the switching power supply 4112 to a lower voltage usable by the CPU/Radio 4118. For example, the voltage regulator 4114 may regulate the DC voltage from 5V to 3.3V.

In various embodiments, functions may be stored as one or more computer-program products, such as instructions or code, in a non-transitory machine-readable storage medium, such as the flash memory 4120 and/or the DRAM 4122. The network device 3900 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform the steps described above with respect to FIG. 2. The memory, such as the flash memory 4120 and/or the DRAM 4122, may be a processor-readable memory and/or a computer-readable memory that stores software code (programming code, instructions, etc.) configured to cause a processor(s) within the CPU/Radio 4118 to perform the functions described. In other embodiments, one or more of the functions described may be performed in hardware.

A set of these instructions and/or code might be stored on a non-transitory machine-readable storage medium, such as the flash memory 4120 and/or the DRAM 4122. In some cases, the storage medium might be incorporated within a computer system, such as the CPU/Radio 4118. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions might take the form of executable code, which is executable by the network device 3900 and/or might take the form of source and/or installable code, which, upon compilation and/or installation on the network device 3900 (e.g., using compilers, installation programs, compression/decompression utilities, etc.) then takes the form of executable code.

It should be appreciated that the network device 3900 may have other components than those depicted in FIGS. 39-8. Further, the embodiment shown in the figures are only one example of a network device that may incorporate an embodiment of the invention. In some other embodiments, network device 3900 may have more or fewer components than shown in the figure, may combine two or more components, or may have a different configuration or arrangement of components.

Figure 42:
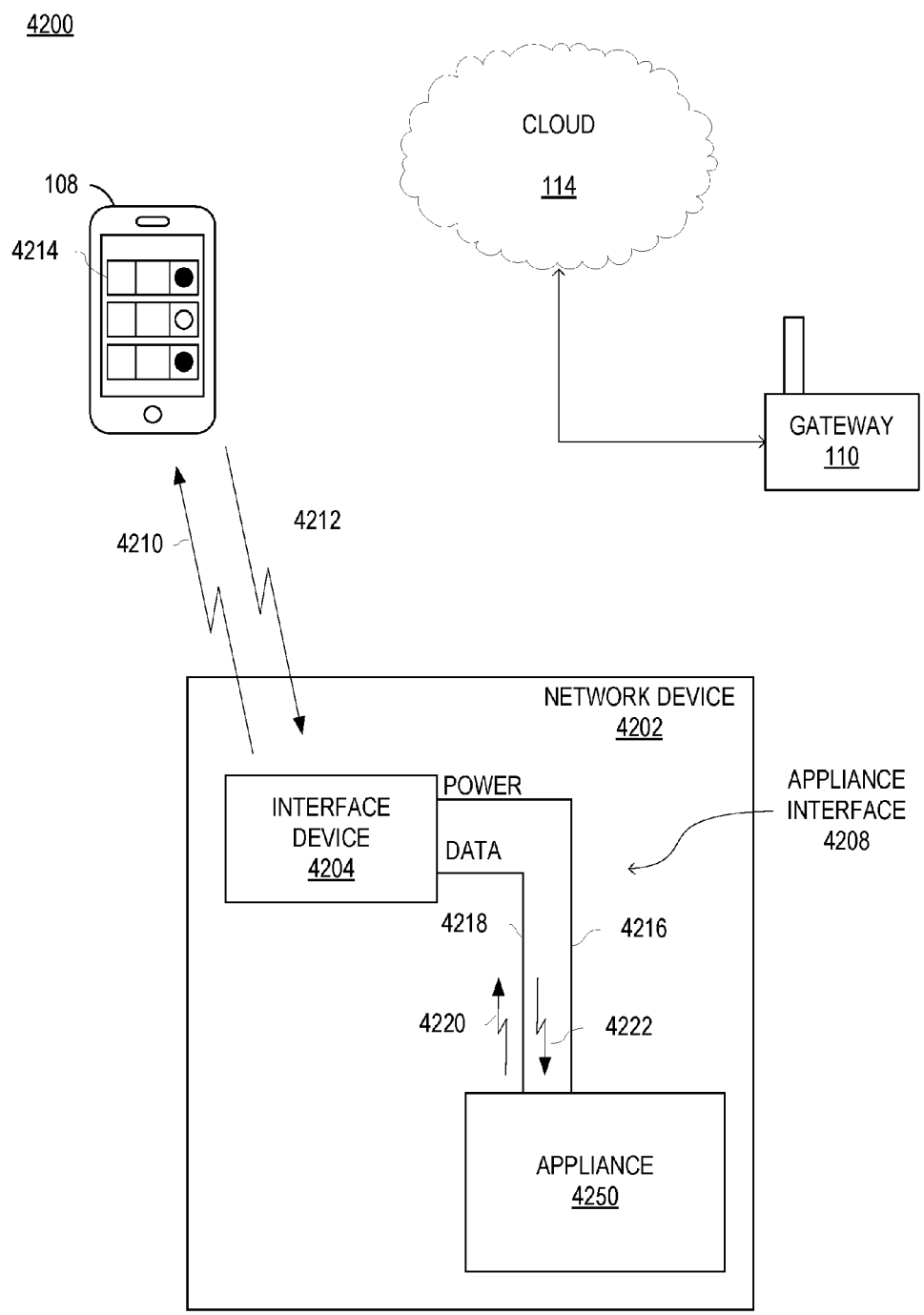
FIG. 42 is a schematic illustration of a local area network including a network device that includes an appliance, in accordance with some embodiments of the invention.

FIG. 42 is a schematic illustration of a local area network 4200 including a network device 4202 that includes an appliance 4250. The network device 4202 can comprise an interface device 4204 and the appliance 4250 connected by an appliance interface 4208. The appliance interface 4208 can include a data connection 4218 and a power connection 4216. The data connection 4218 can be a serial connection (e.g., RS-232, USB, or other), or any other suitable data connection. The interface device 4204 can be fully powered by the appliance 4202 through the power connection 4216, or can have a separate source of power.

The appliance 4250 can be any suitable electric device, such as a crock pot, space heater, an iron, a washing machine, a dishwasher, a lamp, a radio, a computer, an amplifier, or another electrical device. Additional examples of suitable electrical devices include electrical devices incorporated into or with non-electrical devices, such as an actuator system in an electrically-actuated deadbolt, a sensing system in a seat cushion, or other suitable electrical device incorporated into or with a non-electrical device. The appliance 4250 can be adapted to operate with the interface device 4204. The appliance 4250 can be any finite state machine. The appliance 4250 can be stateful or stateless.

The interface device 4204 can be positioned within the housing of the appliance 4250, or can be attached externally to the appliance 4250. The interface device 4204 can be removable from the appliance 4250, or can be permanently installed in or on the appliance 4250.

The interface device 4204 can be connected to the local area network 4200 through a network interface. The interface device 4204 can be connected by a wired or wireless connection (e.g., WiFi, Zigbee, or others described herein or well known). In some embodiments, the interface device 4204 can be connected directly to the cloud network 114 through a cellular internet connection (e.g., EDGE, LTE, or others).

The interface device 4204 can communicate with another network device, an access device 108, or another client device through the network interface 4206. The interface device 4204 can transmit a status information signal 4210 with status information to the access device 108, and the access device 108 can transmit a network device control signal 4212 to the interface device 4204. The status information signal 4210 and the network device control signal 4212 can be transmitted between the interface device 4204 and the access device 108 using a telecommunications network (e.g., a cellular network, or other suitable broadband network), using a local area network 4200 (e.g., through a gateway 110), or using the cloud network 114, although such a signal may pass through an intermediary device or network to do so.

The interface device 4204 can interpret the network device control signal 4212 and perform actions based on the contents of the network device control signal 4212. The network device control signal 4212 can include commands that can be performed by the interface device 4204 itself. The network device control signal 4212 can also include commands that are to be performed by the appliance 4250. Commands that are to be performed by the appliance 4250 can include commands like turn on or off, set a desired temperature (e.g., heat up or cool down to 215° F. or any other temperature), or other suitable commands depending on the particular appliance. The interface device 4204 can interpret the network device control signal 4212 and can send out a command 4222, through the data connection 4218 of the appliance interface 4208, based on the network device control signal 4212. The appliance 4250 can then perform the command indicated in the network device control signal 4212.

The interface device 4204 can also transmit commands to the appliance 4250 that are not based on a network device control signal received from the access device 108, but are rather based on programming in the interface device 4204. Examples of such commands can include commands to update a communication rate, commands to check a state of the appliance 4250, commands to set or get a clock time of the appliance 4250, or any other suitable commands.

The interface device 4204 can receive, through the data connection 4218 of the appliance interface 4208, a response (e.g., response 4220) to any command from the appliance 4250. In some examples, the response 4220 can include an indication that the command 4222 was received. In some examples, the response may include only an indication that a command is received (e.g., an ACK). In some examples, the response 4220 can include information for some value on the appliance 4250, such as an "on/off" state, a serial number, a product identification, a manufacturer identification, a temperature, a time since live, a setting, or any other value retrievable from the appliance 4250. The interface device 4204 can interpret the value and can send information about the value (e.g., the state of the appliance is "on," the temperature of the appliance, the time since the appliance first turned on, or other information) as status information (e.g. using status information signal 4210) to the access device 108. Additionally, the interface device 4204 can send status information about itself (e.g., time since live, supplied power, signal strength, and others) as status information (e.g. using status information signal 4210) to the access device 108.

The interface device 4204 can also use responses (e.g., response 4220) from the appliance 4250 to perform additional functions at the interface device 4204, such as error handling. In some cases, when performing the additional functions, the interface device 4204 does not transmit any status information 4210 to the access device 108 based on those particular responses.

The access device 108 can include one or more display tiles (e.g., display tile 4214) for displaying information and controls corresponding to the network device 102.

In some embodiments, the interface device 4204 can transmit a heartbeat command (e.g., command 4222) over the data connection 4218 to the appliance 4202 to determine whether the appliance 4250 is working properly and/or in a state of readiness. If the interface device 4204 determines that the appliance 4250 has had some sort of failure (e.g., the appliance 4250 sends a response 4220 indicating a failure or the interface device 4204 does not receive any response 4220), the interface device 4204 can take corrective action (e.g., restarting the appliance 4250 or an element of the appliance 4250), can log the event, or can alert the user).

Figure 43:
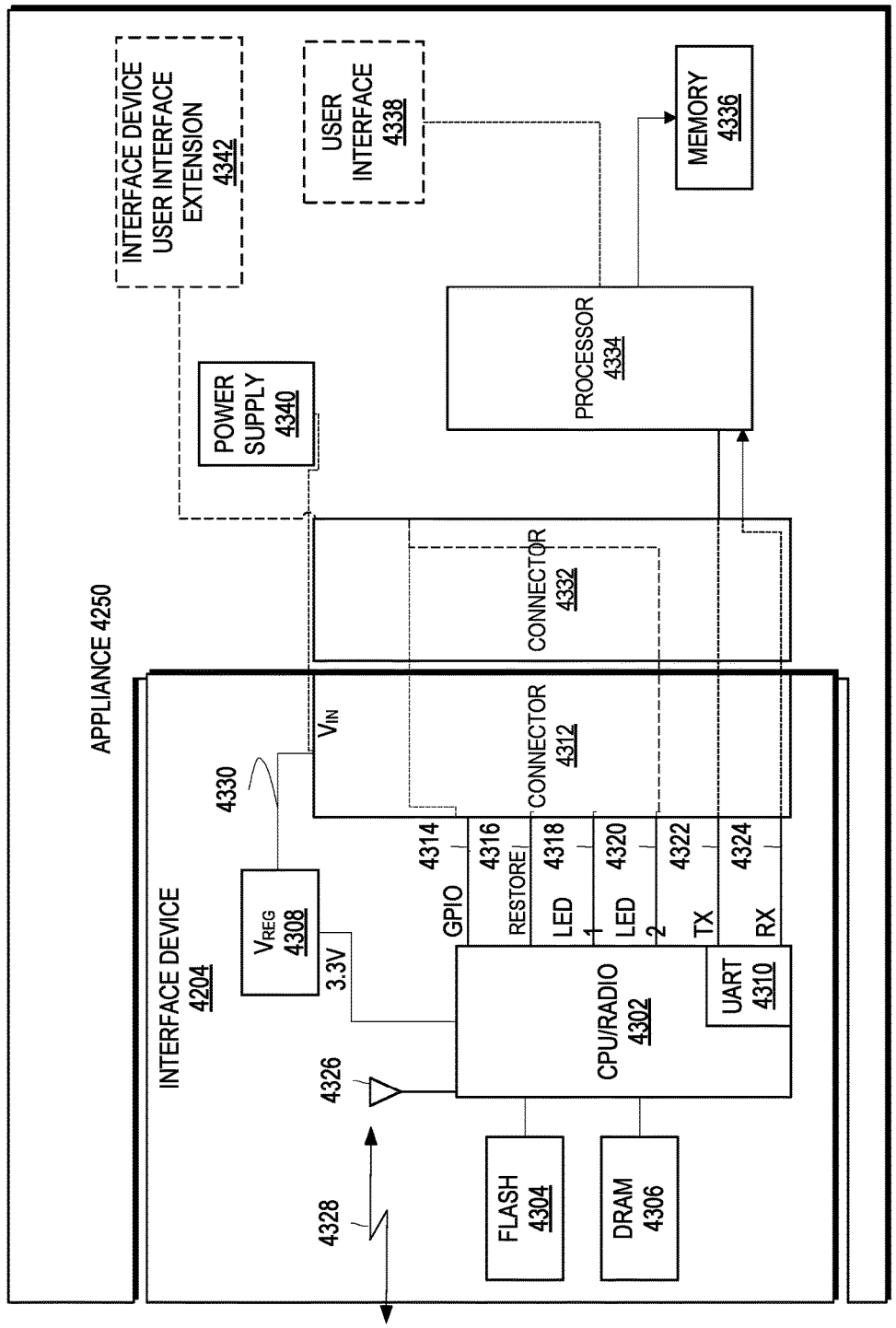
FIG. 43 is an example of a block diagram of a network device including an interface device attached to an appliance, in accordance with some embodiments of the invention.

FIG. 43 depicts a block diagram of a network device including an interface device 4204 attached to an appliance 4250 according to one embodiment. The interface device 4204 can include connector 4312 that interacts with connector 4332 of the appliance 4250. In one instance, interface device 4204 is connected (e.g., via a connector) with electrical wires, a light source and/or a light switch.

The interface device 4204 can include flash memory 4304 and dynamic random access memory (DRAM) 4306. The flash memory 4304 may be used to store instructions or code relating to an operating system, one or more applications, and any firmware. The flash memory 4304 can be used to store a cache. The flash memory 4304 may include non-volatile memory so that any firmware or other program can be can updated. In the event the interface device 4204 loses power, information stored in the flash memory 4304 may be retained. The DRAM 4306 may store various other types of information needed to run the interface device 4204, such as all runtime instructions or code. The flash memory 4304 or DRAM 4306 or a combination thereof may include all instructions necessary to communicate with an appliance 4250, including all instructions necessary to communicate using the appliance serial protocol disclosed herein.

The interface device 4204 further includes a CPU/Radio 4302. The CPU/Radio 4302 can control the operations of the interface device 4204. For example, the CPU/Radio 4302 may execute various applications or programs stored in the flash memory 4304 and/or the dynamic random access memory (DRAM) 4306. The CPU/Radio 4302 may also receive input from the appliance 4250, interpret the input, and perform one or more functions in response to the input. The CPU/Radio 4302 may further perform all communications functions in order to allow the interface device 4204 to communicate with other network devices, one or more gateways, a cloud network, and/or one or more access devices. The interface device 4204 may communicate with other devices and/or networks via antenna 4326. For example, antenna 4326 may include a 2.4 GHz antenna that can transmit and receive WiFi communications signals 4328. The antenna 4326 may include other types of antennas that can communicate Bluetooth® signals, Zigbee® signals, Ultra-Wideband (UWB) signals, and/or the like. In some embodiments, the interface device 4204 may include multiple antennas for communicating different types of communication signals.

The CPU/Radio 4302 can include at least one universal asynchronous receiver/transmitter (UART) 4310. The CPU/Radio 4203 can use the UART 4310 to send and receive serial communications. The CPU/Radio 4203 can send data through a transmit line 4322 and a receive data through a receive line 4324. The CPU/Radio 4203 can send and receive data through the transmit line 4322 and receive line 4324 using a serial protocol, such as RS232. The CPU/Radio 4302 can also include an input/output (GPIO) line 4314, a restore line 4316, an LED 1 line 4318, and an LED 2 line 4320. The CPU/Radio 4302 can have additional or fewer lines as necessary. The GPIO line 4314 can be used for any suitable function, such as powering an indicator light on an appliance 4250 or accepting an input from the appliance 4250. A signal sent on the restore line 4316 can be used to restore the CPU/Radio 4302 and/or the interface device 4204 to factory defaults. The LED 1 line 4318 and LED 2 line 4320 can be used to power first and second LEDs that can be used to indicate various statuses, such as whether the interface device has a network connection and whether the interface device is powered on.

The interface device 4204 further includes a voltage regulator 4308. The voltage regulator 4308 may be used to convert the voltage output from the appliance 4250 to a voltage usable by the CPU/Radio 4302. For example, the voltage regulator 4308 may regulate the DC voltage from 5V to 3.3V. The voltage regulator 4308 can be supplied with power from a power line 4330.

Each of the interface lines, including the GPIO line 4314, the restore line 4316, the LED 1 line 4318, the LED 2 line 4320, the transmit line 4322, the receive line 4324, the power line 4330, and any additional lines, can be routed through connector 4312. Connector 4312 can be a proprietary or universal connector. Any appliance 4250 to which the interface device 4204 is attached through the connector 4312 can have the necessary hardware to make use of the interface lines, such as to provide power to the power line 4330 and to provide the first and second LEDs that are driven by the LED 1 line 4318 and LED 2 line 4320.

In alternate embodiments, some interface lines are not routed through the connector 4312. For example, the power line 4330 can be routed to a power supply attached directly to the interface device 4204, and the LED 1 line 4318 and LED 2 line 4320 can be routed to first and second LEDs located within the interface device 4204.

In various embodiments, functions may be stored as one or more instructions or code in memory, such as the flash memory 4304 and/or the DRAM 4306. The interface device 4204 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed below may be implemented as code and/or instructions executable by a computer (and/or a processor within a computer); in an aspect, then, such code and/or instructions can be used to configure and/or adapt a device (e.g. a specialty computer) to perform one or more operations in accordance with the described methods. Such functions or code may include code to perform various steps described below. The memory, such as the flash memory 4304 and/or the DRAM 4306, may be a processor-readable memory and/or a computer-readable memory that stores software code (programming code, instructions, etc.) configured to cause a processor(s) within the CPU/Radio 4302 to perform the functions described. In other embodiments, one or more of the functions described may be performed in hardware.

A set of these instructions and/or code might be stored on a computer-readable storage medium, such as the flash memory 4304 and/or the DRAM 4306. In some cases, the storage medium might be incorporated within a computer system, such as the CPU/Radio 4302. In other embodiments, the storage medium might be separate from a computer system (e.g., a removable medium, such as a compact disc), and/or provided in an installation package, such that the storage medium can be used to program, configure and/or adapt a device (e.g. a computer) with the instructions/code stored thereon. These instructions might take the form of executable code, which is executable by the interface device 4204 and/or might take the form of source and/or installable code, which, upon compilation and/or installation on the interface device 4204 (e.g., using any of a variety of compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

The interface device 4204 may have other components than those depicted in FIG. 43. Further, the embodiment shown in the figures are only one example of an interface device that may incorporate an embodiment of the invention. In some other embodiments, interface device 4204 may have more or fewer components than shown in the figure, may combine two or more components, or may have a different configuration or arrangement of components.

The appliance 4250 can have a processor 4334. The processor 4334 can be a microcontroller, such as a Peripheral Interface Controller (PIC). The appliance 4250 can include a memory 4336 (e.g., a flash memory or other) that is readable by the processor 4334. The memory 4336 can include instructions enabling the innate functionality of the appliance 4250, such as heating and timing for a crock pot.

The appliance 4250 can include a user interface 4338. The user interface 4338 can provide buttons, displays, LEDs, knobs, and other input and output elements necessary for a user to interact with the appliance 4250. For example, a user interface 4338 for a slow cooker can include a display, a power button, a temperature adjustment button, and a start button. The user interface 4338 can be driven and/or monitored by the processor 4334. In some embodiments, the appliance 4250 is "headless" or has no user interface 4338.

The appliance 4250 can include a power supply 4340 that can provide power to the voltage regulator 4338 of the interface device 4204 through connector 4332, connector 4312, and power line 4330.

The appliance 4250 can include an interface device user interface extension 4342. The interface device user interface extension 4342 can include various input and output elements that are passed directly to the interface device 4204 without being processed by the processor 4334. Examples of input and output elements of the interface device user interface extension 4342 include LEDs associated with the LED 1 line 4318 and LED 2 line 4320, a hardware restore button associated with the restore line 4316, or any other suitable input/output element.

In some embodiments, a computer-implemented method is provided. It is determined that a component of a secondary light switch detected a stimulus that includes an input or motion. A master light switch that corresponds to the stimulus detected at the secondary light switch is identified. The master light switch is electrically connected to a light source via wiring. The secondary light switch is, in some instances, not electrically connected to the light source via wiring. A communication is wirelessly transmitted directly to the master light switch. The communication causes the master light switch to change an output of the light source, and wherein the direct transmission avoids use of any cloud server.

In some instances, the stimulus can include a push of a mechanical button on the secondary light switch or a toggle of a switch on the secondary light switch. In some instances, the stimulus can include an input of a first type, and the method can include determining that the component of the secondary light switch detected another input of a second type; identifying another master light switch that corresponds to the other input; and wirelessly transmitting another communication to the other master light switch. The other master light switch can be electrically connected to another light source via other wiring. The secondary light switch is, in some instances, not electrically connected to the other light source via wiring. The other communication can cause the other master light switch to change an output of the other light source. The method can include identifying the stimulus as being of a particular type from amongst a set of types. The master light switch can be identified based on the identification of the particular type. The method can include identifying a group of master light switches and transmitting a communication to each master light switch in the group. The group can correspond to the stimulus detected at the secondary light switch. The group of master light switches can include the master light switch. Each master light switch in the group can be electrically connected to a corresponding light source via corresponding wiring. Each of at least two of the communications can cause the master light switch receiving the communication to change an output of the corresponding light source. The method can be performed by the secondary light switch. Determining that a component of the secondary light switch detected the stimulus can include detecting the stimulus. The secondary light switch, in some instances, is not electrically connected to any remote light source via wiring. The secondary light switch need not include an electronic display.

In some embodiments, a system is provided that includes one or more data processors; and a non-transitory computer readable storage medium containing instructions which when executed on the one or more data processors, cause the one or more data processors to perform various actions. The actions include determining that a component of a secondary light switch detected a stimulus that includes an input or motion. The actions include identifying a master light switch that corresponds to the stimulus detected at the secondary light switch. The master light switch is electrically connected to a light source via wiring. The secondary light switch is, in some instances, not electrically connected to the light source via wiring. The actions include wirelessly transmitting a communication directly to the master light switch. The communication causes the master light switch to change an output of the light source.

In some instances, the stimulus can include a push of a mechanical button on the secondary light switch or a toggle of a switch on the secondary light switch. The stimulus can include an input of a first type. The actions can include determining that the component of a secondary light switch detected another input of a second type; and identifying another master light switch that corresponds to the other input. The other master light switch can be electrically connected to another light source via other wiring. The secondary light switch need not be electrically connected to the other light source via wiring. The actions can also include wirelessly transmitting another communication to the other master light switch. The other communication can cause the other master light switch to change an output of the other light source.

The actions can include identifying the stimulus as being of a particular type from amongst a set of types. The master light switch can be identified based on the identification of the particular type. The actions can include identifying a group of master light switches. The group corresponds to the stimulus detected at the secondary light switch. The group of master light switches can include the master light switch. Each master light switch in the group can be electrically connected to a corresponding light source via corresponding wiring. The actions can include transmitting a communication to each master light switch in the group. Each of at least two of the communications can cause the master light switch receiving the communication to change an output of the corresponding light source. The secondary light switch can include the one or more data processors and the computer readable storage medium. Determining that a component of the secondary light switch detected the stimulus can include detecting the stimulus. The secondary light switch need not electrically connected to any remote light source via wiring. The secondary light switch need not include an electronic display.

In some embodiments, a computer-program product tangibly embodied in a non-transitory machine-readable storage medium is provided that includes, including instructions configured to cause one or more data processors to perform one or more actions described herein.

In some embodiments, a light switch is provided. The light switch includes a receiver configured to receive a status-updating communication. The status-updating communication identifies a status of a master device. The light switch includes a status updator that updates a local data store to reflect the status of the master device and a stimulus detector configured to detect a stimulus. The stimulus includes an input or motion stimulus. The light switch also includes a rules engine configured to: determine that a control communication is to be transmitted to the master device in response to detection of the stimulus and generate the control communication. The determination is based on the status of the master device, the detection of the stimulus and a rule. Receipt of the control communication at the master device causes the master device to change its state. The light switch further includes a wireless transmitter configured to transmit the control communication. The transmission of the control communication is configured to be received at the master device.

The determination that a control communication is to be transmitted to the master device can include identifying a target state for the master device using the rule; and determining that a current state for the master device differs from the target state. The status of the master device can include the current state. The determination that a control communication is to be transmitted to the master device can include determining that a network connection criterion is satisfied using a network connection variable of the master device. The status of the master device can include the network connection variable. The stimulus detector can be further configured to detect a second stimulus. The stimulus can be of a first type and the second stimulus is of a second type. The rules engine can be further configured to: identify the master device as corresponding to the stimulus and a second master device as corresponding to the second stimulus; determine that a second control communication is to be transmitted to the second master device in response to detection of the second stimulus; and generate the second control communication. Receipt of the second control communication at the second master device can cause the second master device to change its state. The wireless transmitter can be further configured to transmit the second control communication to the second master device. The light switch can further include a battery. The light switch is, in some instances, not electrically connected to any remote light source. The status-updating communication can be received from the master device. The control communication can be transmitted to the master device via an intermediate device. The master device can be a light switch that can be electrically connected to a light source. Receipt of the control communication at the master device can cause the master device to change whether the light source is on or off. The rule can be a dynamic rule and can be at least partly defined by input and identifies that the master device is to be associated with at least some stimuli detected at the light switch. A maximum depth of the light switch can be less than 1 cm. In some instances, the light switch does not include an electronic display. The light switch can be configured to be attached to a wall.

In some embodiments, a computer-implemented method is provided. The method includes receiving, at a light switch, a status-updating communication. The status-updating communication identifies a status of a master device. The method includes updating a data store at the light switch to reflect the status of the master device; detecting a stimulus (that includes an input or motion stimulus) at the light switch; and determining that a control communication is to be transmitted to the master device in response to detection of the stimulus. The determination is based on the status of the master device, the detection of the stimulus and a rule. The method includes generating the control communication. Receipt of the control communication at the master device causes the master device to change its state. includes wirelessly transmitting the control communication from the light switch. The transmission of the control communication is configured to be received at the master device.

In some instances, the determination that a control communication is to be transmitted to the master device includes: identifying a target state for the master device using the rule; and determining that a current state for the master device differs from the target state. The status of the master device can include the current state. The determination that a control communication is to be transmitted to the master device can include determining that a network connection criterion is satisfied using a network connection variable of the master device. The status of the master device can include the network connection variable. The method can also include detecting a second stimulus at the light switch (the stimulus can be of a first type and the second stimulus can be of a second type); identifying a second master device as corresponding to the second stimulus; determining that a second control communication can be to be transmitted in response to detection of the second stimulus; generating the second control communication; and wirelessly transmitting the second control communication to the second master device. Receipt of the second control communication thereof at the second master device can cause the second master device to change its state. The light switch is, in some instances, not electrically connected to any remote light source. The master device can be a light switch that can be electrically connected to a light source, and receipt of the control communication at the master device can cause the master device to change whether the light source is on or off. The rule can be a dynamic rule and at least partly defined by input and identifies that the master device can be to be associated with at least some stimuli detected at the light switch.

In some embodiments, a light switch is provided. The light switch includes one or more stimulus detectors configured to: detect a first stimulus of a first type and detect a second stimulus of a second type. The first stimulus includes an input or motion stimulus, and the second stimulus includes an input or motion stimulus. The light switch also includes a light controller configured to, in response to detecting the first stimulus, cause an output of a first light source to change. The first light source is electrically connected to the light controller. The light switch also includes a wireless transmitter configured to, in response to detecting the second stimulus, wirelessly transmit a communication indicative of the detection of the second stimulus. The transmission of the communication facilitates a change to an output of a second light source electrically connected to the master light switch.

The light switch can include a battery. The first stimulus can be an input stimulus of a first type, and the second stimulus can be an input stimulus of a second type. The light switch can further include an input component that can include a mechanical button or a switch. At least one of the first stimulus and the second stimulus can include a push of the mechanical button or a toggle of the switch. The light switch can include an input component that can include a mechanical button, each of the first stimulus and the second stimulus can include one or more presses of the button. The first stimulus can differ from the second stimulus with regard to a quantity, a temporal pattern or duration of the one or more presses. The stimulus detector can be further configured to detect a third stimulus of a third type. The wireless transmitter can be further configured to, in response to detecting the third stimulus, wirelessly transmit a second communication indicative of the detection of the third stimulus. The transmission of the second communication can facilitate a change to an output of a third light source electrically connected to the second master light switch. The light switch is, in some instances, not electrically connected to the third light source.

The communication can be transmitted directly to the master light switch. The communication can be transmitted to a remote gateway or cloud server in wireless communication with the light switch and with the master light switch. A maximum depth of the light switch can be less than 1 cm. The light switch can include an aperture to receive a switch or button connected to another light source via another circuit. The light switch, in some instances, does not include an electronic display. The light switch can include an electronic display configured present an identification of each of a set of selectable lighting options. Each lighting option can correspond to one or more light sources. Detection of the first stimulus or detection of the second stimulus for can include detecting a selection of a lighting option. The selected lighting option can correspond to the first light source or the second light source. The light switch can be configured to be attached to a wall. The light switch can be configured to be attached to a wall via an adhesive or suction connection. The change to the output of the first or second light source can include turning the first or second light source on or off. The transmission of the communication can cause the master light switch to change the output of the second light source when a present output of the second light source does not match an output corresponding to the stimulus.

In some embodiments, a computer-implemented method is provided. The method includes detecting, at a light switch, a first stimulus of a first type and detecting, at the light switch, a second stimulus of a second type. The first stimulus includes an input or motion stimulus, and the second stimulus includes an input or motion stimulus. The method includes, in response to detecting the first stimulus, causing an output of a first light source to change. The first light source is electrically connected to the light switch. The method includes, in response to detecting the second stimulus, wirelessly transmitting a communication indicative of the detection of the second stimulus. The transmission of the communication facilitates a change to an output of a second light source electrically connected to the master light switch. The light switch can include a mechanical button or a switch, and wherein detecting the first stimulus or detecting the second stimulus can include detecting a push of a mechanical button or a toggle of the switch. The method can include using a rule at least partly defined based on user input to determine that stimuli of the second type are to trigger wireless transmission of a communication to the other device. The other device can be the master light switch.

In some embodiments, a computer-implemented method us provided. The method includes identifying a condition for controlling operation of a group of network devices and retrieving attribute information corresponding to the condition for controlling operation of the group. Attribute information includes an attribute for each network device in the group of network devices. An attribute of a network device is related to operation of the network device. At least two network devices in the group of network devices have different attributes. The method includes determining whether the condition is satisfied; and transmitting data when the condition is satisfied. Network devices in the group of network devices are adjusted using the transmitted data.

The group of network devices can include at least two different types of network devices. The condition for controlling operation of the group of network devices can correspond to a mode or state for controlling operation of the group of network devices, and the group of network devices can be adjusted according to the mode. The transmitted data can indicate the mode. The condition can include a time period for operating the group of network devices according to the mode. Modes can include home modes, away modes, or sleep modes. The mode for controlling operation of the group of network devices can correspond to a state of operation of each network device of the group of network devices. The condition for controlling operation of the group of network devices can correspond to a scene for controlling operation of the group of network devices, and the group of network devices can be adjusted according to the scene. The transmitted data can indicate the scene. The condition for controlling operation of a group of network devices can be based on a time period, and the condition can be satisfied when the time period occurs. The condition for controlling operation of a group of network devices can be based on an event related to operation of a network device connected to the network, and the condition can be satisfied when the event occurs. The condition can correspond to a rule for operation of the group of network devices, and the condition can be satisfied based on satisfaction of the rule. The transmitted data can indicate an adjustment to an attribute related to operation of a network device in the group of network devices, and operation of the network device can be controlled based on the adjustment to the attribute indicated by the transmitted data. The transmitted data can indicate an adjustment to control operation of two different types of network devices in the group of network devices. The method can include generating a graphical interface, displaying the graphical interface; and receiving input corresponding to an interaction with the interactive area included in the graphical interface. The input can indicate the condition for controlling operation of a group of network devices and the input can indicate the attribute related to operation of each network device in the group of network devices. The method can include generating a graphical interface, displaying the graphical interface; and receiving input corresponding to an interaction with the interactive area included in the graphical interface. The input can correspond to an interaction with an interactive area, wherein the condition is satisfied based on the interaction.

In some embodiments, a system can be provided that includes one or more data processors; and a non-transitory computer-readable storage medium containing instructions, which when executed on the one or more data processors, cause the one or more processors to perform some or all actions of one or more methods disclosed herein.

In some embodiments, techniques and systems for wirelessly switching electrical power on or off are provided. Some disclosed system embodiments include in-wall network devices which incorporate a wireless antenna positioned outside of the wall to minimize or reduce interference with wireless transmissions due to supporting and structural components located in the wall. A configuration of the wireless antenna is selected to provide greater wireless coverage or longer wireless transmission range, thereby extending the utility of the disclosed systems for integration into a wireless network, such as a home wireless local area network.

For example, a position of a wireless antenna of an in-wall network device is selected to achieve optimal or desirable wireless propagation characteristics. In another example, an antenna design (e.g., shape, gain, type, etc.) and output power of an in-wall network device is selected to achieve optimal or desirable wireless propagation characteristics. These wireless antenna configurations optionally enable in-wall network devices to use minimal transmission output powers or minimal antenna gain to meet or exceed a desired or required wireless propagation distance. Alternatively, the wireless antenna configurations optionally allow in-wall systems to achieve longer wireless propagation distances without reducing output power or use of smaller antenna gain.

In various embodiments, the network device is configured to perform steps of a method. For example, in one embodiment, the network device is configured to open or close the relay to change a power state of the electrical device. In another embodiment, the network device is configured to receive an instruction to open or close the relay to change a power state of the electrical device and open or close the relay in response to the instruction, in order to change the power state of the electrical device. Optionally, the network device is configured to send a signal to a remote system indicating the power state of the electrical device. Optionally, the network device is configured to send a signal to a remote system indicating a position of the relay. Optionally, the network device is configured to send a signal to a remote system indicating a status of the network device.

In another aspect, methods are provided for wirelessly changing a power state of an electrical device. The disclosed methods optionally include use of the network devices described herein, such as those network device incorporating a wireless antenna. A specific method embodiment of this aspect comprises: providing a network device, such as a network device described herein, receiving an instruction to open or close a relay of the network device to change a power state of an electrical device; and opening or closing the relay in response to the instruction. Optionally, methods of this aspect further comprise sending a signal to a remote system indicating the power state of the electrical device. Optionally, methods of this aspect further comprise sending a signal to a remote system indicating the power state of the electrical device. Optionally, methods of this aspect further comprise sending a signal to a remote system indicating a position of the relay of the network device.

In one embodiment, for example, a network device comprises: a housing configured for mounting inside of an electrical box, wherein the housing includes a room-facing wall and an electrical box-facing wall; a circuit board having a data processor and a wireless transceiver, wherein the circuit board is positioned within the housing; a relay configured to control a power state of an electrical device, wherein the data processor is configured to open or close the relay; electrical terminals configured to connect to line power, such as a building electrical supply, to provide power to the circuit board and to provide switchable power to the electrical device through the relay, wherein the electrical terminals are coupled to the electrical box-facing wall of the housing; and a wireless antenna connected to the wireless transceiver by a transmission line. In a first exemplary embodiment, the wireless antenna is mounted on the room-facing wall of the housing. In a second exemplary embodiment, the wireless antenna is positioned outside the electrical box when the housing is mounted inside the electrical box. In a third exemplary embodiment, the wireless antenna is positioned to reduce or minimize interference with a wireless or radio frequency transmission between the wireless antenna and a remote wireless device due to the electrical box and due to wall and building materials proximate to the electrical box. These exemplary configurations may optionally be combined with one another and any of the other network device configurations disclosed herein. These configurations generally provide the ability for wireless signals transmitted by the network device to be received at distances further than if the antenna were positioned within the electrical box or behind or adjacent to a variety of wall components (e.g., sheet rock, plaster, studs, electrical wiring, conduit, etc.).

In some embodiments, "a housing configured for mounting inside of an electrical box" refers to a structure having a size and shape which can be inserted into an electrical box, also commonly referred to as a switch box, device box, wall box or pattress box and which optionally includes holes for inserting screws through to attach the housing to the electrical box.

In some embodiments, multiple wireless antennas are provided. Use of multiple antennas are useful, for example, for wireless configurations where multiple frequencies are used (e.g., 2.4 GHz and 5 GHz) or for MIMO configurations.

For example, in one embodiment, the wireless antenna comprises a first wireless antenna mounted to transmit with a first polarity and a second wireless antenna mounted to transmit with a second polarity. Optionally, the first polarity and the second polarity are different. For example, in one embodiment, the first polarity is vertical and the second polarity is horizontal.

Useful wireless antenna types include, but are not limited to, inverted F antennas, microstrip patch antennas, directional antennas, arrays thereof and combinations thereof. In an exemplary embodiment, the wireless antenna exhibits a gain of less than 8 dBi. Useful antenna gains include those in excess of 5 dBi and those in the range of 3 dBi to 15 dBi. In an exemplary embodiment, the wireless transceiver exhibits a maximum output power of 0.5 W. For some embodiments, the wireless transceiver exhibits a maximum output power of 0.05 W. Useful transceiver maximum output power includes those in the range of 0.1 W to 1.0 W. In general, the maximum output power that the wireless transceiver can transmit is limited by local regulations, such as FCC Part 15 in the U.S.

Optionally, the room-facing wall of the housing includes a switch, such as a switch configured to provide an instruction to the data processor to open or close the relay to change the power state of the electrical device. Useful switches include, but are not limited to, rocker switches, push-button switches, touch sensitive switches, touchscreens and the like. In some embodiments, the electrical device is a remotely located device, such as an electrical outlet, an electrical socket or a light fixture. In one embodiment, the electrical device is an electrical outlet located in the room-facing wall of the network device. In some embodiments, the wireless antenna is mounted on the switch, such as on an electrical box-facing surface of the switch. As used herein, the term "room-facing wall" refers to an outer portion of a device component or device housing that is configured to be user-facing or face out from the wall of a building or structure when mounted in an in-wall electrical box. Conversely, the term "electrical box-facing wall" refers to an outer portion of a device component or device housing that is configured to face the interior of a wall of a building or structure when the device is mounted in an in-wall electrical box. In some embodiments, an electrical box-facing wall of a device is physically surrounded by an electrical box when mounted in the electrical box, such as an electrical box as commonly used in modern construction for mounting and supporting a light switch or electrical outlet, such as a NEMA AC power receptacle.

In some embodiments, the network device further comprises or is covered by a cover plate, such as a cover plate configured to cover at least a portion of the room-facing wall of the housing. For example, a useful cover plate optionally comprises a conventional cover plate, wall plate or switch plate used for concealing the in-wall electrical box and electrical wiring associated with a light switch or an electrical outlet. Optionally, the cover plate comprises a portion of the housing of the network device. In some embodiments, the cover plate is a separate component, attachable to the housing of the network device. Optionally, the wireless antenna is positioned on a room-facing surface of the housing and is covered or configured to be covered by a cover plate. In various embodiments, a non-metallic or non-conducting cover plate is preferred, as metallic and conducting cover plates can potentially interfere with wireless transmissions to and from the wireless antenna. For example, In some embodiments, the cover plate comprises plastic.

For various embodiments, a cover plate useful with the network devices disclosed herein includes a cover plate comprising an external wireless antenna. For example, in one embodiment, the wireless antenna of the network device is mounted on an electrical box-facing or wall-facing surface of the cover plate. For example, in an exemplary embodiment, the cover plate is configured to attach to the housing and to connect the wireless antenna to the wireless transceiver through the housing. A variety of techniques are useful for connecting the wireless antenna to the wireless transceiver through the housing. For example, in one embodiment, the transmission line comprises a shielded cable that passes through the housing. In another embodiment, a connector is mounted on a wall of the housing, such as a coaxial connector. Such configurations advantageously provide for the ability to maintain a shielded transmission line between the wireless antenna and the wireless transceiver. In some embodiments, however, a twisted pair transmission line, one or more electrical contacts and/or one or more pin/socket pairs are used to pass the transmission line through the housing.

Another method embodiment comprises providing a network device, such as a network device described herein comprising a wireless antenna; and sending a signal to a remote system. An exemplary method embodiment of this aspect further comprises a step of increasing an output transmission power based on a lack of confirmation of receipt of the signal from the remote system and resending the signal to the remote system. In another embodiment, the network device comprises multiple wireless antennas and the method comprises sending a first signal to a remote system using a first wireless antenna, and sending a second signal to the remote system using the second wireless antenna based on a lack of confirmation of receipt of the first signal from the remote system. Using these methods, wireless network devices can attempt to resend signals to a remote system using different wireless antennas or different output power settings if a signal is not confirmed as received by the remote system. Such a configuration is useful, for example, if the network device includes an internal wireless antenna, such as a wireless antenna located on a circuit board within a housing of the network device, and an external wireless antenna, such as a wireless located on a room-facing wall of the housing of the network device or on a cover plate attached to the network device. Thus, the networks device can switch to a backup antenna or antenna providing better propagation characteristics in case of failure of transmission from the primary or internal antenna.

In some embodiments, a network device is provided that includes a user-facing restore button and a user-facing restart button. The restore and restart buttons can be accessible when a cover plate is installed, or can be covered by a cover plate. The restore and restart buttons can be located on a bezel surrounding a main switching element.

In some embodiments, one or more light sources are located within the network device that provide displays located on a user-facing surface of the network device, such as on the main switching element. The displays can provide a user with information about the power state, network connectivity status, and physical location (e.g., a light indicating presence of the network device in a darkened room) of the network device.

In some embodiments, a set of bridge rectifiers are coupled between a power supply of the network device and the line connection and load connection of the network device. The dual bridge rectifiers can allow the network device to receive power and operate despite being installed incorrectly with the line and load connections reversed.

In some instances, a network power button having a user-facing restore button is provided for restoring settings on the network power switch. The restore button can remove any customizable settings, such as wireless access settings (e.g., SSID, password, and others), network IDs, security keys, built-in rules, stored names and/or images, user settings, and other information. Customizable settings can be stored in any memory of the network device, as described below. The restore button can be used to remove any information necessary for the network power button to connect and/or function on the wireless network to which it was previously connected. The restore button can be used to restore the network power button to its factory default settings. The restore button can respond to various patterns of being pressed, such as press-and-hold, multiple-press, multiple-press-then-hold, or any other suitable pattern of being pressed. In some embodiments, different patterns of being pressed will result in the erasure of different information. As used herein, the term "erase" can include removing customized settings and restoring a device to its factory default settings. In some embodiments, the restore button can be located behind a cover plate. In some embodiments, the restore button can be located along a frame of one or more main switching elements (e.g., a toggle switch or a momentary switch).

In some embodiments, depressing the restore button for a predetermined length of time (e.g., five seconds) will erase the provisioning information on the network power button and revert the network power button to default factory settings wherein the network power button establishes itself as a WiFi hotspot to which other network devices may connect in order to program and/or use the network power switch.

In some embodiments, the network power button further includes a user-facing restart button for restarting any processing elements within the network power switch. When pressed, the restart button can temporarily remove power to one or more processing elements of the network power button and/or to the entire network power switch. The restart button can additionally provide a signal to a processing element to restart without cutting power to the processing element (e.g., a logic restart). In some embodiments, the restart button removes power and/or holds a processor in restart for the duration of the button being pressed. In other embodiments, the restart button can respond to various patterns of being pressed, such as press-and-hold, multiple-press, multiple-press-then-hold, or any other suitable pattern of being pressed. In some embodiments, the restart button can be located behind a cover plate. In some embodiments, the restart button can be located along a frame of one or more main switching elements (e.g., a toggle switch or a momentary switch).

In some embodiments, the functionalities of the restart button and the restore button can be collocated on a single button responsive to different patterns of button presses.

Restart and restore buttons can include a pressure-sensitive button, a capacitive-sensitive button, a "soft" button on a touchscreen, or any other suitable user-actuatable element.

In some embodiments, the network power button includes one or more display elements located underneath the main switching element. The one or more display elements can include a power light indicative of the state (e.g., open or closed) of the network power switch. The one or more display elements can include a wireless connectivity light indicative of the connection status and/or signal of the wireless network connection. The one or more display elements can further include a night light that glows to indicate the presence of the network power button in dark ambient conditions. Other information can be displayed to a user through the one or more display elements.

The one or more display elements can be located behind the cover or optionally located behind the main switching element. In some embodiments, a transparent lens can be placed in the cover or main switching element to allow light to pass from a display element to the user. In some embodiments, the cover or main switching element includes or is made entirely from a translucent material through which light from the display element can pass. In some embodiments, masks can be used to block light and provide a desired shape (e.g., icon) to the light presented to the user. In some embodiments, light tunnels can be used to focus light from the display element (e.g., an LED light) to the desired location on the cover and/or main switching element. In some embodiments, the display elements can be multicolor in order to display different colors to a user based on user-customization and/or based on particular information desired to be imparted on the user (e.g., a red color may be indicative of no connection and a yellow color may be indicative of a weak connection).

The network power button can accept a neutral input, a line input, and a load input. In some embodiments, the network power button includes a bridge rectifier circuit positioned on each of the load input and the line input. Power can thus be supplied to the network power button (e.g., to power its internal processor) regardless as to whether the line and load are miswired. For example, when the network power button is properly installed, the network power switch's internal processor may be powered from current supplied across the line and neutral inputs. In other examples, when the network power button is improperly installed such that the actual load (e.g., a lamp) is wired to the line input and the building's line is wired to the load input, the bridge rectifiers allow the network power switch's internal processor to be powered form current supplied across the load and neutral inputs.

In some embodiments, a network device includes a housing mountable in a structure. The housing has a user-facing surface. The network device further includes a circuit board having a data processor, a wireless transceiver, and a memory for storing a customizable setting, wherein the circuit board is positioned within the housing. The network device also includes a restore button located on the user-facing surface of the housing and connected to the data processor for erasing the customizable setting of the network device.

In some instances, the housing further includes a bezel surrounding a main switching element, and wherein the restore button is located inline with the bezel. The restore button can have a button contour that follows a bezel contour of the bezel. The main switching element can extend away from the structure further than the bezel. The network device may include a cover plate for covering a portion of the user-facing surface. In some instances, the restore button is not covered by the cover plate.

The network device may also include a relay configured to control a power state of an electrical device. The data processor may be configured to open or close the relay. The network device may also include electrical terminals configured to connect to an electrical supply, to provide power to the circuit board and to provide switchable power to the electrical device through the relay. The electrical terminals may be coupled to an electrical box-facing wall of the housing. The network device may also include a main switching element connected to the data processor for controlling the relay. The network device may include a restart button for restarting the data processor. The housing may further include a bezel surrounding the main switching element. The restore button and the restart button may both located inline with the bezel. The restore button and the restart button may each have button contours that follows a bezel contour of the bezel.

In some embodiments, a network device includes a housing mountable inside an electrical box and including a room-facing wall and an electrical box-facing wall and a data processor within the housing connected to a wireless transceiver and a memory for storing a customizable setting. The network device further includes a relay configured to control a power state of an electrical device. The data processor is operable to open or close the relay. The network device also includes electrical terminals connectable to an electrical supply for providing power to the data processor and for providing switchable power to the electrical device through the relay. The electrical terminals are coupled to the electrical box-facing wall of the housing. The network device further yet includes a restore button located on the room-facing wall and connected to the data processor for erasing the customizable setting of the network device.

The housing further may also include a bezel surrounding a main switching element, and wherein the restore button is located inline with the bezel. The restore button may have a button contour that follows a bezel contour of the bezel. The main switching element may extend away from the electrical box further than the bezel. The network device may also include a cover plate for covering a portion of the room-facing wall, wherein the restore button is not covered by the cover plate. The network device may also include a main switching element connected to the data processor for controlling the relay. The network device may also include a restart button for restarting the data processor. The housing may further include a bezel surrounding the main switching element, and the restore button and the restart button may both located inline with the bezel. The restore button and the restart button may each have button contours that follows a bezel contour of the bezel.

In some embodiments, a network device includes a housing mountable inside an electrical box and including a room-facing wall and an electrical box-facing wall and a data processor within the housing connected to a wireless transceiver and a memory for storing a customizable setting. The network device also includes a relay configured to control a power state of an electrical device, wherein the data processor is operable to open or close the relay and electrical terminals connectable to an electrical supply for providing power to the data processor and for providing switchable power to the electrical device through the relay. The electrical terminals are coupled to the electrical box-facing wall of the housing. The network device further includes a main switching element connected to the data processor for opening and closing the relay; a bezel positioned about the main switching element; and a restore button located on the room-facing wall and inline with the bezel. The restore button is connected to the data processor for erasing the customizable setting of the network device. The network device further yet includes a restart button located on the room-facing wall and inline with the bezel, the restart button operable restart the data processor; and a cover plate operable to cover a portion of the room-facing wall. In some instances, the bezel, the restore button, and the restart button are not covered by the cover plate.

According to some embodiments, a network device may detect an abnormal current draw of an electrical device. The network device may include an input power interface, an output power interface, a relay coupled between the input power interface and the output power interface for controlling a power path between the input power interface and the output power interface, and a current sensing circuit for sensing an electrical current draw of an electrical device coupled to the output power interface. The network device may also include a data processor coupled to the current sensing circuit, where the data processor is configured to monitor the electrical current draw of the electrical device when the power path is in an enabled state, determine a steady state current amount of the electrical device by monitoring the electrical current draw of the electrical device over a steady state determination time period, and detect an abnormal current draw state of the electrical device when the electrical current draw of the electrical device deviates from the steady state current amount by a threshold amount. When the abnormal current draw state is detected, an abnormal current draw notification can be transmitted to an access device communicatively coupled to the network device.

The steady state current amount may be updated continuously when the power path is in an enabled state or at a periodic interval. The steady state current amount may be reset when the electrical device is disconnected from the output power interface. The threshold amount may be set based on a percentage of the steady state current amount. The abnormal current draw notification may indicate an excessive current condition when the electrical current draw of the electrical device exceeds the steady state current amount by an overcurrent threshold amount. The abnormal current draw notification indicates a burnt out condition when the electrical current draw of the electrical device is below the steady state current amount by an undercurrent threshold amount. The abnormal current draw notification indicates a burnt out condition when the electrical current draw of the electrical device is above a nominal threshold current amount; and below the steady state current amount by an undercurrent threshold amount. The abnormal current draw state of the electrical device is detected when the electrical current draw of the electrical device deviates from the steady state current amount by the threshold amount for a predetermined duration. The network device may further include a power status indicator on a housing of the network device. The power status indicator of the network device may indicate the abnormal current draw state when the abnormal current draw state is detected. The network device may be a light switch, and the electrical device may be a lighting device.

According to some embodiments, a process that can detect an abnormal current draw of an electrical device may include sensing, by a current sensing circuit of a network device, an electrical current draw of an electrical device coupled to an output power interface of the network device, where power is supplied to the electrical device via a power path in the network device. The process may also include monitoring the electrical current draw of the electrical device, determining a steady state current amount of the electrical device by monitoring the electrical current draw of the electrical device over a steady state determination time period; and detecting an abnormal current draw state of the electrical device when the electrical current draw of the electrical device deviates from the steady state current amount by a threshold amount. An abnormal current draw notification can be transmitted to an access device communicatively coupled to the network device when the abnormal current draw state is detected.

The method may further include updating the steady state current amount continuously when the power path is in an enabled state or updating the steady state current amount at a periodic interval. The method may alternatively or additionally also include resetting the steady state current amount when the electrical device is disconnected from the output power interface. The method may alternatively or additionally include indicating the abnormal current draw state on a power status indicator of the network device when the abnormal current draw state is detected.

The threshold amount may be set based on a percentage of the steady state current amount. The abnormal current draw notification may indicate an excessive current draw condition when the electrical current draw of the electrical device exceeds the steady state current amount by an overcurrent threshold amount. The abnormal current draw notification may indicate a burnt out condition when the electrical current draw of the electrical device is below the steady state current amount by an undercurrent threshold amount. The abnormal current draw notification may indicate a burnt out condition when the electrical current draw of the electrical device is: above a nominal threshold current amount; and below the steady state current amount by an undercurrent threshold amount. The abnormal current draw state of the electrical device may be detected when the electrical current draw of the electrical device deviates from the steady state current amount by the threshold amount for a predetermined duration. The network device may be a light switch, and the electrical device may be a lighting device.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

It should be appreciated that the network devices disclosed herein may have other components than those depicted in one or more figures. Further, the embodiments shown in the figures are only one example of network devices that may incorporate embodiments of the invention. In some other embodiments, a network device disclosed herein may have more or fewer components than shown in the figure, may combine two or more components, or may have a different configuration or arrangement of components. Further, it will be appreciated that a system or device may include a combination of one or more of the features depicted in one figure and one, more or all features depicted in one or more other figures. Similarly, a process may include a combination of one or more of the actions depicted in a flow-chart figure and one, more or all actions depicted in one or more other flow-chart figures.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

It will be appreciated that, while some disclosures herein reference a house or a household, such disclosures can be extended to apply to different settings, such as a building, an office, an apartment, a school, or a vehicle.

While the principles of the disclosure have been described above in connection with specific apparatuses and methods, it is to be clearly understood that this description is made only by way of example and not as limitation on the scope of the disclosure. The following non-limiting examples provide illustrations of particular embodiments of disclosed techniques and devices.

What is claimed is:

1. A computer-implemented method comprising:
    determining that a component of a secondary light switch detected a stimulus, wherein the stimulus includes an input or motion;
    identifying a group of master light switches, wherein the group corresponds to the stimulus detected at the secondary light switch, wherein each master light switch in the group of master light switches is electrically connected to a corresponding light source via wiring, and wherein, for each master light switch in the group of master light switches, the secondary light switch is not electrically connected to the corresponding light source connected to the master light switch via wiring, and wherein a local area network includes:
        the secondary light switch;
        each master light switch of the group of master light switches; and
        a gateway that routes communications between the secondary light switch and at least one master light switch of the group of master light switches on the local area network; and
    wirelessly transmitting a plurality of communications, each communication of the plurality of communications being transmitted directly to a master light switch in the group of master light switches, wherein each of at least two of the plurality of communications cause the master light switch receiving the communication to change an output of the corresponding light source, and wherein the transmission avoids use of any cloud server.

2. The method as recited in claim 1, wherein the stimulus includes a push of a mechanical button on the secondary light switch or a toggle of a switch on the secondary light switch.

3. The method as recited in claim 1, wherein the stimulus includes an input of a first type, and wherein the method further comprises:
    determining that the component of the secondary light switch detected another input of a second type;
    identifying another master light switch that corresponds to the other input, wherein the other master light switch is electrically connected to another light source via other wiring, and wherein the secondary light switch is not electrically connected to the other light source via wiring; and
    wirelessly transmitting another communication to the other master light switch, wherein the other communication causes the other master light switch to change an output of the other light source.

4. The method as recited in claim 1, further comprising:
    identifying the stimulus as being of a particular type from amongst a set of types,
    wherein the group of master light switches is identified based on the identification of the particular type.

5. The method as recited in claim 1, wherein:
    the method is performed by the secondary light switch; and
    determining that a component of the secondary light switch detected the stimulus includes detecting the stimulus.

6. The method as recited in claim 1, wherein the secondary light switch is not electrically connected to any remote light source via wiring.

7. The method as recited in claim 1, wherein the secondary light switch does not include an electronic display.

8. A system comprising:
    one or more data processors; and
    a non-transitory computer-readable storage medium containing instructions which when executed on the one or more data processors, cause the one or more data processors to perform actions including:
        determining that a component of a secondary light switch detected a stimulus, wherein the stimulus includes an input or motion;
        identifying a group of master light switches, wherein the group corresponds to the stimulus detected at the secondary light switch, wherein each master light switch in the group of master light switches is electrically connected to a corresponding light source via wiring, and wherein, for each master light switch in the group of master light switches, the secondary light switch is not electrically connected to the corresponding light source connected to the master light switch via wiring, and wherein a local area network includes:
            the secondary light switch;
            each master light switch of the group of master light switches; and
            a gateway that routes communications between the secondary light switch and at least one master light switch of the group of master light switches on the local area network; and
        wirelessly transmitting a plurality of communications each communication of the plurality of communications being transmitted directly to a master light switch in the group of master light switches, wherein each of at least two of the plurality of communications cause the master light switch receiving the communication to change an output of the corresponding light source, and wherein the transmission avoids use of any cloud server.

9. The system as recited in claim 8, wherein the stimulus includes a push of a mechanical button on the secondary light switch or a toggle of a switch on the secondary light switch.

10. The system as recited in claim 8, wherein the stimulus includes an input of a first type, and wherein the actions further include:
   determining that the component of a secondary light switch detected another input of a second type;
   identifying another master light switch that corresponds to the other input, wherein the other master light switch is electrically connected to another light source via other wiring, and wherein the secondary light switch is not electrically connected to the other light source via wiring; and
   wirelessly transmitting another communication to the other master light switch, wherein the other communication causes the other master light switch to change an output of the other light source.

11. The system as recited in claim 8, wherein the actions further include:
   identifying the stimulus as being of a particular type from amongst a set of types,
   wherein the group of master light switches is identified based on the identification of the particular type.

12. The system as recited in claim 8, wherein:
   the secondary light switch includes the one or more data processors and the computer-readable storage medium; and
   determining that a component of the secondary light switch detected the stimulus includes detecting the stimulus.

13. The system as recited in claim 8, wherein the secondary light switch is not electrically connected to any remote light source via wiring.

14. The system as recited in claim 8, wherein the secondary light switch does not include an electronic display.

15. A computer-program product tangibly embodied in a non-transitory machine-readable storage medium, including instructions configured to cause one or more data processors to perform actions including:
   determining that a component of a secondary light switch detected a stimulus, wherein the stimulus includes an input or motion;
   identifying a group of master light switches, wherein the group corresponds to the stimulus detected at the secondary light switch, wherein each master light switch in the group of master light switches is electrically connected to a corresponding light source via wiring, and wherein, for each master light switch in the group of master light switches, the secondary light switch is not electrically connected to the corresponding light source connected to the master light switch via wiring, and wherein a local area network includes:
   the secondary light switch;
   each master light switch of the group of master light switches; and
   a gateway that routes communications between the secondary light switch and at least one master light switch of the group of master light switches on the local area network; and
   wirelessly transmitting a plurality of communications, each communication of the plurality of communications being transmitted directly to a master light switch in the group of master light switches, wherein each of at least two of the plurality of communications cause the master light switch receiving the communication to change an output of the corresponding light source, and wherein the transmission avoids use of any cloud server.

16. The computer-program product as recited in claim 15, wherein the stimulus includes a push of a mechanical button on the secondary light switch or a toggle of a switch on the secondary light switch.

17. The computer-program product as recited in claim 15, wherein the stimulus includes an input of a first type, and wherein the actions further include:
   determining that the component of a secondary light switch detected another input of a second type;
   identifying another master light switch that corresponds to the other input, wherein the other master light switch is electrically connected to another light source via other wiring, and wherein the secondary light switch is not electrically connected to the other light source via wiring; and
   causing another communication to be wirelessly sent to the other master light switch, wherein the other communication causes the other master light switch to change an output of the other light source.

18. The computer-program product as recited in claim 15, wherein the actions further include:
   identifying the stimulus as being of a particular type from amongst a set of types, wherein the group of master light switches is identified based on the identification of the particular type.

19. The computer-program product as recited in claim 15, wherein:
   the actions are performed by the secondary light switch; and
   determining that a component of the secondary light switch detected the stimulus includes detecting the stimulus.

20. The computer-program product as recited in claim 15, wherein the secondary light switch is not electrically connected to any remote light source via wiring.

* * * * *